United States Patent
Nomura et al.

(10) Patent No.: US 7,856,504 B2
(45) Date of Patent: Dec. 21, 2010

(54) SERVER DEVICE, INTER-SERVER DEVICE CONNECTION METHOD, PROGRAM, AND RECORDING MEDIUM

(75) Inventors: Takashi Nomura, Shinagawa-ku (JP); Masayuki Ishikawa, Shinagawa-ku (JP); Takashi Kanao, Shinagawa-ku (JP)

(73) Assignee: Sony Corporation, Tokyo (JP)

( * ) Notice: Subject to any disclaimer, the term of this patent is extended or adjusted under 35 U.S.C. 154(b) by 413 days.

(21) Appl. No.: 11/630,339

(22) PCT Filed: May 11, 2006

(86) PCT No.: PCT/JP2006/009497

§ 371 (c)(1),
(2), (4) Date: Dec. 21, 2006

(87) PCT Pub. No.: WO2006/121122

PCT Pub. Date: Nov. 16, 2006

(65) Prior Publication Data

US 2008/0034097 A1  Feb. 7, 2008

(30) Foreign Application Priority Data

May 11, 2005 (JP) .......................... 2005-139069
Apr. 27, 2006 (JP) .......................... 2006-124530

(51) Int. Cl.
*G06F 15/173* (2006.01)
*G06F 15/16* (2006.01)

(52) U.S. Cl. .................... 709/227; 709/223; 709/245

(58) Field of Classification Search ................ 709/223, 709/227, 245
See application file for complete search history.

(56) References Cited

U.S. PATENT DOCUMENTS

| | | | | |
|---|---|---|---|---|
| 2002/0087707 A1* | 7/2002 | Stewart et al. | ............... | 709/230 |
| 2003/0182576 A1* | 9/2003 | Morlang et al. | ............. | 713/201 |
| 2004/0028035 A1* | 2/2004 | Read | .......................... | 370/352 |

FOREIGN PATENT DOCUMENTS

| | | |
|---|---|---|
| JP | 2003-132028 | 5/2003 |
| JP | 2004-272632 | 9/2004 |
| JP | 2005-12343 | 1/2005 |

* cited by examiner

*Primary Examiner*—Patrice L Winder
*Assistant Examiner*—Tanim Hossain
(74) *Attorney, Agent, or Firm*—Oblon, Spivak, McClelland, Maier & Neustadt, L.L.P.

(57) ABSTRACT

A procedure from when device registration is completed until an always-on connection session with a server apparatus is established is simplified. Upon receiving a start request for directly accessing a controlled device from a controlling device via a service server, a direct-access management server transmits a direct-access URI obtaining request to the controlled device. The controlled device transmits a direct-access-port NAT setting request to a router. Upon receiving a notification of a global-IP-address and port-number obtaining error from the router, the controlled device transmits, to the direct-access management server, an error code for giving an instruction for a new remote video-recording reservation using tunneling. Upon receiving the error code, the direct-access management server assigns a tunneling port in the server, creates a direct-access URI based on the information of the port and so on, and transmits the direct-access URI to the controlling device via the service server.

13 Claims, 33 Drawing Sheets

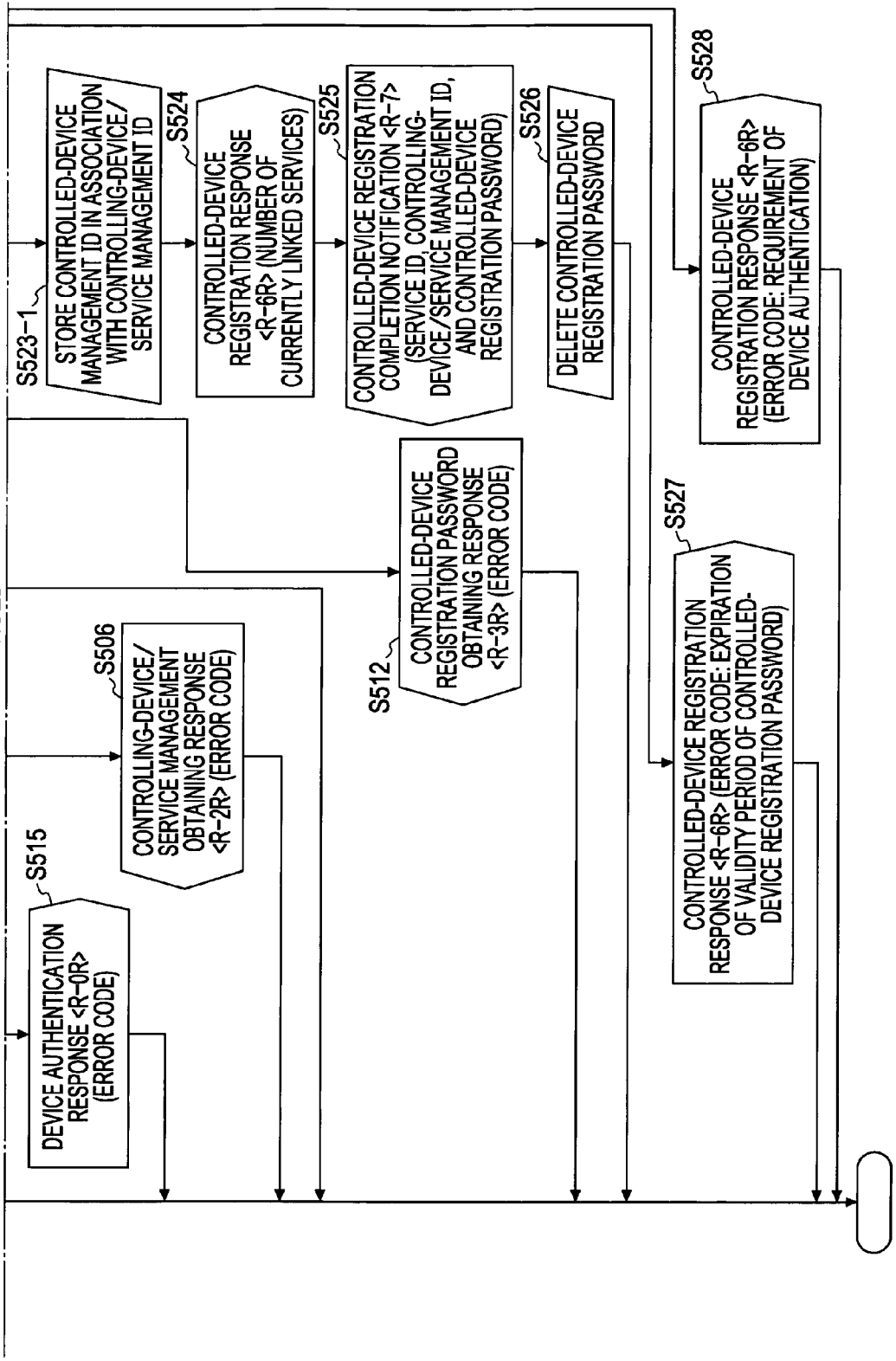

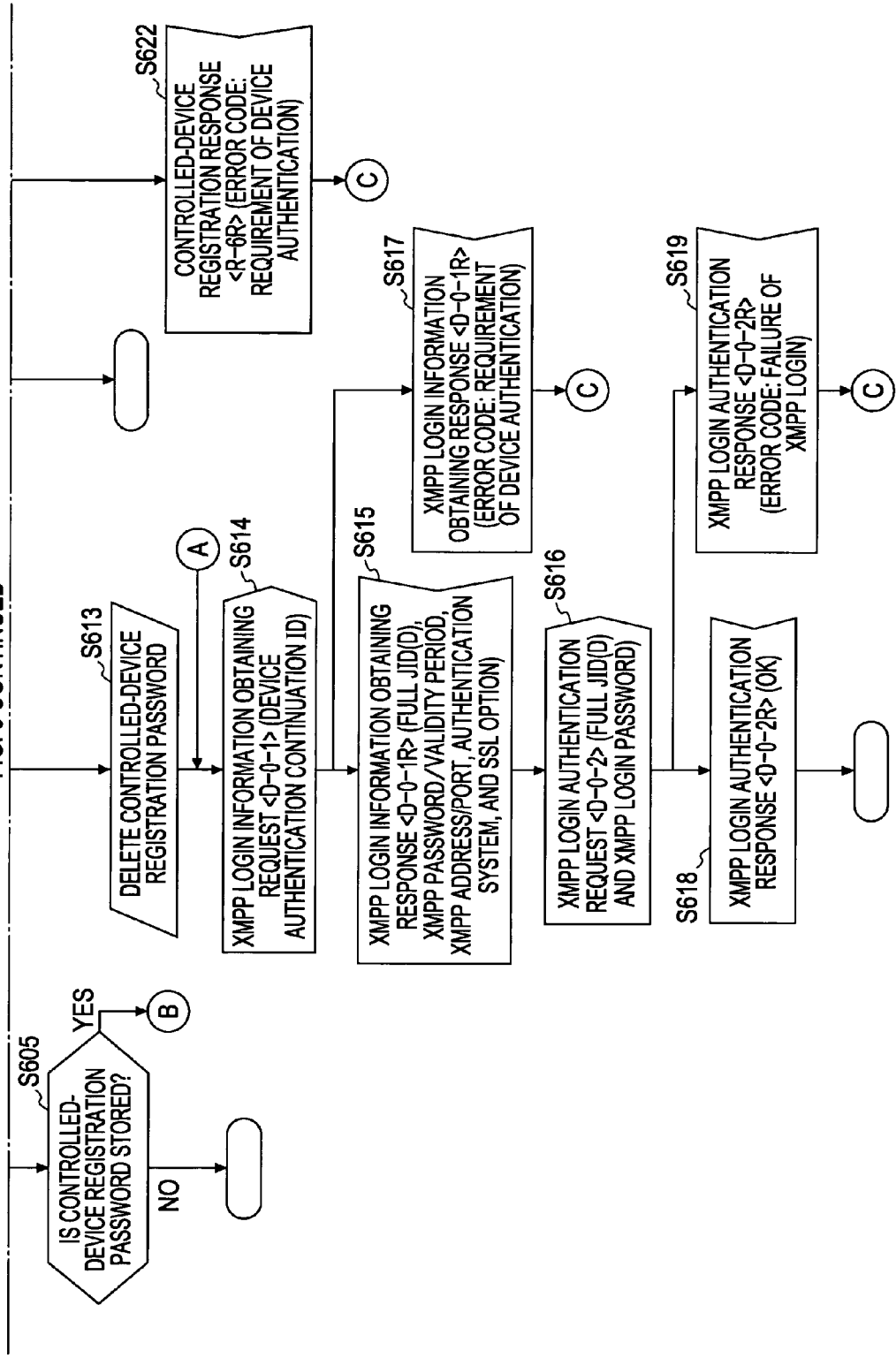

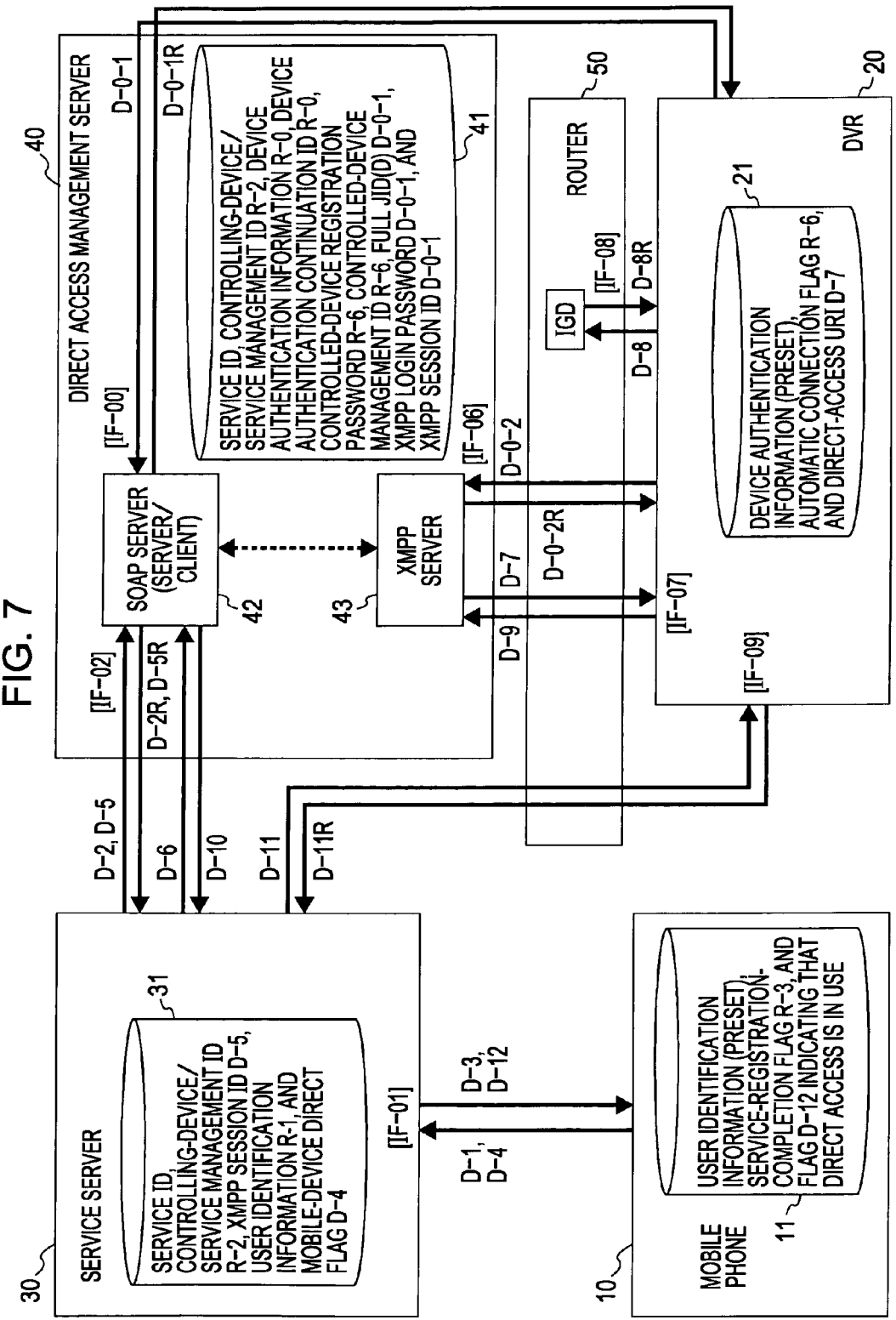

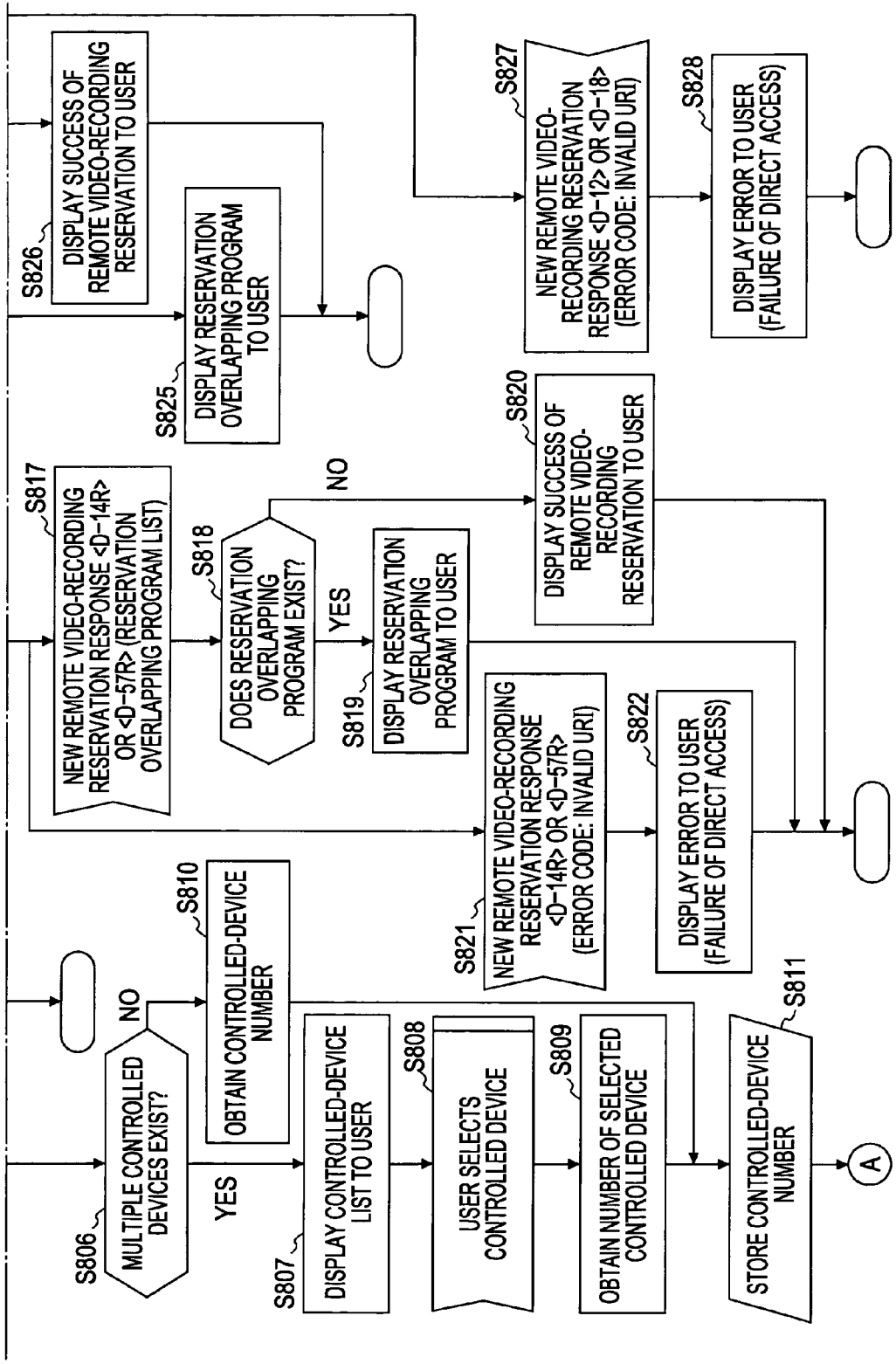

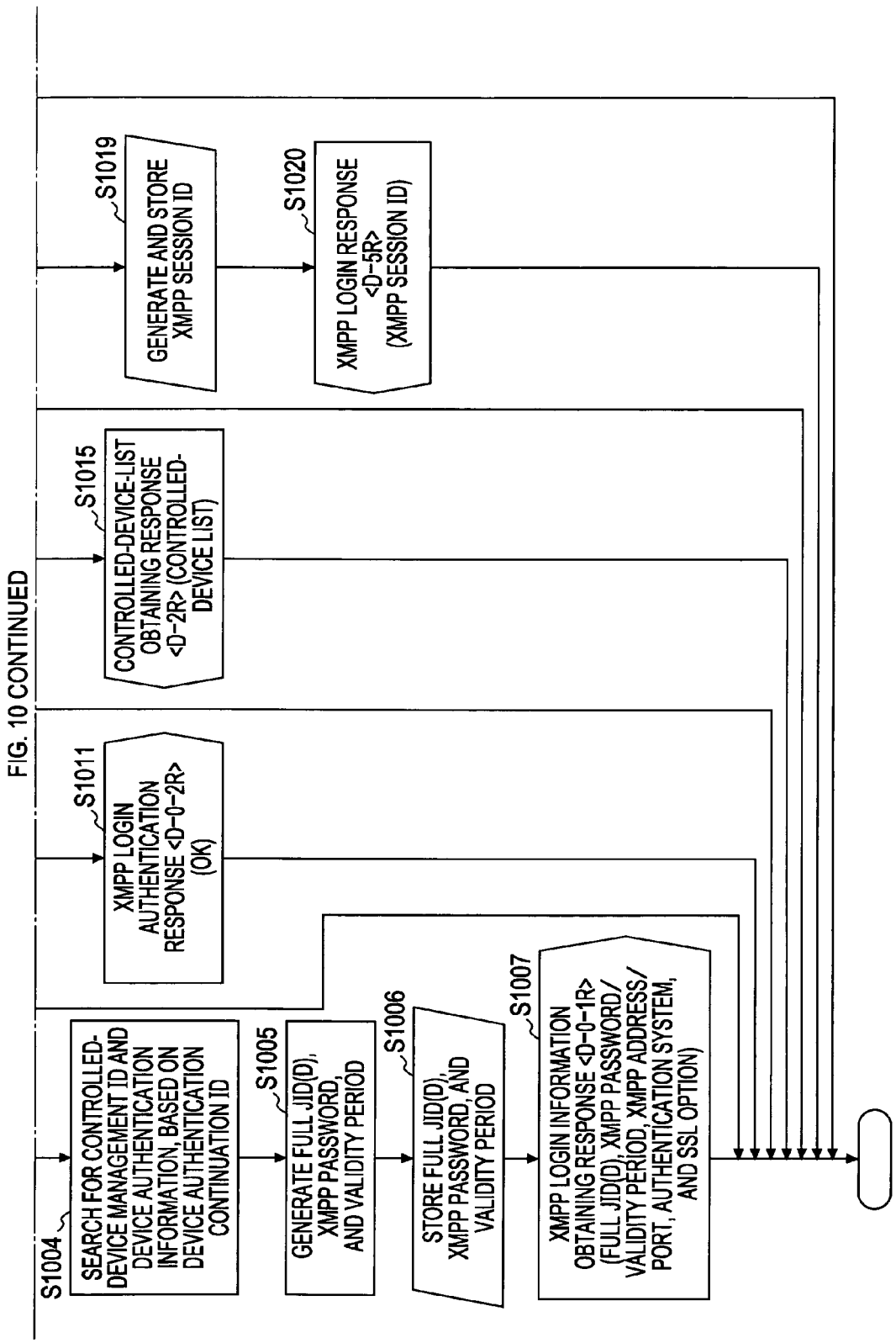

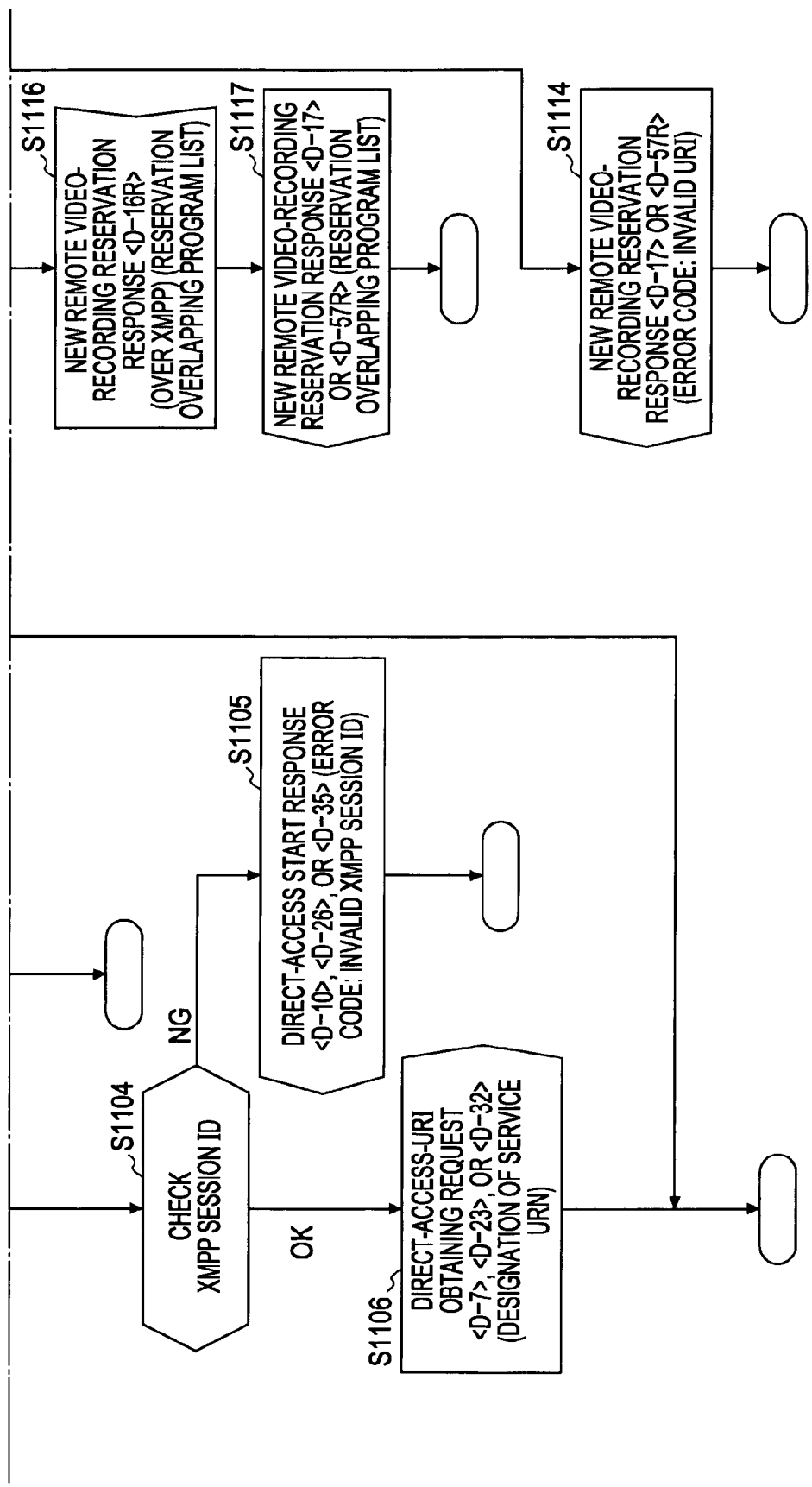

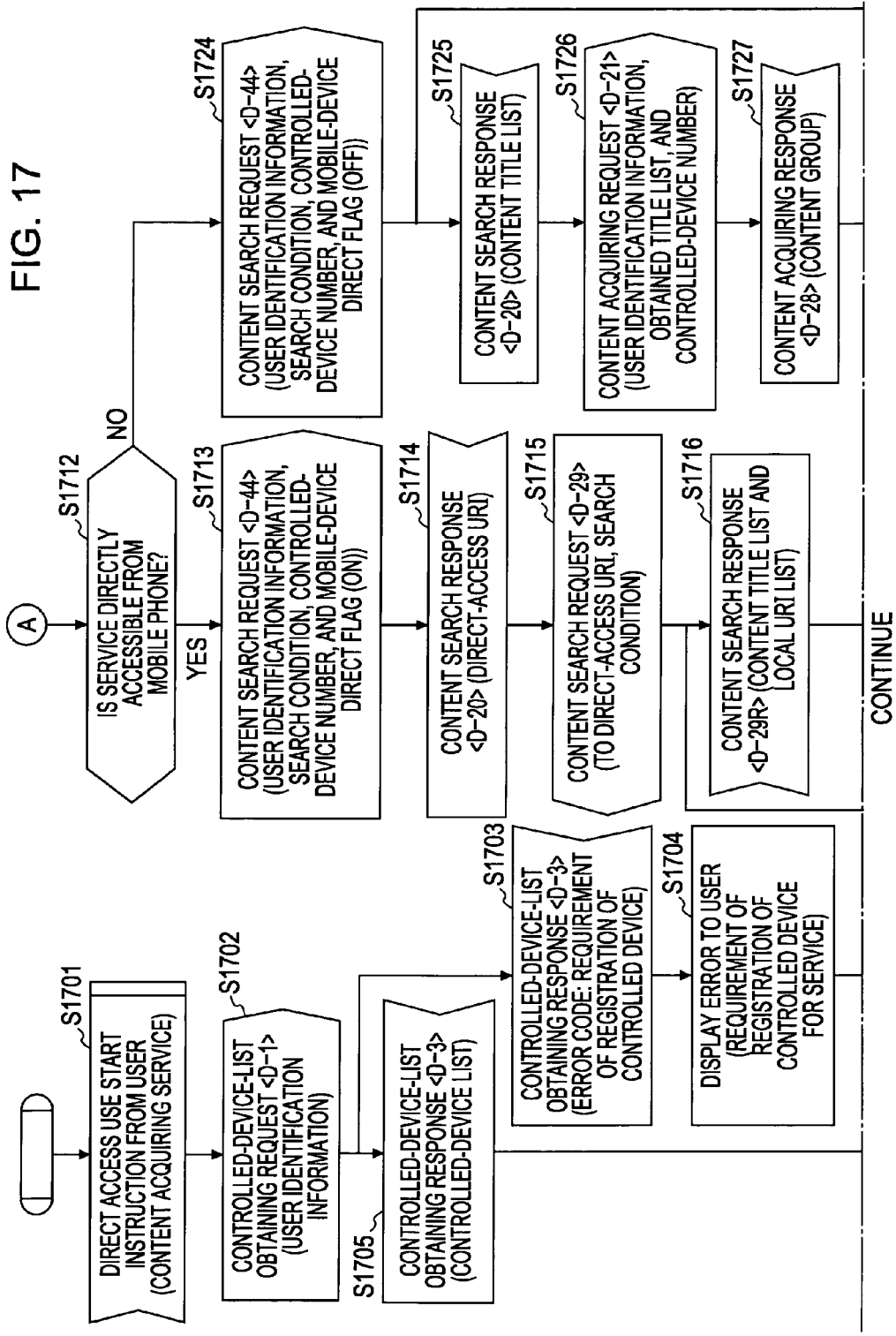

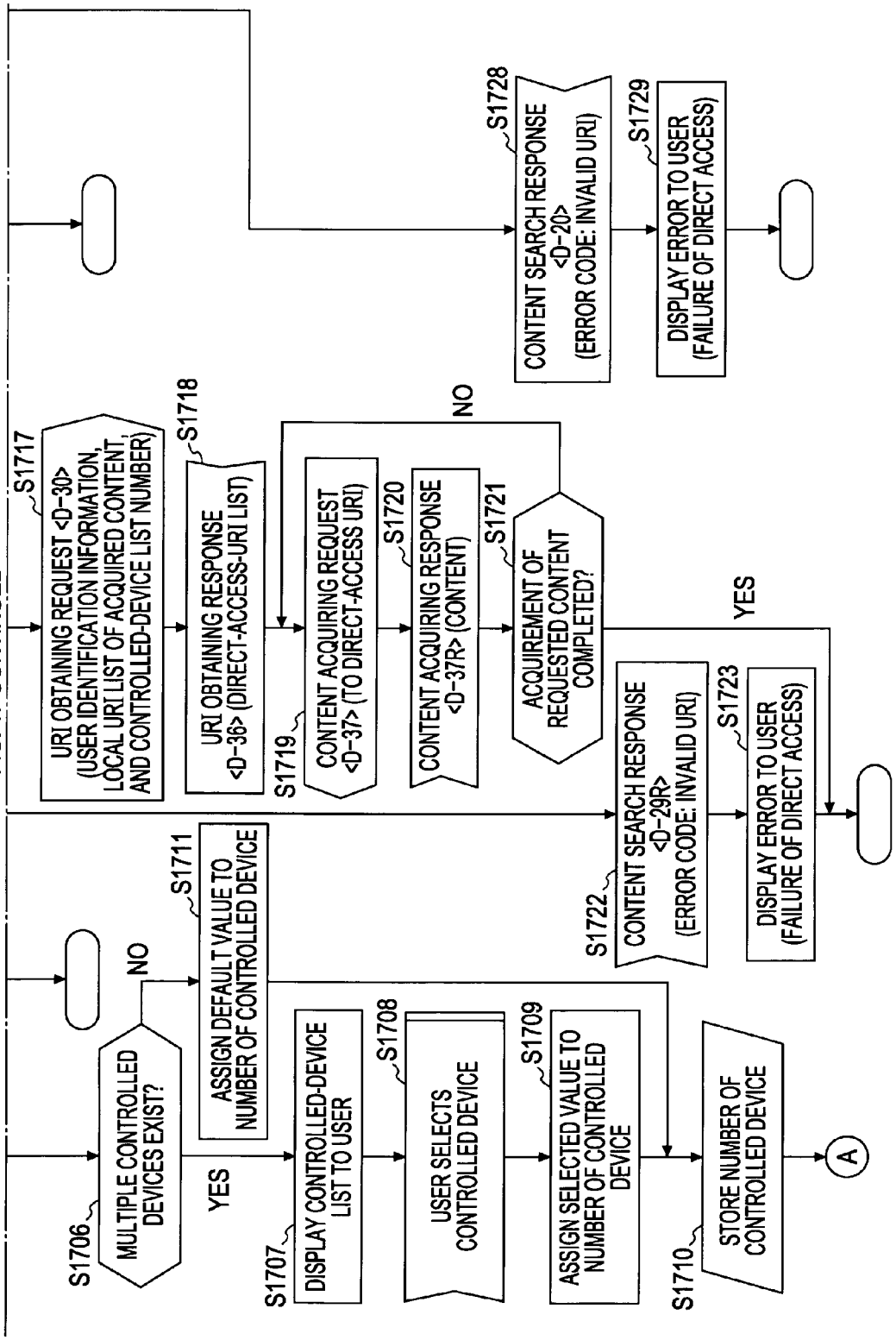

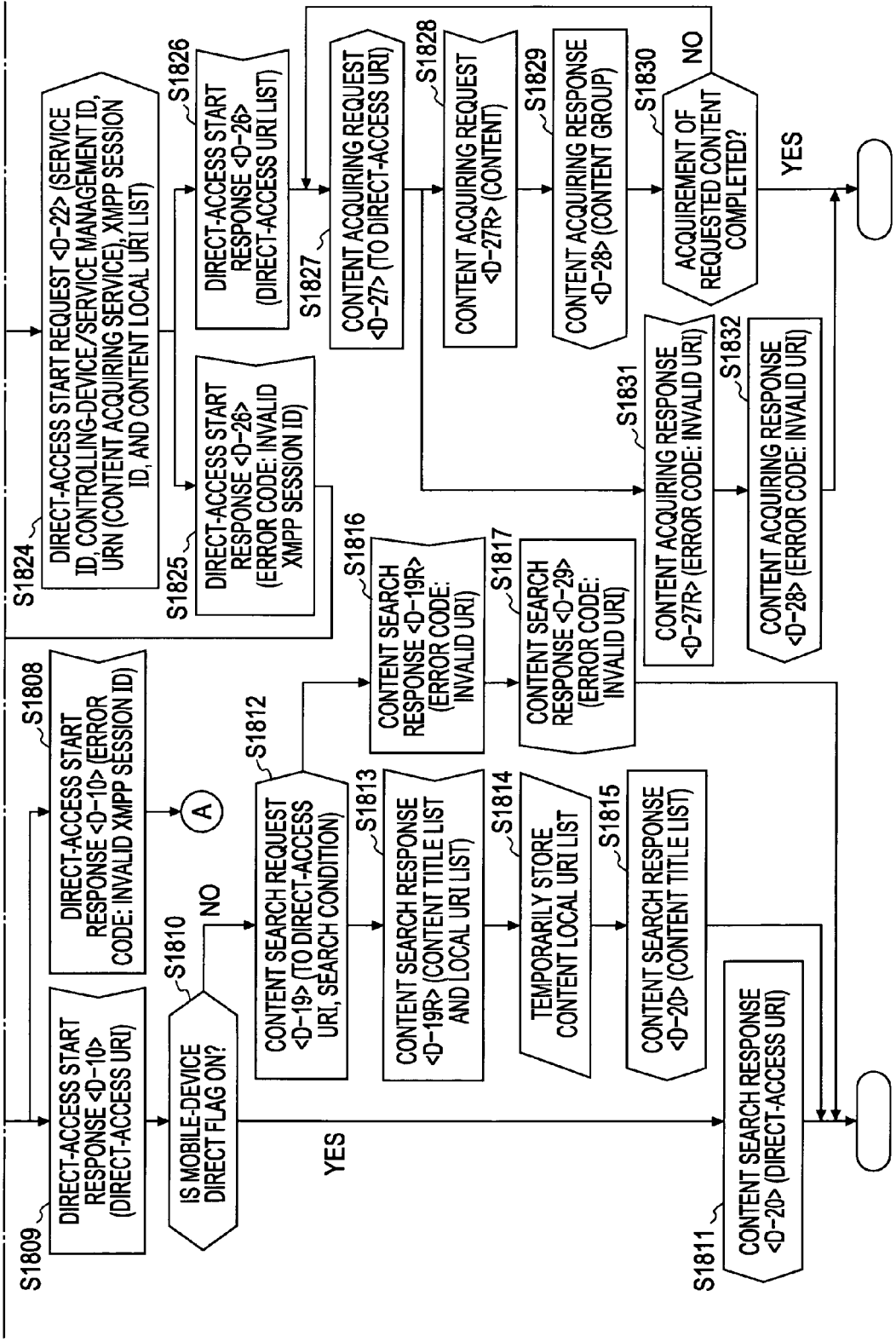

Dev-ID0001@dap.sony.com/PRODUCT CODE-SERIAL NUMBER
BARE JID / RESOURCE
FULL JID (D)

Dev-ID0001@dap.sony.com/CONTROLLING-DEVICE/SERVICE MANAGEMENT ID-01234
BARE JID / RESOURCE
FULL JID (D)

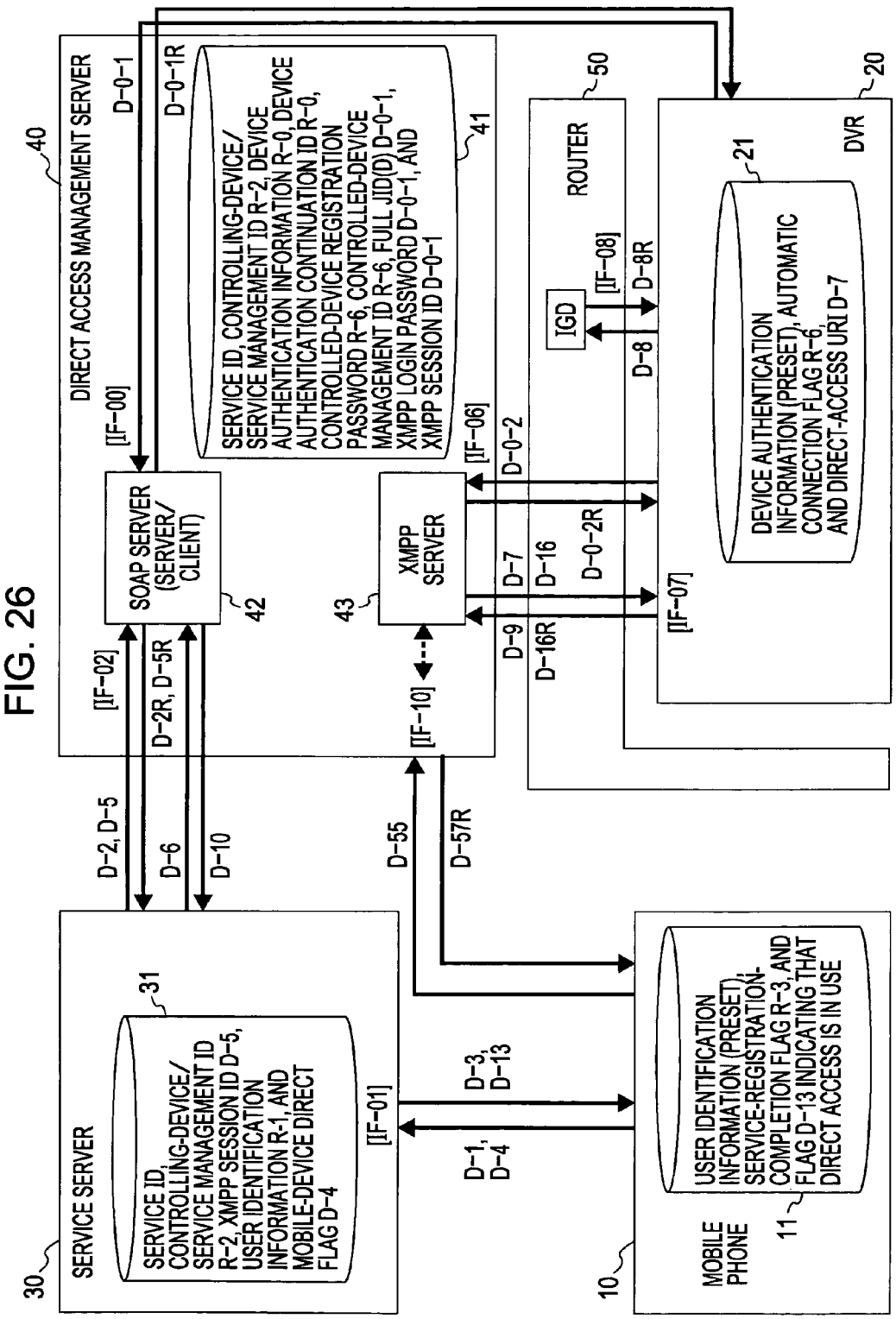

SERVER DEVICE, INTER-SERVER DEVICE CONNECTION METHOD, PROGRAM, AND RECORDING MEDIUM

TECHNICAL FIELD

The present invention relates to a service server for managing access between devices connected through a network, an inter-device connection method for a server apparatus, a program, and a storage medium.

BACKGROUND ART

As methods for accessing from a controlling device on the Internet to a controlled device in a home, a DDNS (dynamic domain name system) and a mail system are available.

The DDNS is a scheme in which an in-home controlled device registers its own address with a DDNS server and receives a specified domain name and port number from an internet-side controlling device to allow the access of the controlling device.

As a protocol for realizing real-time communication, an XMPP (eXtensible Messaging and Presence Protocol) is available (refer to "Extensible Messaging and Presence Protocol (XMPP): Core", RFC3920, The Internet Engineering Task Force (IETF), October 2004). One real-time communication scheme using the XMPP is instant messaging (IM) (refer to "Extensible Messaging and Presence Protocol (XMPP): Instant Messaging and Presence", RFC3921, The Internet Engineering Task Force (IETF), October 2004). In the instant messaging (IM), it is checked whether or not an IM client (a friend who can perform IM exchange) is online on the Internet and, when he/she is online, chatting, file exchange, and so on can be performed with the IM client.

Also, as a protocol for calling up data or a service existing on another computer, a SOAP (simple object access protocol) is available (refer to "SOAP Version 1.2", W3C Recommendation, World Wide Web Consortium (W3C), June 2003). In communications based on the SOAP, messages in which auxiliary information called envelopes are attached to XML (eXtensible Markup Language) documents are exchanged using a protocol such as an HTTP (hyper text transfer protocol). Both a client using a service and a server providing the service have SOAP generation/interpretation engines to allow an object to be called up between different environments.

In a network system in which a controlled device can be controlled from a controlling device through a network, when the controlled device is connected to the network via a router, a port for direct access from the controlling device needs to be set at the router. However, when the port for direct access can not be obtained, for example, when all ports of the router are used, an available-port obtaining error occurs. Thus, there is a problem in that, during the error, the direct access from the controlling device to the controlled device is disabled.

In view of the situations described above, an object of the present invention is to provide, in a network system in which a controlling-side device can control a controlled-side device through a network, a server apparatus, an inter-device connection method therefor, a program, and a storage medium which can ensure access from the controlling-side device to the controlled-side device even when, for example, a router cannot obtain a port for direct access.

DISCLOSURE OF INVENTION

A server apparatus of the present invention is directed to a server apparatus that is connectable in a network in conjunction with a first device and a second device. The server apparatus includes: connecting means for setting a session for communication with the first device; first receiving means for receiving, from the second device, an access start request for starting access to the first device; and first transmitting means for issuing, to the first device, a request for access-target information for allowing the second device to access the first device, when the first receiving means receives the access start request. The server apparatus further include: second receiving means for receiving a response from the first device in response to the request issued from the first transmitting means; and second transmitting means for transmitting, when the response is a first response containing first access-target information, the received first access-target information to the second device, and for assigning, when the response is a second response that does not contain the first access-target information, an access-target for access of the second device to the server apparatus and transmitting second access-target information indicating the assigned access target to the second device in order to cause the second device and the first device to communicate with each other through the session.

In the present invention, when access-target information required for accessing the first device over the network cannot be obtained from the first device, for example, a port for connection with the first device, the connection using an always-on connection set between the server apparatus and the first device, is assigned. The port is then transmitted to the second device as access-target information, so that the second device issues an access request to the port access-destination information. Thus, according to the present invention, even when access-target information required for accessing the first device over the network cannot be obtained from the first device, it is possible to ensure that an access request is issued from the second device to the first device.

In the server apparatus of the present invention, the first device is connected to the network via a router, and the first access-target information is information specifying an access target, the information being transmitted from the router to the first device.

In the server apparatus of the present invention, the first access-target information is information containing a port number and a global IP address in the network, the information being transmitted from the router to the first device.

In the server apparatus of the present invention, the first access-target information is information containing a port number and an address in the network.

In the server apparatus of the present invention, the first access-target information is information containing a port number and a global address in the network.

In the server apparatus of the present invention, the second access-target information is information containing a global address and a port number of the server apparatus.

The server apparatus of the present invention further includes controlling means for receiving a request given from the second device to the first device, the request being based on the second access-destination information, and for transmitting the request to the first device. The connecting means sets a two-way communication session with the first connecting device, and the controlling means transmits the request, given from the second device to the first device, to the first device through the two-way communication session.

In the server apparatus of the present invention, the connecting means sets an always-on-connection two-way communication session with the first device, and the controlling means transmits the request, given from the second device to the first device, to the first device through the always-on-connection two-way communication session.

In the server apparatus of the present invention, the connecting means sets a communication session with the first device, the communication session using an XMPP (Extensible Messaging and Presence Protocol).

In the server apparatus of the present invention, when the first receiving means receives the access start request, the first transmitting means issues a request for access-destination information for allowing the second device to access the first device to the first device through the session set by the connecting means.

In the server apparatus of the present invention, the second device is connected to the server apparatus via a service server apparatus that provides the second device with a service.

According to the present invention, even when specifying information required for accessing the first device over the network cannot be obtained from the first device, it can be ensured that an access request is issued from the second device to the first device.

BRIEF DESCRIPTION OF THE DRAWINGS

FIG. 7 is a sequence diagram showing the flow of information in the network system shown in FIG. 1 during controlled-device XMPP login and remote video-recording reservation.

FIG. 17 is a flow chart showing the operation of the mobile phone during the content acquirement.

FIG. 26 is a sequence diagram showing the flow of information when the mobile phone makes a remote video-recording reservation using tunneling without using the service server.

BEST MODE FOR CARRYING OUT THE INVENTION

An embodiment of the present invention will be described below with reference to the drawings.

Figure 1:
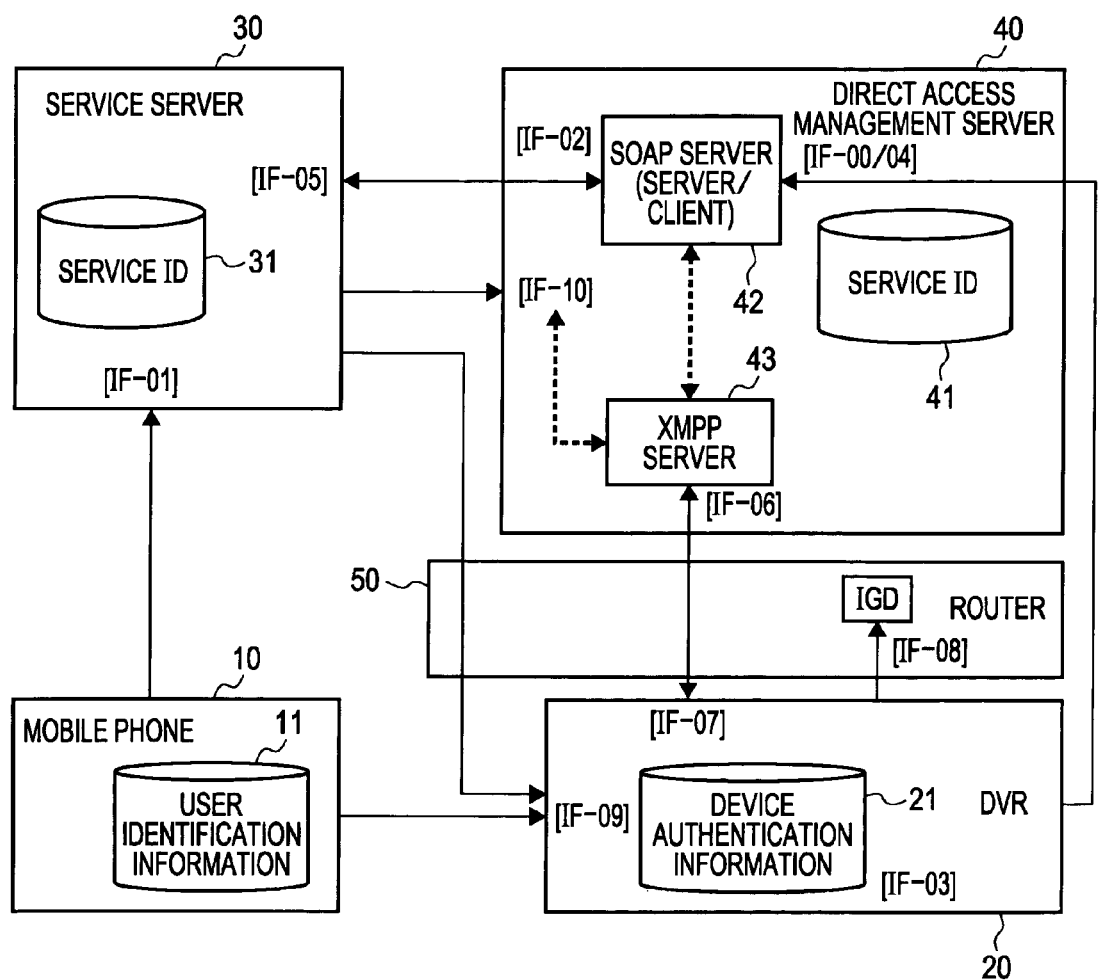
FIG. 1 is a diagram showing an entire configuration of a network system according to one embodiment of the present invention.

FIG. 1 is a diagram showing an entire configuration of a network system according to one embodiment of the present invention.

This network system has a mobile phone 10 serving as a controlling device, a DVR (digital video recorder) 20 serving as a controlled device, a service server 30, a direct-access management server 40, and a router 50.

The mobile phone 10 operates as a controlling device for controlling a controlled device. The controlling device may be any device for controlling a controlled device and may be, for example, a PC (personal computer) or PDA (personal digital assistance).

The mobile phone 10 includes not only a phone function unit, but also includes, for example, a main memory for storing programs and so on, a CPU (central processing unit) for performing various types of computation processing by executing a program stored in the main memory, an interface unit for a network, an interface unit for the DVR 20, and a user interface unit such as a key input unit and a display unit, and a nonvolatile storage unit 11. The storage unit 11 stores user identification information registered in the mobile phone 10. The main memory stores not only a program for operating the phone function unit, but also includes, for example, a program for performing processing for registering the mobile phone with the service server 30, making remote video-recording reservation of content, and acquiring content.

The DVR 20 includes not only a video-recording/playback function unit for recording/playing back content, such as a broadcast program, to/from a medium, but also includes, for example, a main memory for storing programs and so on, a CPU for performing various types of computation processing by executing a program stored in the main memory, an interface unit for a network, an interface unit for the mobile phone 10, a nonvolatile storage unit 21, a remote-control receiver, and an interface unit for connecting a TV or the like. The storage unit 21 pre-stores device authentication information fixedly assigned to the controlled device. The main memory stores not only a program for controlling the video-recording/playback function unit, but also stores, for example, a program for performing processing for registering the controlled device with the direct-access management server 40, making remote video-recording reservation of content, and acquiring content. Although the DVR 20 has been described as a controlled device in the present embodiment, it may be any device that has a network connection function. For example, it may be a television unit.

The service server 30 provides a controlling device, such as the mobile phone 10, with various services for accessing a controlled device over a network. The service server 30 is realized using, for example, a standard computer system that includes an input unit such as a keyboard/mouse, a display unit, a main memory for storing programs and so on, a CPU for performing various computation processing by executing a program stored in the main memory, a communication unit for a network, and a storage unit 31. The main memory stores not only a basic program required for operating the computer system but also a program and so on required for executing services. The storage unit 31 stores a service ID for identifying the service server and a service for each service provided by the service server 30.

The direct-access management server 40 manages a controlling device and a relationship between a controlled device and a combination of a controlling device and a service of the service server 30. The direct-access management server 40 is realized using, for example, a standard computer system that includes an input unit such as a keyboard/mouse, a display unit, a main memory for storing programs and so on, a CPU for performing various computation processing by executing a program stored in the main memory, an interface unit for a network, and a storage unit 41. The main memory stores not only a basic program required for operating the computer system but also, for example, a program for causing the computer system to function as a direct-access management server.

The direct-access management server 40 has a SOAP (Simple Object Access Protocol) server 42 and an XMPP (eXtensible Messaging and Presence Protocol) server 43. The SOAP server 42 is a server for performing processing, for example, for registering a combination of a controlling device and a service, for registering a controlled device, and for transferring information for directly accessing the service server. The XMPP server 43 is a server for setting a two-way always-on connection session with the DVR 20, which serves as a controlled device. The SOAP server and the XMPP server are merely examples, and thus, the SOAP server can be replaced with another API-calling-system-based server and the XMPP server can be replaced with another IM-system-based server.

Interfaces of the devices will be described next. [IF-**] in FIG. 1 indicates an interface number.

The SOAP server 42 of the direct-access management server 40 has an interface [IF-02] accessed from the service server 30 and interfaces [IF-00 and IF-04] accessed from the DVR 20. The SOAP server 42 also has a SOAP client function to access an interface [IF-05] of the service server 30 side. An interface of the XMPP server 43 is accessed from an XMPP client during the establishment of an XMPP session. In this example of the system configuration, the interface corresponds to an interface [IF-06] accessed from the DVR 20. Since messages can be exchanged in two ways by using the interface [IF-06] after the establishment of an XMPP session, it is also possible for the XMPP server 43 to access an interface [IF-07] of the DVR 20. The direct-access management server 40 also has an interface [IF-10] of a direct-access URI (uniform resource identifier) provided during XMPP tunneling, described below, with respect to the service server 30.

The service server 30 has an interface [IF-01] accessed from the mobile phone 10 and the interface [IF-05] accessed from the direct-access management server 40.

Although the service server 30 is not directly interfaced with the XMPP server 43 of the direct-access management server 40 in this example of the system configuration, the system may naturally be configured so that the service server 30 is directly interfaced with the XMPP server 43.

The DVR 20 has the interface [IF-07] that is accessed from the direct-access management server 40 after an XMPP session is established, an interface [IF-03] for transmitting/receiving data to/from the mobile phone 10 via, for example, an infrared device or a USB (universal serial bus), and an interface [IF-09] that is accessed from the service server 30 or the mobile phone 10 and that is compatible with a direct-access URI.

The router 50 has an interface [IF-08] that is accessed from the DVR 20 and that has a UPnP (Universal Plug and Play) IGD (Internet Gateway Device) function.

The operation of the network system of this embodiment will be described next. In the following description, <X-XX> indicates a request and <X-XXR> indicates a response to <X-XX>.

[1. Registration of Controlling Device/Service and Controlled Device]

First, a description is given of the operation of linking a controlling-device/service management ID issued for each combination of the mobile phone 10 (controlling device) and a service and a controlled-device management ID uniquely issued, in the direct-access management server 40, to the individual DVR 20 (a controlled device).

Figure 2:
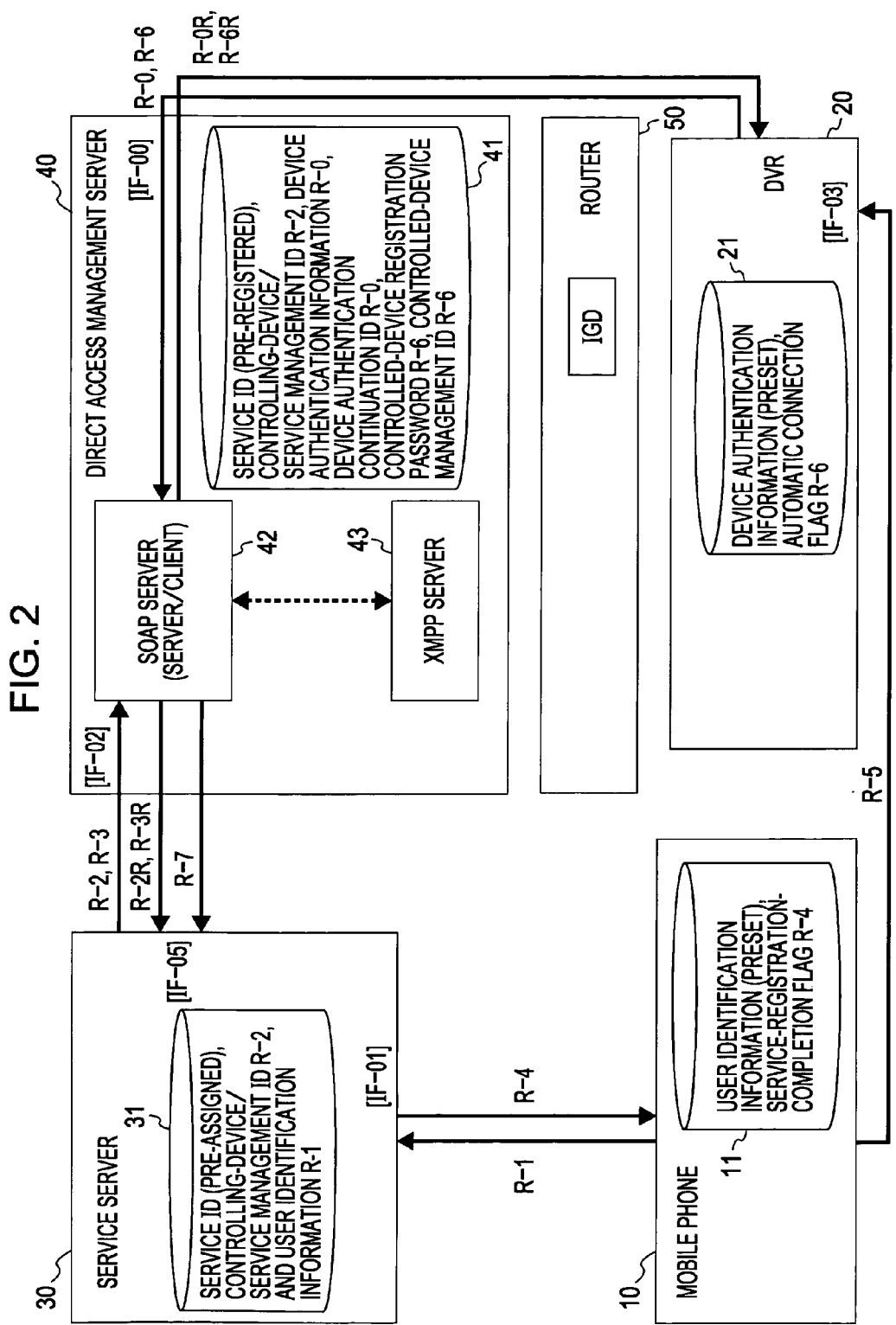
FIG. 2 is a sequence diagram showing the flow of information in the network system shown in FIG. 1 during registration of a combination of a controlling device and a service and registration of a controlled device.
Figure 3:
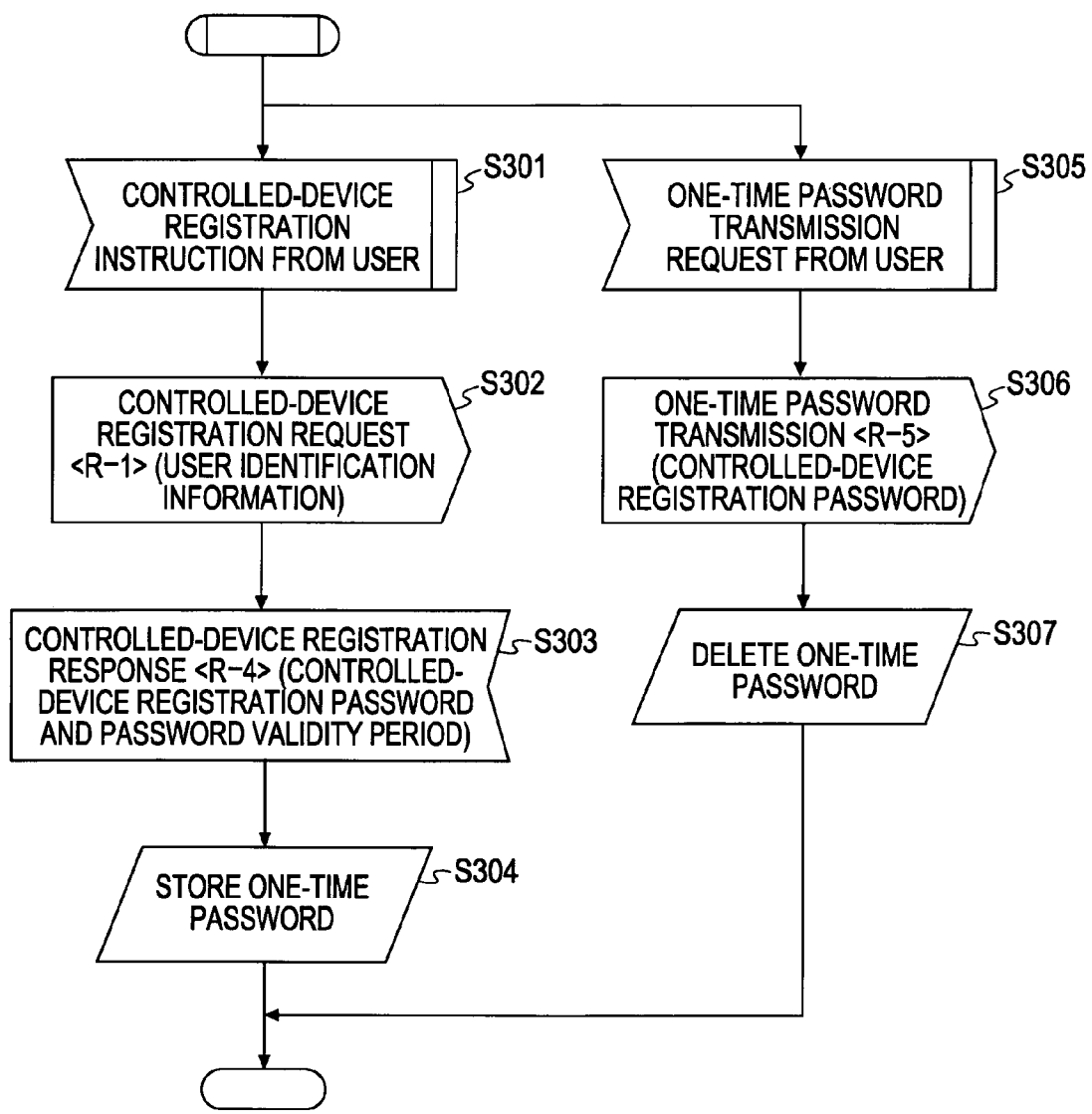
FIG. 3 is a flow chart showing the operation of the controlling device during the registration shown in FIG. 2.
Figure 4:
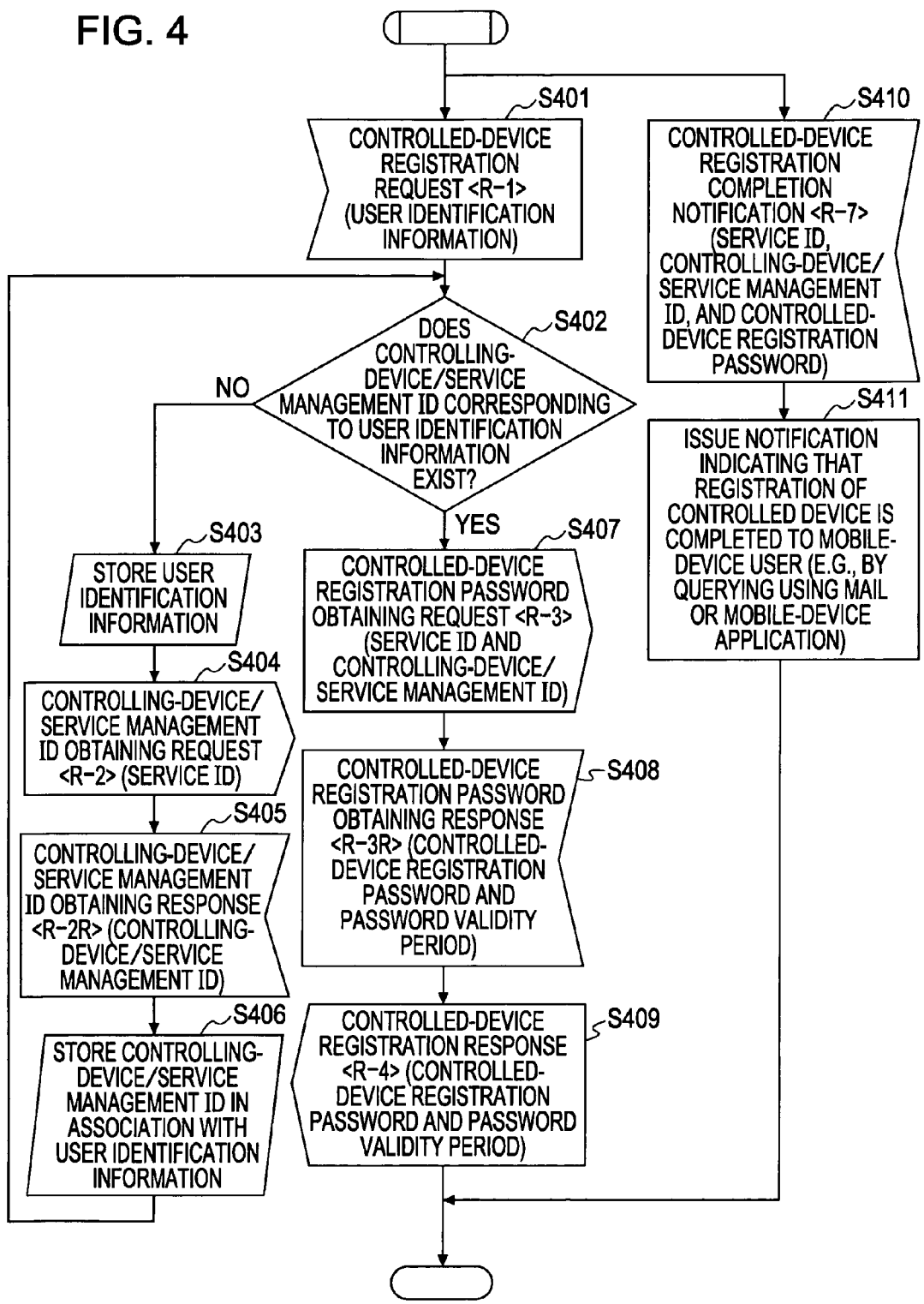
FIG. 4 is a flow chart showing the operation of a service server during the registration shown in FIG. 2.
Figure 5:
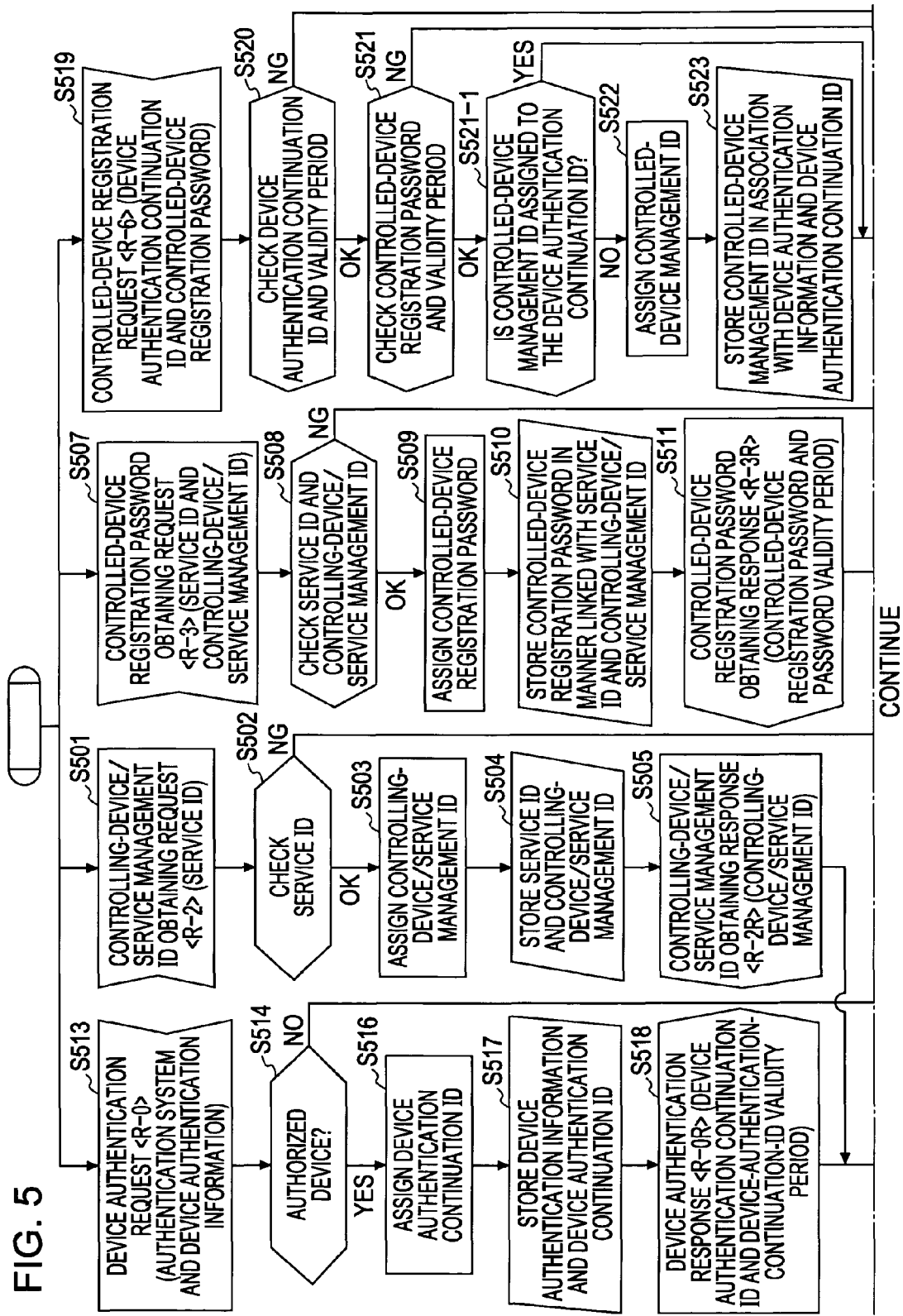
FIG. 5 is a flow chart showing the operation of a direct-access management server during the registration shown in FIG. 2.
Figure 6:
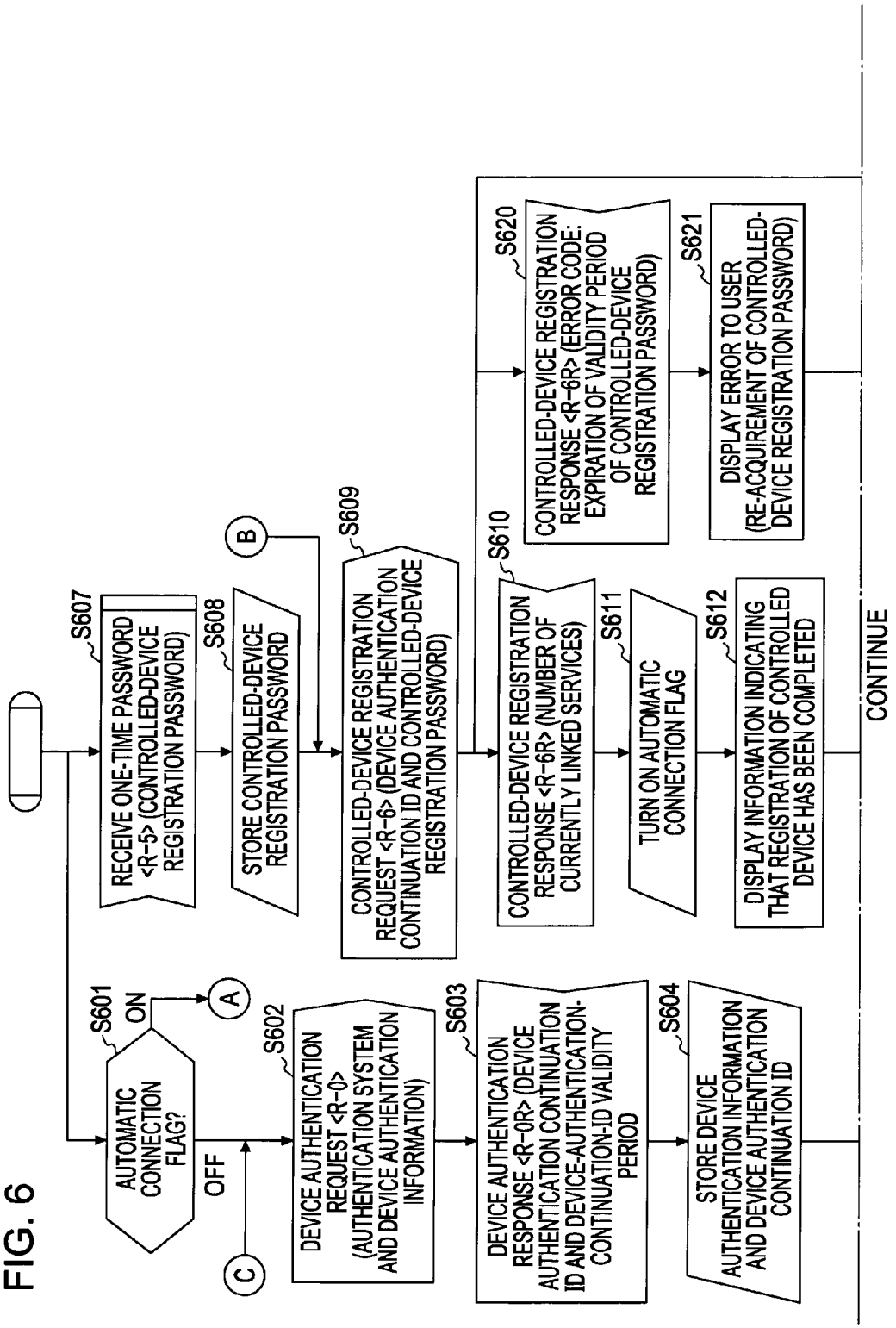
FIG. 6 is a flow chart showing the operation of a DVR during the registration shown in FIG. 2.

FIG. 2 is a sequence diagram showing the flow of information during registration of a combination of the mobile phone 10 and a service and registration of the DVR 20. FIG. 3 is a flow chart of the mobile phone 10 during the registration. FIG. 4 is a flow chart of the service server 30 during the registration. FIG. 5 is a flow chart of the direct-access management server 40 during the registration. FIG. 6 is a flow chart of the DVR 20 during the registration.

[1-1 Registration of Combination of Controlling Device and Service]

First, the mobile phone 10 receives a controlled-device registration instruction from a user (FIG. 3: step S301). The mobile phone 10 issues a controlled-device registration request <R-1> containing the user identification information to the service server 30 (FIG. 3: step S302).

Upon receiving the controlled-device registration request <R-1> containing the user identification information (FIG. 4: step S401), the service server 30 determines whether or not a controlling-device/service management ID corresponding to the user identification information is stored in the storage unit 31 (FIG. 4: step S402).

When a controlling-device/service management ID corresponding to the user identification information is not stored, the service server 30 stores the user identification information in the storage unit 31 (FIG. 4: step S403) and issues a controlling-device/service management ID obtaining request <R-2> containing a service ID, pre-assigned to the service server 30, to the SOAP server 42 in the direct-access management server 40 (FIG. 4: step S404). The controlling-device/service management ID is uniquely assigned to a combination of a controlling device and each service provided by a service provider.

Upon receiving the controlling-device/service management ID obtaining request <R-2> (FIG. 5: step S501), the SOAP server 42 checks whether or not the service ID contained therein matches a service ID pre-registered in the storage unit 41 of the direct-access management server 40 (FIG. 5: step S502). When the service ID does not match, the SOAP server 42 transmits, as a controlling-device/service management ID obtaining response <R-2R>, an error code indicating the service ID is not registered to the service server 30 (FIG. 5: step S506). When the service ID matches, the SOAP server 42 issues a new controlling-device/service management ID (FIG. 5: step S503) and registers a relationship between the controlling-device/service management ID and the service ID in the storage unit 41 (FIG. 5: step S504). The SOAP server 42 transmits, as a controlling-device/service management ID obtaining response <R-2R>, the controlling-device/service management ID to the service server 30 (FIG. 5: step S505). This arrangement allows the direct-access management server 40 to identify the controlling side, viewed from the direct-access management server 40, by using a combination of the mobile phone 10, which serves as a controlling device, and a service, which is provided by the service server 30 and used by the mobile phone 10.

Upon receiving the controlling-device/service management ID as the controlling-device/service management ID obtaining response <R-2R> (FIG. 4: step S405), the service server 30 stores the controlling-device/service management ID in the storage unit 31 in association with the user identification information (FIG. 4: step S406). The controlling-device/service management ID is stored in association with the user identification information, as described above. Thus, subsequently, when being accessed from the mobile phone 10, the service server 30 can issue a request for processing to the to the direct-access management server 40 by using a controlling-device service management ID corresponding to the user identification information of the mobile phone 10 to allow the direct-access management server 40 to uniquely identify a control-request source as the controlling side of a combination of the mobile phone 10, which serves as a controlling device, and a service of the service server 30.

After the service server 30 registers the controlling-device/service management ID in the storage unit 31 in association with the user identification information or when a controlling-device/service management ID corresponding to the user identification information contained in the controlled-device registration request <R-1> received from the mobile phone 10 is registered in the storage unit 31, the service server 30 issues a controlled-device registration password obtaining request <R-3> containing the controlling-device/service management ID and the service ID to the SOAP server 42 in the direct-access management server 40 (FIG. 4: step S407).

Upon receiving the controlled-device registration password obtaining request <R-3> (FIG. 5: step S507), the SOAP server 42 in the direct-access management server 40 determines whether or not a combination of the controlling-device/service management ID and the service ID which are contained in the controlled-device registration password obtaining request <R-3> is registered in the storage unit 41 (FIG. 5: step S508). When the combination is not registered, the SOAP server 42 transmits, as a controlled-device registration password obtaining response <R-3R>, an error code indicating that the combination of the controlling-device/service management ID and the service ID is not registered to the service server 30 (FIG. 5: step S512). When the combination of the controlling-device/service management ID and the service ID, which are contained in the controlling-device registration password obtaining request <R-3> is already registered in the storage unit 41, the SOAP server 42 generates a controlled-device registration password (FIG. 5: step S509) and registers the generated controlled-device registration password and information regarding a validity period specified for the controlled-device registration password in the storage unit 41 in association with the controlling-device/service management ID and the service ID which are contained in the controlled-device registration password obtaining request <R-3> (FIG. 5: step S510). Thereafter, the SOAP server 42 transmits, as a controlled-device registration password obtaining response <R-3R>, the controlled-device registration password and the validity period information of the controlled-device registration password to the service server 30 (FIG. 5: step S511).

Upon receiving the controlled-device registration password obtaining response <R-3R> (FIG. 4: step S408), the service server 30 transmits, as a controlled-device registration response <R-4>, the controlled-device registration password and the validity period information contained in the controlled-device registration password obtaining response <R-3R> to the mobile phone 10 (FIG. 4: step S409).

Upon receiving the controlled-device registration response <R-4> (FIG. 3: step S303), the mobile phone 10 stores the controlled-device registration password and the validity period information, which are contained therein, in the storage unit 11 (FIG. 3: step S304).

Through the processing described above, processing for registering a controlling-device/service management ID with respect to a combination of the mobile phone 10 and a service and processing for issuing a controlled-device registration password used for associating a controlled device with a controlling device are completed.

[1-2. Registration of Controlled Device]

An operation for registering the DVR 20, which serves as a controlled device, will be described next.

Before use by a user, the DVR 20 authenticates itself with the direct-access management server 40, as follows.

First, the DVR 20 checks the value of an automatic connection flag (FIG. 6: step S601). Before the controlled device is registered with the direct-access management server 40, the value of the automatic connection flag is off. In this case, the DVR 20 transmits a device authentication request <R-0> containing pre-set authentication system information and device authentication information to the SOAP server 42 in the direct-access management server 40 (FIG. 6: step S602).

Upon receiving the device authentication request <R-0> from the DVR 20 (FIG. 5: step S513), the SOAP server 42 in the direct-access management server 40 determines whether or not the DVR 20 is an authorized device based on the authentication system information and the device authentication information which are contained in the device authentication request <R-0> (FIG. 5: step S514). When it is determined that the DVR 20 is an unauthorized device, e.g., when the authentication system is different from a predetermined authentication system or when the device authentication information has a format that is different from a predetermined authentication system, the SOAP server 42 transmits, as a device authentication response <R-0R>, an error code indicating the failure of the device authentication to the DVR 20 (FIG. 5: step S515). When it is determined that the DVR 20 is an authorized device, i.e., when the authentication system matches a predetermined authentication system and the device authentication information has a predetermined authentication system format, the SOAP server 42 generates a device authentication continuation ID to be assigned to the DVR 20 (FIG. 5: step S516). The SOAP server 42 then stores the device authentication continuation ID in the storage unit 41 in association with the device authentication information contained in the device authentication request <R-0> (FIG. 5: step S517). Thereafter, the SOAP server 42 transmits a device authentication response <R-0R> containing the generated device authentication continuation ID and its validity period information to the DVR 20 (FIG. 5: step S518). The device authentication continuation ID is identification information assigned to a device that has completed its device authentication with the direct-access management server 40. The identification information allows the direct-access management server 40 to check the device authentication state of the DVR 20, which serves as a controlled device.

Upon receiving the device authentication response <R-0R> containing the device authentication continuation ID and the validity period information from the SOAP server 42 in the direct-access management server 40 (FIG. 6: step S603), the DVR 20 stores the device authentication continuation ID and the validity period information, which are contained in the device authentication response <R-0R>, in the storage unit 21 in association with the device authentication information (FIG. 6: step S604).

Thereafter, the DVR 20 determines whether or not a controlled-device registration password is registered in the storage unit 21 (FIG. 6: step S605). When no controlled-device registration password is stored, the operation is terminated, and when a controlled-device registration password is stored, the process proceeds to step S609. Since no controlled-device registration password is stored immediately after the device authentication continuation ID is obtained, the operation is terminated in this case. In the manner described above, the DVR 20, which serves as a controlled device, stores a combination of the device authentication continuation ID, the validity period information of the device authentication continuation ID, and the device authentication information in the storage unit 21, and the direct-access management server 40 stores a combination of the device authentication continuation ID and the device authentication information in the storage unit 41.

[1-3. Linking of Controlling-Device/Service Management ID and Controlled-Device Management ID]

Next, the operation of associating the controlling-device/service management ID and the controlled-device management ID and registering the associated IDs with the direct-access management server 40 is performed. At the mobile phone 10, a one-time password transmission request is input from the user (FIG. 3: step S305). Upon receiving the one-time password transmission request from the user, the mobile phone 10 uses the interface [IF-03], such as an infrared interface or a USB interface, to transfer, as a one-time password <R-5>, the controlled-device registration password stored in the storage unit 11 to the DVR 20, which serves as a controlled device (FIG. 3: step S306). Other possible methods for transferring the controlled-device registration password include various systems, such as transfer via a contactless IC card and wireless transmission using a Bluetooth (trademark), wireless LAN, or the like. Any transfer method, however, may be used as long as the controlled-device registration password can be transferred from the mobile phone 10, which serves as a controlling device, to the DVR 20, which serves as a controlled device. Thereafter, the mobile phone 10 deletes the controlled-device registration password from the storage unit 11 (FIG. 3: step S307).

Upon receiving the controlled-device registration password <R-5> from the mobile phone 10 (FIG. 6: step S607), the DVR 20 stores the received controlled-device registration password in the storage unit 21 (FIG. 6: step S608). Subsequently, the DVR 20 transmits a controlled-device registration request <R-6> containing the device authentication continuation ID, stored in the storage unit 21, and the controlled-device registration password, received from the mobile phone 10, to the SOAP server 42 in the direct-access management server 40 (FIG. 6: step S609). In this manner, the DVR 20 issues, to the direct-access management server 40, a request for registration in association with the mobile phone 10 that has transmitted the controlled-device registration password.

Upon receiving the controlled-device registration request <R-6> from the DVR 20 (FIG. 5: step S519), the SOAP server 42 in the direct-access management server 40 checks whether or not the device authentication continuation ID contained in the controlled-device registration request <R-6> matches what is stored in the storage unit 41 and also checks the validity period of the device authentication continuation ID (FIG. 5: step S520). When it is determined to be NG in the checking operations, i.e., when the device authentication continuation ID does not match or when the validity period of the device authentication continuation ID has expired, the SOAP server 42 transmits a controlled-device registration response <R-6R> containing an error code indicating the requirement of device authentication to the DVR 20 (FIG. 5: step S528). When the DVR 20 receives the controlled-device registration response <R-6R> containing the error code (FIG. 6: step S622), the process returns to step S602 and the processing for the device authentication is repeated.

When the result of the checking in step S520 is OK, i.e., when the device authentication continuation ID matches what is stored in the storage unit 41 and the validity period of the device authentication continuation ID has not expired, the SOAP server 42 checks whether or not the controlled-device registration password contained in the controlled-device registration request <R-6> received from the DVR 20 matches what is stored in the storage unit 41 and also checks the validity period of the controlled-device registration password (FIG. 5: step S521). When it is determined to be NG in the checking operations, i.e., when the controlled-device registration password does not match or when the validity period of the controlled-device registration password has expired, the SOAP server 42 transmits, as a controlled-device registration response <R-6R>, an error code indicating that the controlled-device registration password contained in the controlled-device registration request <R-6> is invalid to the DVR 20 (FIG. 5: step S527). Upon receiving the error code as the controlled-device registration response <R-6R> (FIG. 6: step S620), the DVR 20 displays an error message to the user (FIG. 6: step S621) through a TV screen or the like, which is connected to the DVR 20, so that a controlled-device registration password is to be obtained again, and the finishes the processing.

When the result of the checking in step S521 is OK, i.e., when the controlled-device registration password matches what is stored in the storage unit 41 and the validity period of the controlled-device registration password has not expired, the SOAP server 42 refers to information stored in the storage unit 41 to determine whether or not a controlled-device management ID is assigned to the device authentication continuation ID contained in the controlled-device registration request <R-6> (FIG. 5: step S521-1). When a controlled-device management ID corresponding to the device authentication continuation ID has not been assigned yet, the SOAP server 42 assigns a controlled-device management ID to the DVR 20 (FIG. 5: step S522) and stores the assigned controlled-device management ID in the storage unit 41 in association with the device authentication information and the device authentication continuation ID of the DVR 20 (FIG. 5: step S523). When a controlled-device management ID has already been assigned to the device authentication continuation ID contained in the controlled-device registration request <R-6>, the SOAP server 42 stores the controlled-device management ID in the storage unit 41 in association with the controlling-device/service management ID that is stored in the storage unit 41 in association with the controlled-device registration password (FIG. 5: step S523-1). The controlled-device management ID in this case refers to identification information uniquely assigned, in the direct-access management server 40, to a controlled device. In the manner described above, the controlling-device/service management ID assigned to a combination of the controlling device and a service and the controlled-device management ID assigned to the controlled device are linked. In this linking, multiple controlled-device management IDs may be linked to one controlling-device/service management ID or, conversely, multiple controlling-device/service management IDs may be linked to one controlled-device management ID.

Next, the SOAP server 42 transmits, as a controlled-device registration response <R-6R>, the number of services whose linking operations are already completed to the DVR 20 (FIG. 5: step S524). Next, the SOAP server 42 transmits, to the service server 30, a controlled-device registration completion notification <R-7> containing the service ID, the controlling-device/service management ID, and the controlled-device registration password which are stored in the storage unit 41 (FIG. 5: step S525). Thereafter, the SOAP server 42 deletes the controlled-device registration password in the storage unit 41 (FIG. 5: step S526) and finishes the processing. Upon receiving the controlled-device registration completion notification <R-7> from the SOAP server 42 (FIG. 4: step S410), the service server 30 issues a notification indicating that the controlled-device registration is completed to the mobile phone 10 (FIG. 4: step S411). Examples of a method for causing the service server 30 to issue the notification indicating the completion of the controlled-device registration to the mobile phone 10 include electronic mail and an application prepared for communicating with the mobile phone 10 by using another method.

Upon receiving, as the controlled-device registration response <R-6R>, the number of services whose linking operations are already completed from the SOAP server 42 (FIG. 6: step S610), the DVR 20 turns on an automatic connection flag (FIG. 6: step S611) and displays a message indicating that the controlled-device registration has been completed (FIG. 6: step S612). Subsequently, the DVR 20 deletes the controlled-device registration password stored in the storage unit 21 (FIG. 6: step S613). Thereafter, in order to establish an always-on connection session with the XMPP server 43 of the direct-access management server 40, the DVR 20 transmits an XMPP login information obtaining request <D-0-1> containing the device authentication continuation ID to the SOAP server 42 in the direct-access management server 40 (FIG. 6: step S614).

[2. XMPP Login of Controlled Device]

In this network system, the direct-access management server 40 has the XMPP server 43 for establishing a two-way always-on connection session with a controlled device. In order for the mobile phone 10, which serves as a controlling device, to access the DVR 20, which serves as a controlled device, through a network, the DVR 20 logs in on the XMPP server 43 in advance to establish an always-on connection session with the XMPP server 43. Thus, the service server 30 and the mobile phone 10 can obtain necessary information from the DVR 20, when required. In order to simplify the design of the service server 30 in this case, an XMPP protocol is incorporated into the direct-access management server 40 and the DVR 20 so that only the use of a SOAP interface allows information to be exchanged with the XMPP server 43 that establishes a two-way always-on connection session with the DVR 20.

Figure 10:
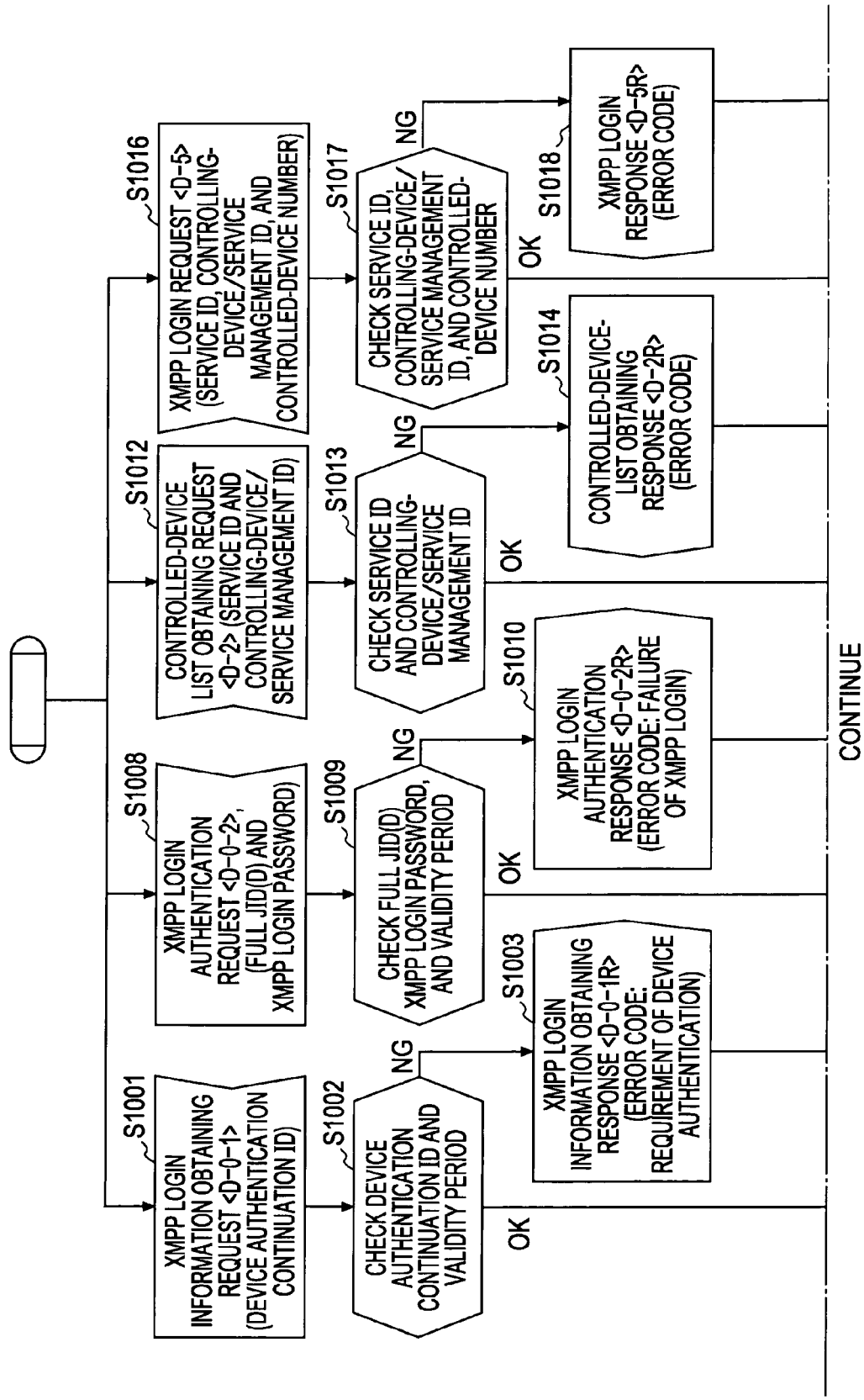
FIG. 10 is a flow chart showing the operation of the direct-access management server with respect to controlled-device XMPP login, remote video-recording reservation, and content acquirement.

A part of FIG. 7 is a sequence diagram showing the flow of information related to XMPP login of a controlled device, and a part of FIG. 10 is a flow chart showing the operation of the direct-access management server 40 with respect to the XMPP login of the controlled device.

As shown in these figures, upon receiving the XMPP login information obtaining request <D-0-1> containing the device authentication continuation ID from the DVR 20 (FIG. 10: step S1001), the direct-access management server 40 checks the device authentication continuation ID and the device-authentication-continuation-ID validity period which are contained in the XMPP login information obtaining request <D-0-1> (FIG. 10: step S1002). In this checking, when the device authentication continuation ID contained in the XMPP login information obtaining request <D-0-1> does not match what is stored in the storage unit 41 of the direct-access management server 40 or when the validity period has expired, this means that the DVR 20 is not properly registered with the direct-access management server 40 or the DVR 20 was registered in the past but the validity period of the device authentication continuation ID during the registration has expired. Thus, the direct-access management server 40 transmits, as an XMPP login information obtaining response <D-0-1R>, an error code indicating that device authentication is required to the DVR 20 (FIG. 10: step S1003). When the device authentication continuation ID is stored in the storage unit 41 and the validity period of the device authentication continuation ID has not expired, the direct-access management server 40 searches the storage unit 41 for a controlled-device management ID and device authentication information which are linked with the device authentication continuation ID (FIG. 10: step S1004). Based on the controlled-device management ID and the device authentication information, the DVR 20 generates a full JID(D) that is an XMPP login ID required for logging in on the XMPP server 43, an XMPP login password, and the validity period information of the XMPP login password (FIG. 10: step S1005) and stores those pieces of information in the storage unit 41 (FIG. 10: step S1006). The direct-access management server 40 transmits, as an XMPP login information obtaining response <D-0-1R>, the generated full JID(D), the XMPP login password, and the validity period information, together with information of an XMPP address, a port number, authentication system information, and an SSL (secure socket layer) option, to the DVR 20 (FIG. 10: step S1007).

Upon receiving the XMPP login information obtaining response <D-0-1R> containing the full JID(D), the XMPP login password, and so on from the SOAP server 42 in the direct-access management server 40 (FIG. 6: step S615), the DVR 20 transmits an XMPP login authentication request <D-0-2> containing the full JID(D) and the XMPP login password to the XMPP server 43 in the direct-access management server 40 (FIG. 6: step S616).

Upon receiving the XMPP login authentication request <D-0-2> from the DVR 20 (FIG. 10: step S1008), the XMPP server 43 in the direct-access management server 40 checks the full JID(D), the XMPP login password, and the XMPP-login-password validity period which are contained in the XMPP login authentication request <D-0-2> (FIG. 10: step S1009). When the full JID(D) does not match what is stored in the storage unit 41, when the XMPP login password does not match what is stored in the storage unit 41, or when the XMPP-login-password validity period has expired, the XMPP server 43 transmits, as an XMPP login authentication response <D-0-2R>, an error code indicating the failure of the XMPP login to the DVR 20 (FIG. 10: step S1010). When all of the checking operations of the full JID(D), the XMPP login password, and the validity period are OK, the XMPP server 43 in the direct-access management server 40 transmits, as an XMPP login authentication response <D-0-2R>, a code indicating the permission of the XMPP login to the DVR 20 (FIG. 10: step S1011).

When the DVR 20 receives, as the XMPP login authentication response <D-0-2R>, the error code indicating the failure of the XMPP login from the direct-access management server 40 (FIG. 6: step S619), the process returns to S614 and the DVR 20 re-issues a request for obtaining XMPP login information. That is, since there is a possibility that the validity period of the XMPP login password has expired, the DVR 20 performs processing for issuing a request for obtaining XMPP login information again. Upon receiving, as the XMPP login authentication response <D-0-2R>, the code indicating the permission of the XMPP login from the direct-access management server 40 (FIG. 6: step S618), the DVR 20 completes the XMPP login processing.

When the DVR 20 receives, as the XMPP login information obtaining response <D-0-1R>, the error code indicating the device authentication is required from the SOAP server 42 in the direct-access management server 40 (FIG. 6: step S617), there is a possibility that the DVR 20 is not properly stored in the direct-access management server 40 or the validity period of the device authentication continuation ID has expired. Thus, the DVR 20 re-transmits the device authentication request <R-0> containing the device authentication information and authentication system information preset in the DVR 20 to the SOAP server 42 in the direct-access management server 40 to redo the device authentication of the DVR 20 (FIG. 6: step S602).

Figures 23, 24, 25:
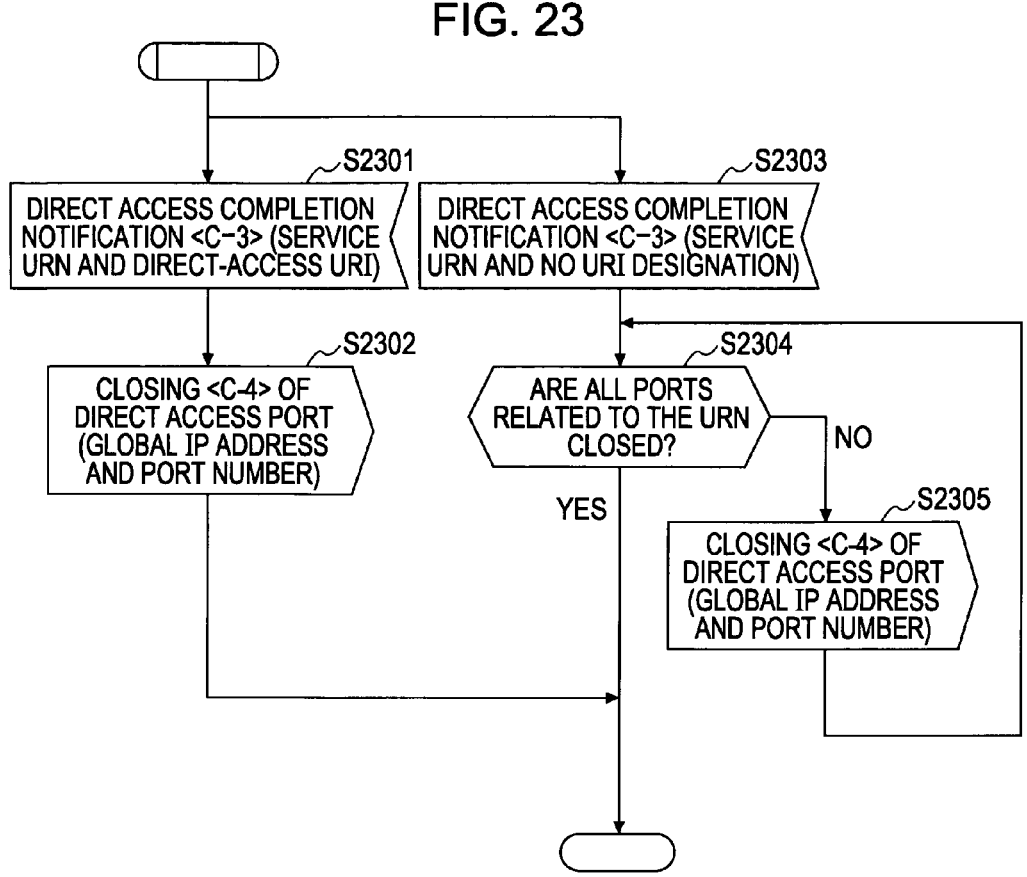
FIG. 23 is a flow chart showing the operation of the DVR when the direct access is completed.
FIG. 24 is a diagram showing a structure of a full JID.
FIG. 25 is a diagram showing another structure of the full JID.

As described above, in this network system, the direct-access management server 40 generates the XMPP login ID (full JID(D)) and the XMPP login password which are required for the DVR 20 to log in on the XMPP server 43 and transmits the generated ID and password to the DVR 20. For example, as shown in FIG. 24, the full JID(D) is constituted by a bare JID portion and a resource portion. The controlled-device management ID assigned to the controlled device is used for the bare JID portion and a product code and a serial number obtained from the device authentication information are used for the resource portion. As shown in FIG. 25, the controlling-device/service management ID for identifying a combination of a controlling device and a service may be used for the resource portion.

With the automatic connection flag being turned on in step S611, when the DVR 20 is connected next time, for example, when the DVR 20 is powered off and then powered on or when the DVR 20 disconnects a session with the XMPP server 43 and then re-establishes the connection, the DVR 20 checks the automatic connection flag in step S601 and then starts processing from the transmission of the XMPP login information obtaining request <D-0-1> in step S614. That is, during the re-connection, the DVR 20 skips processing for device authentication, processing for obtaining a controlled-device registration password from the mobile phone 10, and processing for controlled-device registration, and enters processing for XMPP login. Thus, during re-connection, the DVR 20 can establish a connection session with the XMPP server 43 by only performing processing for XMPP login.

Through the processing described above, processing for associating the DVR 20, which serves as a controlled device, as a target to be controlled by the mobile phone 10, which servers as a controlling device, is completed. Specific processing between two associated devices, i.e., processing in which the mobile phone 10 controls the DVR 20, will be described below.

[3. Remote Video-Recording Reservation]

The operation of performing remote video-recording reservation on the DVR 20 will be described.

Figure 8:
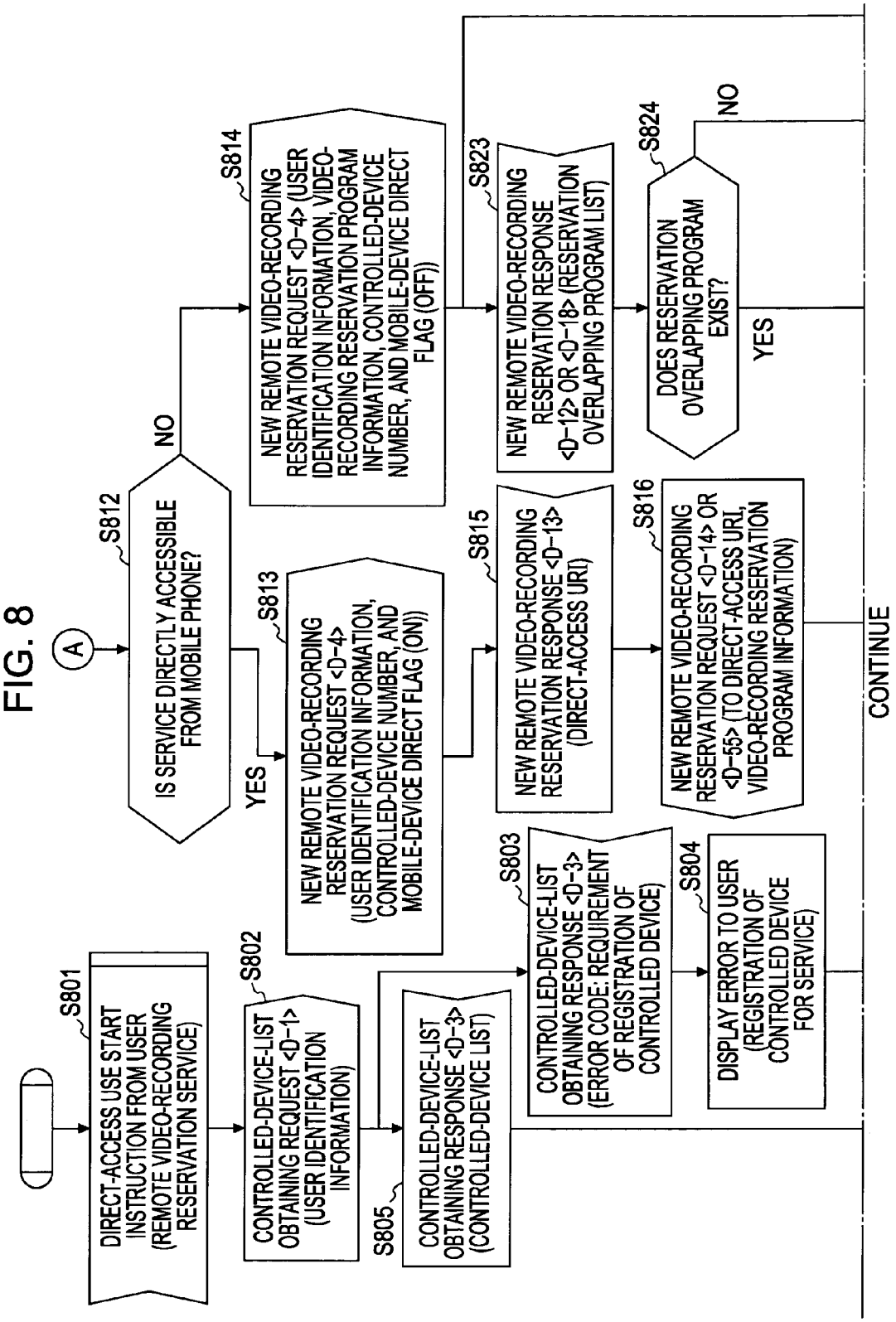
FIG. 8 is a flow chart showing the operation of the mobile phone with respect to remote video-recording reservation.
Figure 9:
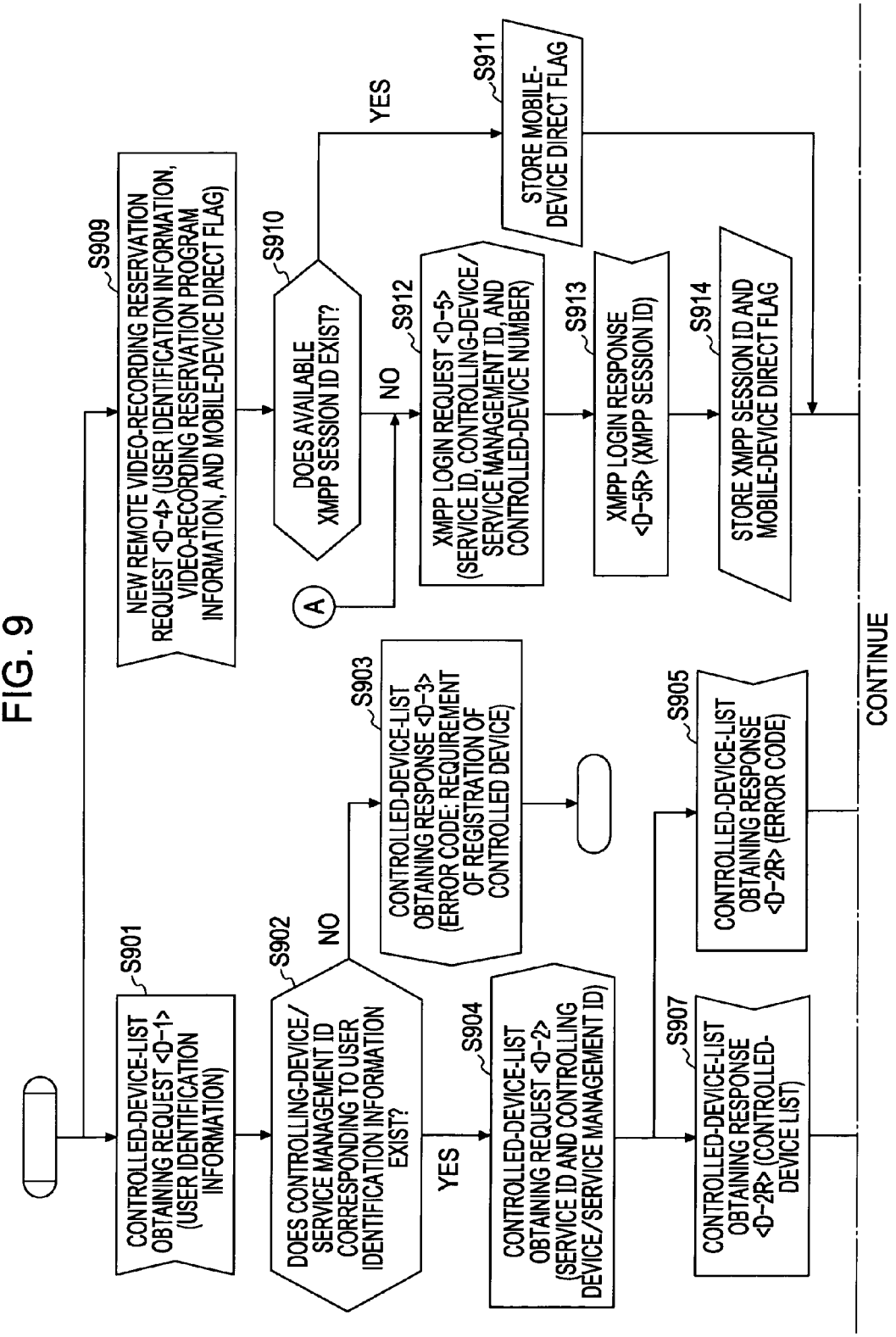
FIG. 9 is a flow chart showing the operation of a service server with respect to the remote video-recording reservation.
Figure 9:
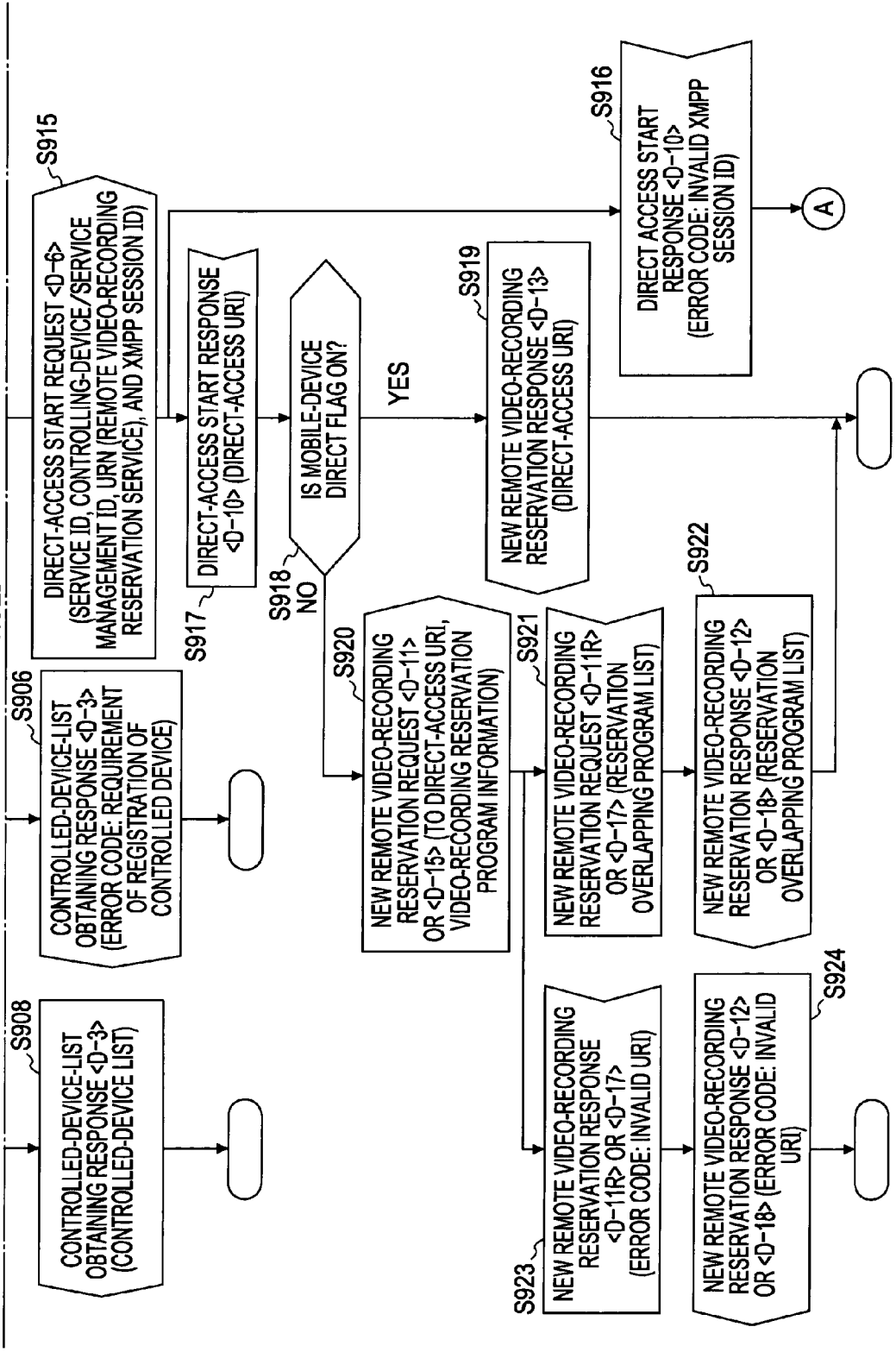
Figure 11:
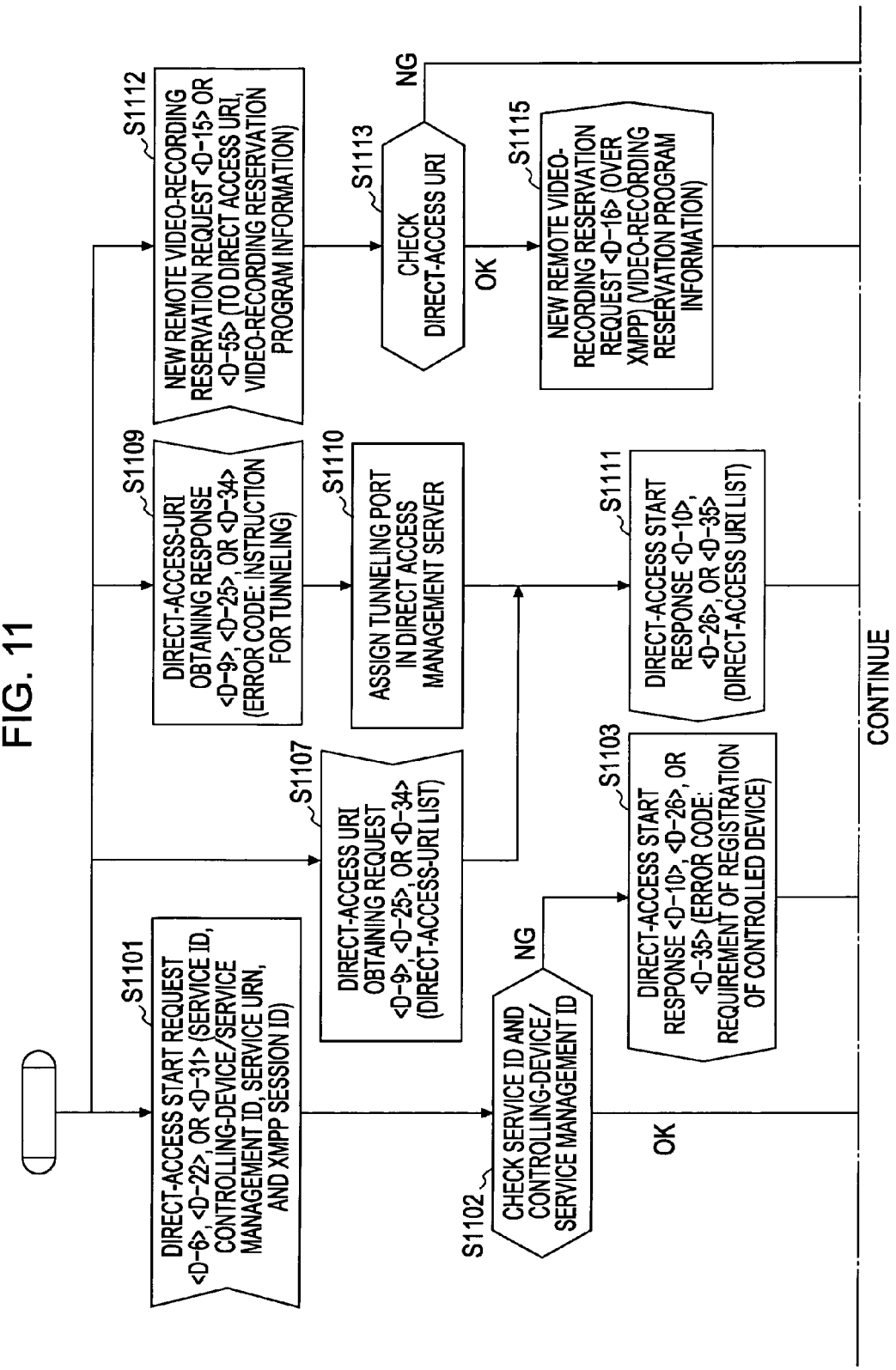
FIG. 11 is a flow chart showing the operation of the direct-access management server with respect to the remote video-recording reservation and content acquirement.
Figure 12:
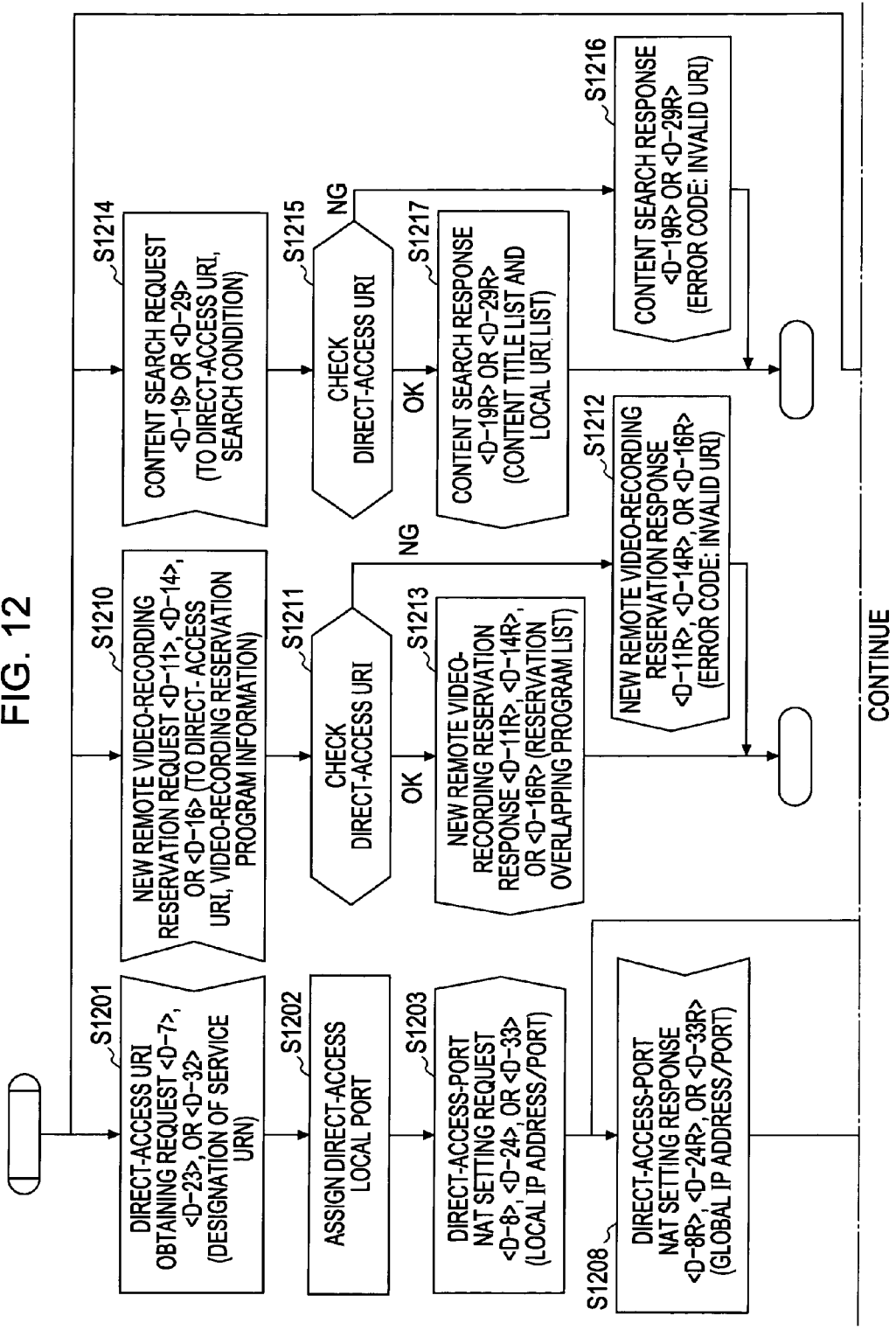
FIG. 12 is a flow chart showing the operation of a DVR with respect to the remote video-recording reservation and content acquirement.
Figure 12:
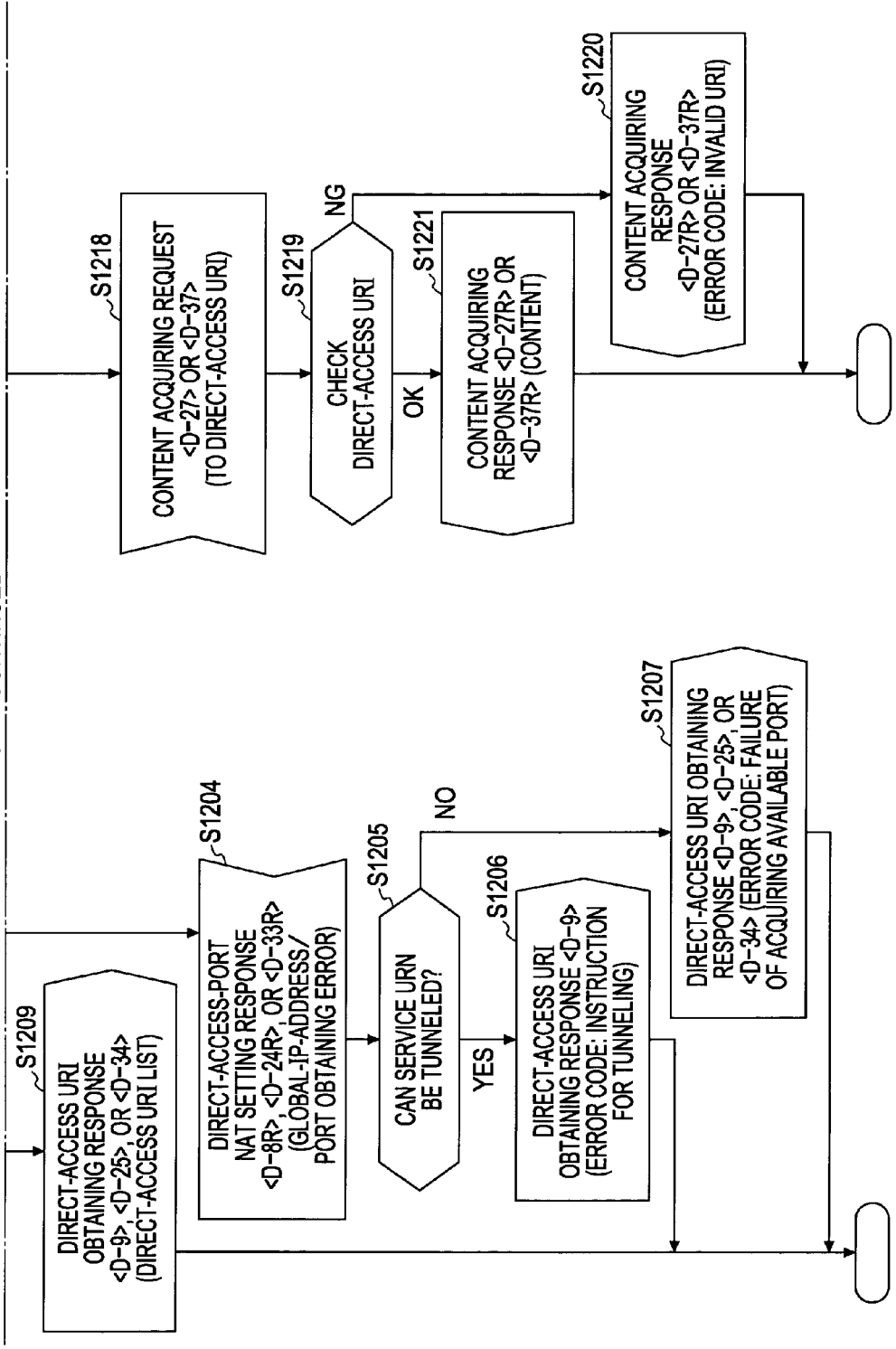

A part of FIG. 7 is a sequence diagram showing the flow of information during remote video-recording reservation. FIG. 8 is a flow chart showing the operation of the mobile phone 10 with respect to the remote video-recording reservation. FIG. 9 is a flow chart showing the operation of the service server 30 with respect to the remote video-recording reservation. FIGS. 10 and 11 are flow charts showing the operation of the direct-access management server 40 with respect to the remote video-recording reservation and content acquirement. FIG. 12 is a flow chart showing the operation of the DVR 20 with respect to the remote video-recording reservation and the content acquirement.

When the user of the mobile phone 10 gives a direct-access use start instruction to the mobile phone 10 in order to receive a remote video-recording reservation service (FIG. 8: step S801), the mobile phone 10 transmits a controlled-device-list obtaining request <D-1> containing the user identification information preset in the mobile phone 10 to the service server 30 (FIG. 8: step S802).

Upon receiving the controlled-device-list obtaining request <D-1> from the mobile phone 10 (FIG. 9: step S901), the service server 30 determines whether or not a controlling-device/service management ID corresponding to the user identification information contained in the controlled-device-list obtaining request <D-1> is stored in the storage unit 31 (FIG. 9: step S902). When a controlling-device/service management ID corresponding to the user identification information is not stored in the storage unit 31, the service server 30 transmits, as a controlled-device-list obtaining response <D-3>, an error code indicating that controlled-device registration is required to the mobile phone 10 (FIG. 9: step S903). When a controlling-device/service management ID corresponding to the user identification information is stored in the storage unit 31, the service server 30 transmits a controlled-device-list obtaining request <D-2> containing the controlling-device/service management ID and a service ID, which is information for identifying a service, to the direct-access management server 40 (FIG. 9: step S904) in order to obtain a list of controlled devices associated with the controlling-device/service management ID managed by the direct-access management server 40.

Upon receiving the controlled-device-list obtaining request <D-2> from the service server 30 (FIG. 10: step S1012), the direct-access management server 40 determines whether or not a combination of the service ID and the controlling-device/service management ID which are contained in the controlled-device-list obtaining request <D-2> is stored in the storage unit 41 (FIG. 10: step S1013). If the combination is not stored, the direct-access management server 40 transmits, as a controlled-device-list obtaining response <D-2R>, an error code indicating the combination is not registered to the service server 30 (FIG. 10: step S1014). Upon receiving, as the controlled-device-list obtaining response <D-2R>, the error code indicating the combination is not registered from the direct-access management server 40 (FIG. 9: step S905), the service server 30 transmits, as a controlled-device-list obtaining response <D-3>, an error code indicating that controlled-device registration is required to the mobile phone 10 (FIG. 9: step S906). When the mobile phone 10 receives, as the controlled-device-list obtaining response <D-3>, the error code from the service server 30 (FIG. 8: step S803), it displays an error message indicating that the registration of a controlled device for the service is required to the user via the display unit (FIG. 8: step S804).

When it is determined in step S1013 that the combination of the service ID and the controlling-device/service management ID contained in the controlled-device-list obtaining request <D-2> is stored in the storage unit 41, the direct-access management server 40 generates, as a controlled-device list, a list containing numbers re-assigned for the controlled-device management IDs of controlled devices controllable by the mobile phone 10, device names contained in the device authentication information of the controlled devices, and so on in accordance with the linking contents of the controlling-device/service management ID and the controlled-device management ID which are stored in the storage unit 41. The direct-access management server 40 then stores the controlled-device list in the storage unit 41 in association with controlling-device/service management ID and transmits a controlled-device-list obtaining response <D-2R> containing the controlled-device list to the service server 30 (FIG. 10: step S1015). When the service server 30 receives the controlled-device-list obtaining response <D-2R> containing the controlled-device list from the direct-access management server 40 (FIG. 9: step S907), it transmits a controlled-device-list obtaining response <D-3> containing the controlled-device list to the mobile phone 10 (FIG. 9: step S908).

When the mobile phone 10 receives the controlled-device-list obtaining response <D-3> containing the controlled-device list (FIG. 8: step S805), it determines whether or not multiple controlled-device numbers exist in the controlled-device list (FIG. 8: step S806). When multiple controlled-device numbers exist, the mobile phone 10 displays the contents of the controlled-device list on the display unit (FIG. 8: step S807), prompts the user to select one of the controlled-device numbers (FIG. 8: step S808), and stores the selected controlled-device number in the storage unit 11 (FIG. 8: steps S809 and S811). When multiple controlled devices do not exist, the number of the one controlled device is stored in the storage unit 11 (FIG. 8: steps S810 and S811).

Next, the mobile phone 10 branches the process, depending on whether or not a service to be used (i.e., remote video-recording reservation) is a service that is directly accessible from the mobile phone 10 to the controlled device (FIG. 8: step S812). When the mobile phone 10 is to use a service that is directly accessible, the mobile phone 10 transmits a new remote video-recording reservation request <D-4> containing the user identification information, the controlled-device number, and the mobile-device direct flag (on) which are stored in the storage unit 11 to the service server 30 (FIG. 8: step S813). When a service that is directly accessible from the mobile phone 10 is to be used, the value of the mobile-device direct flag is set to be on, and when a service that is not directly accessible from the mobile phone 10 is used, the value of the mobile-device direct flag is set to be off. Thus, when the mobile phone 10 is to use a service that is not directly accessible, the mobile phone 10 transmits a new remote video-recording reservation request <D-4> containing the user identification information, video-recording reservation program information, the controlled-device number, and the mobile-device direct flag (off) to the service server 30 (FIG. 8: step S814). The video-recording reservation program information is constituted by, for example, video-recording start time, the length of a program, a broadcast type, a channel, a forced reservation flag, and so on.

Upon receiving the new remote video-recording reservation request <D-4> from the mobile phone 10 (FIG. 9: step S909), the service server 30 checks whether or not an available XMPP session ID, i.e., an ID for identifying a connection session established with the XMPP server 43, is stored in the storage unit 31 in association with the user identification information of the mobile phone 10 (FIG. 9: step S910), the user identification information being contained in the new remote video-recording reservation request <D-4>. When an available XMPP session ID is not stored, the service server 30 transmits an XMPP login request <D-5> containing the service ID, the controlling-device/service management ID, and the controlled-device number to the direct-access management server 40 (FIG. 9: step S912) in order to establish an XMPP session with the XMPP server 43.

Upon receiving the XMPP login request <D-5> from the service server 30 (FIG. 10: step S1016), the direct-access management server 40 determines whether or not a combination of the service ID, the controlling-device/service management ID, and the controlled-device number which are contained in the XMPP login request <D-5> is stored in the storage unit 41 (FIG. 10: step S1017). When the combination is not stored, the direct-access management server 40 transmits, as an XMPP login response <D-5R>, an error code indicating that a controlled device for the corresponding service does not exist to the service server 30 (FIG. 10: step S1018). Thereafter, the operation of the direct-access management server 40 ends. When a controlled device for the corresponding service is stored in the storage unit 41, the direct-access management server 40 generates an XMPP session ID and stores the generated XMPP session ID in the storage unit 41 in association with the service ID, the controlling device/service management ID, and the controlled-device number (FIG. 10: step S1019). The direct-access management server 40 then transmits an XMPP login response <D-5R> containing the XMPP session ID to the service server 30 (FIG. 10: step S1020).

Upon receiving the XMPP login response <D-5R> containing the XMPP session ID from the direct-access management server 40 (FIG. 9: step S913), the service server 30 stores the XMPP session ID contained in the XMPP login response <D-5R> and the value of the mobile-device direct flag contained in the new remote video-recording reservation request <D-4> issued in step S909 in the storage unit 31 in association with the service ID, the controlling-device/service management ID, and the controlled-device list number (FIG. 9: step S914).

On the other hand, when the result of the determination performed by the service server 30 in step S910 indicates that an available XMPP session ID is already stored in the storage unit 31, the service server 30 stores the value of the mobile-device direct flag contained in the new remote video-recording reservation request <D-4> in the storage unit 31 in association with the service ID, the controlling-device/service management ID, and the controlled-device number (FIG. 9: step S911).

After the mobile-device direct flag is stored in step S911 or step S914, the service server 30 transmits a direct-access start request <D-6> containing the service ID, the controlling-device/service management ID, a service URN (uniform resource name), and the XMPP session ID to the direct-access management server 40 (FIG. 9: step S915). The service URN in this case is information for specifying one of services (applications) that can be provided by a controlled device. In this case, since the mobile phone 10 is to perform remote video-recording reservation on the DVR 20, the service URN is information specifying a remote video-recording reservation service.

Upon receiving the direct-access start request <D-6> from the service server 30 (FIG. 11: step S1011), the direct-access management server 40 determines whether or not a combination of the service ID and the controlling-device/service management ID which are contained in the direct-access start request <D-6> is stored in the storage unit 41 (FIG. 11: step S1102). When the combination is not stored, the direct-access management server 40 transmits, as a direct-access start response <D-10>, an error code indicating that controlled-device registration is required to the service server 30 (FIG. 11: step S1103). When the combination of the service ID and the controlling-device/service management ID contained in the direct-access start request <D-6> is stored in the storage unit 41, the direct-access management server 40 determines whether or not the XMPP session ID contained in the direct-access start request <D-6> is stored in the storage unit 41 in association with the combination of the service ID and the controlling-device/service management ID contained in the direct-access start request <D-6> (FIG. 11: step S1104). When the XMPP session ID is not stored, the direct-access management server 40 transmits, as a direct-access start response <D-10>, an error code indicating that the XMPP session ID is invalid to the service server 30 (FIG. 11: step S1105). When the service server 30 receives, as the direct-access start response <D-10>, the error code indicating that the XMPP session ID is invalid from the direct-access management server 40 (FIG. 9: step S916), the process returns to step S912 and the service server 30 transmits an XMPP login request <D-5> to the direct-access management server 40 to re-establish an XMPP session.

When it is determined in step S1104 that the XMPP session ID contained in the direct-access start request <D-6> is stored in the storage unit 41 in association with the combination of the service ID and the controlling-device/service management ID contained in the direct-access start request <D-6>, the direct-access management server 40 transmits a direct-access URI obtaining request <D-7> to the DVR 20, which serves as a controlled device, through the always-on connection session established between the XMPP server 43 and the DVR 20 (FIG. 11: step S1106). The direct-access URI obtaining request <D-7> contains designation information of the service URN specified by the direct-access start request <D-6>, the service URN being information for identifying the service.

Upon receiving the direct-access URI obtaining request <D-7> containing the designation information of the service URN from the direct-access management server 40 (FIG. 12: step S1201), the DVR 20 assigns a direct-access local port (FIG. 12: step S1202). Next, the DVR 20 transmits, to the router 50, a NAT (network address translation) setting request <D-8> for a direct-access port. The NAT setting request <D-8> contains a local IP address pre-assigned to the DVR 20 and the port number of the direct-access local port. The DVR 20 then issues, to the router 50, a request for mapping a port number and a global IP address accessible from the Internet to the port number and the local IP address (FIG. 12: step S1203). For example, in order to assign a direct-access URI, the DVR 20 accesses the router 50 based on a UPnP IGD DCP (device control protocol) or the like to pre-obtain a port number and an global IP address accessible from the Internet.

When the DVR 20 receives, as a NAT setting response <D-8R>, a global IP address and a port number associated with the local IP address and the port number of the DVR 20 from the router 50 (FIG. 12: step S1208) in response to the direct-access-port NAT setting request <D-8> transmitted in step S1203, the DVR 20 uses the global IP address and the port number to create a direct-access URI list and transmits, as a direct-access URI obtaining response <D-9>, the direct-access URI list to the direct-access management server 40 (FIG. 12: step S1209). The direct-access URI list refers to a URI list for directly accessing from the service server 30 or the mobile phone 10 to a corresponding device through the network.

Upon receiving the direct-access URI list as the direct-access URI obtaining response <D-9> (FIG. 11: step S1107), the XMPP server 43 of the direct-access management server 40 transmits, as a direct-access start response <D-10>, the direct-access URI list to the service server 30 (FIG. 11: step S1111).

When the DVR 20 receives, as a direct-access port NAT setting response <D-8R>, a global-IP-address and port-number obtaining error from the router 50 (FIG. 12: step S1204), the DVR 20 determines whether or not the service URN can be tunneled (FIG. 12: step S1205) based on the service-URN designation information obtained in step S1201. In this case, specific services of services provided are pre-determined as services that can be tunneled. For example, a service having a relatively small amount of data to be communicated, such as a remote video-recording service, is determined as a service that can be tunneled, and a service having a relatively large amount of data to be communicated, such as a content acquiring service, is determined as a service that cannot be tunneled. Thus, when it is determined that the service-URN designation information contained in the direct-access URI obtaining request <D-7> indicates a new remote video-recording reservation, the DVR 20 transmits, as a direct-access URI obtaining response <D-9>, an error code that gives an instruction for tunneling to the direct-access management server 40 (FIG. 12: step S1206). The tunneling designation is performed by, for example, filling all address portions of a direct-access URI with "0s".

When the XMPP server 43 of the direct-access management server 40 receives, as the direct-access URI obtaining response <D-9>, the error code that gives an instruction for tunneling (FIG. 11: step S1109), the XMPP server 43 assigns a tunneling port in the direct-access management server 40 (FIG. 11: step S1110), uses the port number of the assigned tunneling port in the direct-access management server 40 and the global IP address of the direct-access management server 40 to create a direct-access URI list, and transmits a direct-access start response <D-10> containing the direct-access URI list to the service server 30 (FIG. 11: step S1111). With this arrangement, the service server 30 and the mobile phone 10 can access the DVR 20 without being aware of the tunneling.

When it is determined in step S1205 that the service-URN designation information contained in the direct-access URI obtaining request <D-7> indicates a service URN that can be tunneled, the DVR 20 transmits, as a direct-access URI obtaining response <D-9>, an error code indicating the failure of acquiring an available port to the direct-access management server 40 (FIG. 12: step S1207).

Figure 19:
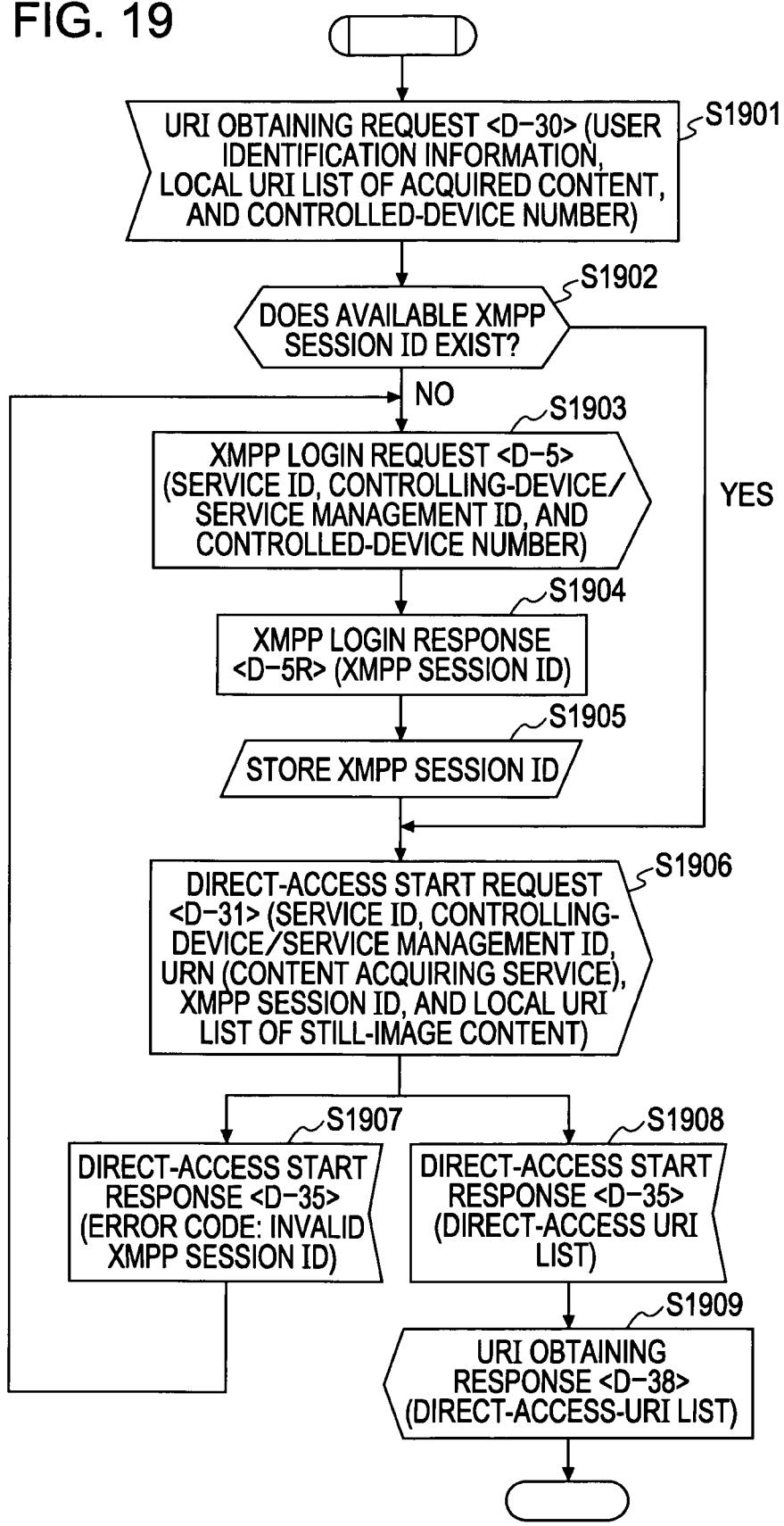
FIG. 19 is a flow chart showing the operation of the service server during the content acquirement.

Upon receiving the direct-access start response <D-10> containing the direct-access URI list from the direct-access management server 40 (FIG. 9: step S917), the service server 30 determines whether the mobile-device direct flag is on or off (FIG. 19: step S918). When the mobile-device direct flag is on, the service server 30 transmits a new remote video-recording reservation response <D-13> containing a direct-access URI to the mobile phone 10 (FIG. 9: step S919) in order to allow the mobile phone 10 to directly access a device specified by the direct-access URI. When the mobile-device direct flag is off, the service server 30 transmits a new remote video-recording reservation request containing the direct-access URI and the video-recording reservation program information, obtained from the new remote video-recording reservation request <D-4> transmitted from the mobile phone 10, to the direct-access URI (FIG. 9: step S920).

Some specific examples in which the mobile phone 10 issues a video-recording reservation request to the DVR 20 will be described below.

[3-1. Remote Video-Recording Reservation Using Proxy Access by Service Server 30: FIG. 7]

A description will be given of the operation of a case in which the service server 30 receives an instruction from the mobile phone 10 to perform remote video-recording reservation on the DVR 20 by proxy. A part of FIG. 7 is a sequence diagram showing the flow of information when the service server 30 that has received an instruction from the mobile phone 10 performs remote video-recording reservation on the DVR 20 by proxy.

In the flow of information between the mobile phone 10, the DVR 20, the service server 30, the direct-access management server 40, and the router 50, the processing of each device until the direct-access start response <D-10> is the same as the processing described above.

A case in which the service server 30 that has received an instruction from the mobile phone 10 performs remote video-recording reservation on the DVR 20 by proxy corresponds to a case in which it is determined in step S918 that the mobile-device direct flag is off and the URI transmitted, as the direct-access URI obtaining request <D-9>, from the DVR 20 in step S1209 is contained in the direct-access start response <D-10> received by the service server 30 in step S917. Since the service server 30 merely needs to access the direct-access URI received as the direct-access start response <D-10>, as described above, it is not particularly necessary to determine whether the direct-access URI corresponds to the DVR 20 or the tunneling of the direct-access management server 40.

The service server 30 accesses the address of the DVR 20, the address being included in the direct-access URI received in step S917 as the direct-access start response <D-10>, and transmits a new remote video-recording reservation request <D-11> containing the video-recording reservation program information obtained from the new remote video-recording reservation request <D-4> transmitted from the mobile phone 10 (FIG. 9: step S920).

Upon receiving the new remote video-recording reservation request <D-11> from the service server 30 (FIG. 12: step S1210), the DVR 20 checks the validity of the direct-access URI contained in the new remote video-recording reservation request <D-11> (FIG. 12: step S1211). When the direct-access URI is invalid, the DVR 20 transmits, as a new remote video-recording reservation response <D-11R>, an error code indicating so to the service server 30 (FIG. 12: step S1212). Examples of a method for checking the validity of the direct-access URI include a method in which a random number that cannot be easily reproduced is added during the issuance of the direct-access URI and it is checked whether or not the random number is included in the direct-access URI in the new remote video-recording reservation request <D-11>. When the direct-access URI is valid, the DVR 20 determines whether or not the video-recording date and time of a video-recording reservation requested by the service server 30 overlaps the video-recording data and time of an already scheduled video-recording reservation, based on the video-recording reservation program information. When there is no overlapping video-recording reservation, the DVR 20 makes a video-recording reservation based on the video-recording reservation program information and creates a reservation overlapping program list indicating that there is no reservation overlapping. When an overlapping video-recording reservation is found, the DVR 20 creates a reservation overlapping program list that contains video-recording date and time, a channel, a program title, and so on of the overlapping video-recording reservation. Thereafter, the DVR 20 transmits a new remote video-recording reservation response <D-11R> containing the reservation overlapping program list to the service server 30 (FIG. 12: step S1213).

Upon receiving the new remote video-recording reservation response <D-11R> (FIG. 9: step S921), the service server 30 transmits, as a new remote video-recording reservation response <D-12>, the reservation overlapping program list in the new remote video-recording reservation response <D-11R> to the mobile phone 10 (FIG. 9: step S922). When the service server 30 receives the invalid-URI error code as the new remote video-recording reservation response <D-11R> (FIG. 9: step S923), the service server 30 transmits, as a new remote video-recording reservation response <D-12>, the error code to the mobile phone 10 (FIG. 9: step S924).

When the mobile phone 10 receives the new remote video-recording reservation response <D-12> containing the reservation overlapping program list from the service server 30 (FIG. 8: step S823), the mobile phone 10 determines whether or not a reservation overlapping program exists based on the reservation overlapping program list (FIG. 8: step S824). When a reservation overlapping program exists, the mobile phone 10 displays the information of the reservation overlapping program to the user via the display unit (FIG. 8: step S825). When no reservation overlapping program exists, the mobile phone 10 displays a message indicating the success of the remote video-recording reservation to the user via the display unit (FIG. 8: step S826).

When the mobile phone 10 receives, as the new remote video-recording reservation response <D-12>, the invalid-URI error code from the service server 30 (FIG. 8: step S827), the mobile phone 10 displays an error message indicating the failure of the direct access to the user via the display unit (FIG. 8: step S828).

Figure 13:
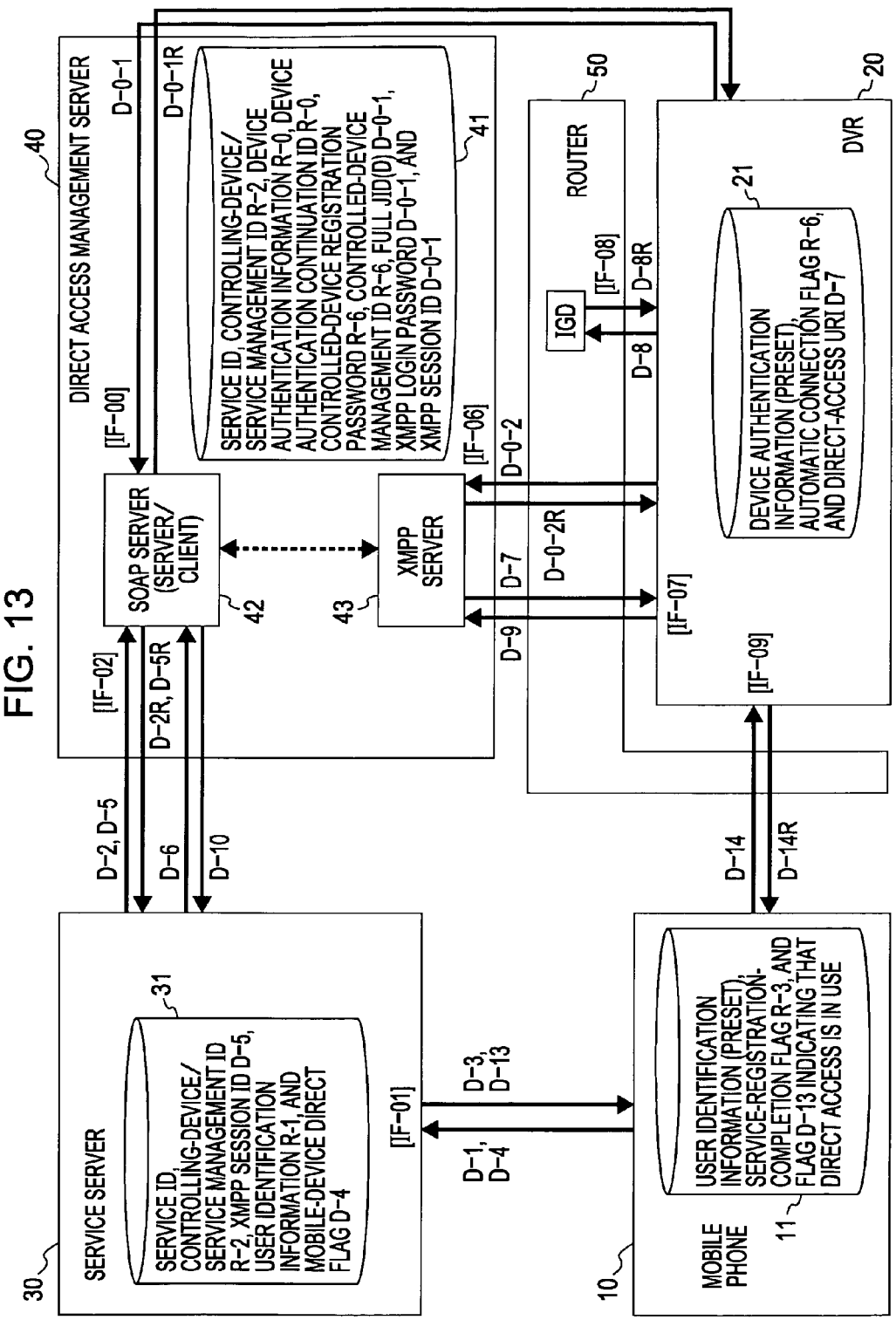
FIG. 13 is a sequence diagram showing the flow of information in the network system shown in FIG. 1 when the mobile phone directly makes a remote video-recording reservation.

[3-2. Remote Video-Recording Reservation Made Directly from Mobile Phone 10: FIG. 13]

Next, a description is given of the operation of a case in which the mobile phone 10 directly performs remote video-recording reservation on the DVR 20 without using the service server 30. FIG. 13 is a sequence diagram showing the flow of information when the mobile phone 10 directly performs remote video-recording reservation on the DVR 20.

Since the processing of each device until the direct-access start response <D-10> in the flow of information between the mobile phone 10, the DVR 20, the service server 30, the direct-access management server 40, and the router 50 shown in FIG. 13 is the same as the flow described with reference to FIG. 7, the description is omitted.

A case in which the mobile phone 10 directly performs remote video-recording reservation on the DVR 20 corresponds to a case in which it is determined in step S918 that the mobile-device direct flag is on and the URI transmitted, as the direct-access URI obtaining response <D-9>, from the DVR 20 in step S1209 is contained in the new remote video-recording reservation response <D-13> transmitted from the service server 30 to the mobile phone 10 in step S919. Since the mobile phone 10 merely needs to access the direct-access URI received as the new remote video-recording reservation response <D-13>, as described above, it is not particularly necessary to determine whether the direct-access URI corresponds to the DVR 20 or the tunneling of the direct-access management server 40.

When the mobile phone 10 receives the new remote video-recording reservation response <D-13> containing the direct-access URI from the service server 30 (FIG. 8: step S815), the mobile phone 10 accesses the address of the DVR 20, the address being included in the direct-access URI, and transmits a new remote video-recording reservation request <D-14> containing the direct-access URI and the video-recording reservation program information to the DVR 20 (FIG. 8: step S816).

Upon receiving the new remote video-recording reservation request <D-14> from the mobile phone 10 (FIG. 12: step S1210), the DVR 20 checks the validity of the direct-access URI contained in the new remote video-recording reservation request <D-14> (FIG. 12: step S1211). When the URI is invalid, the DVR 20 transmits, as a new remote video-recording reservation response <D-14R>, an error code indicating so to the mobile phone 10 (FIG. 12: step S1212). Examples of a method for checking the validity of the direct-access URI include a method in which a random number that cannot be easily reproduced is added during the issuance of the direct-access URI and it is checked whether or not the random number is included in the direct-access URI in the new remote video-recording reservation request <D-14>. When the URI is valid, the DVR 20 determines whether or not the video-recording date and time of a video-recording reservation requested by the mobile phone 10 overlaps the video-recording data and time of an already scheduled video-recording reservation, based on the video-recording reservation program information. When there is no overlapping video-recording reservation, the DVR 20 makes a video-recording reservation based on the video-recording reservation program information and creates a reservation overlapping program list indicating that there is no reservation overlapping. When an overlapping video-recording reservation is found, the DVR 20 creates a reservation overlapping program list that contains video-recording date and time, a channel, a program title, and so on of the overlapping video-recording reservation. Thereafter, the DVR 20 transmits a new remote video-recording reservation response <D-14R> containing the reservation overlapping program list to the mobile phone 10 (FIG. 12: step S1213).

Upon receiving the new remote video-recording reservation response <D-14R> (FIG. 8: step S817), the mobile phone 10 determines whether or not a reservation overlapping program exists based on the reservation overlapping program list (FIG. 8: step S818). When a reservation overlapping program exists, the mobile phone 10 displays the information of the reservation overlapping program to the user via the display unit (FIG. 8: step S819). When no reservation overlapping program exists, the mobile phone 10 displays a message indicating the success of the remote video-recording reservation to the user via the display unit (FIG. 8: step S820).

When the mobile phone 10 receives, as the new remote video-recording reservation response <D-14R>, the invalid-URI error code (FIG. 8: step S821), the mobile phone 10 displays an error message indicating the failure of the direct access to the user via the display unit (FIG. 8: step S822).

Figure 14:
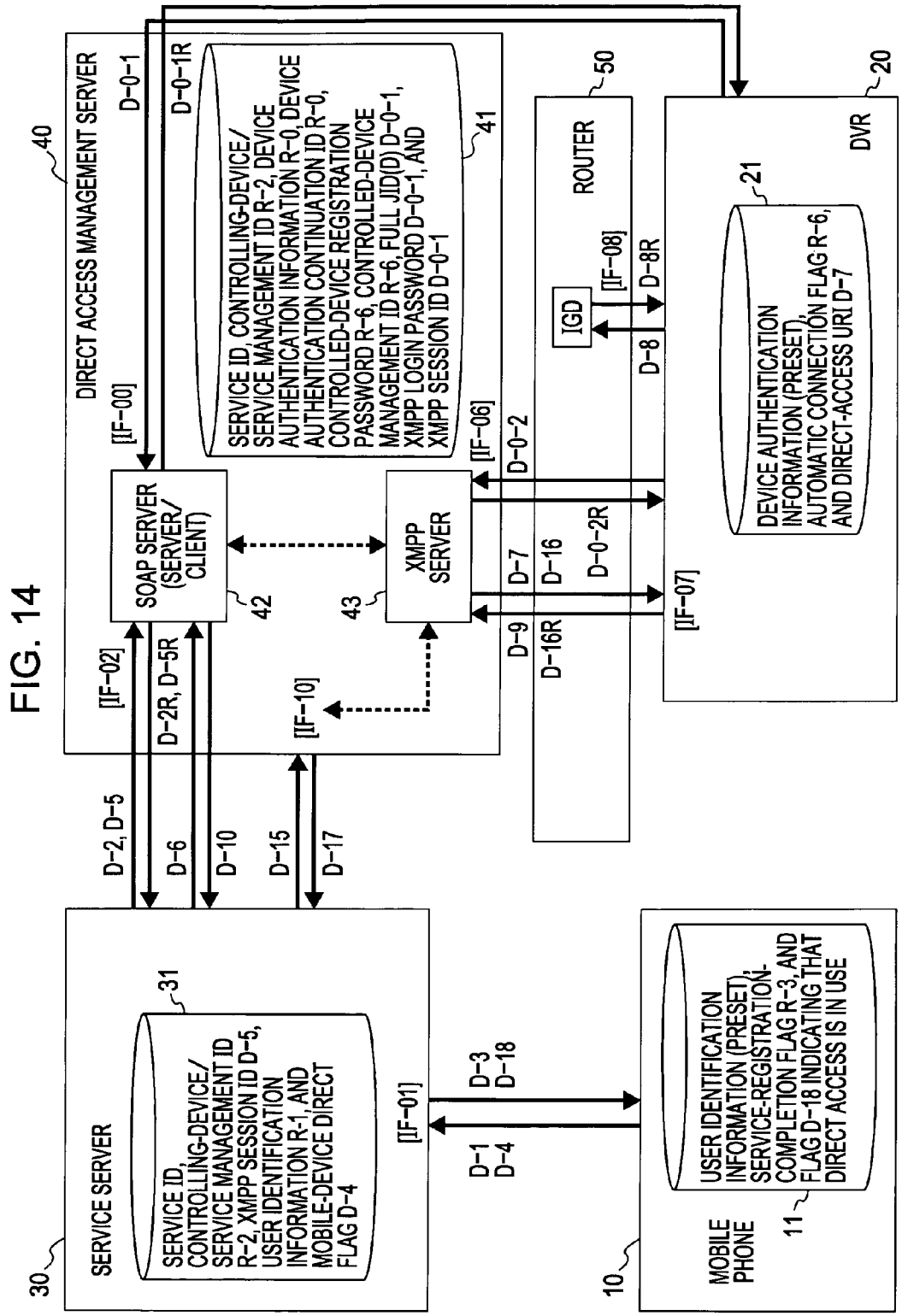
FIG. 14 is a sequence diagram showing the flow of information in the network system shown in FIG. 1 when the mobile phone makes a remote video-recording reservation using tunneling.

[3-3. Remote Video-Recording Reservation from Service Server 30 by Using Tunneling: FIG. 14]

Next, a description is given of the operation of a case in which the service server 30 receives an instruction from the mobile phone 10 to perform remote video-recording reservation on the DVR 20 by using tunneling performed by the XMPP server 43 of the direct-access management server 40. FIG. 14 is a sequence diagram showing the flow of information when the service server 30 that has received an instruction from the mobile phone 10 performs remote video-recording reservation on the DVR 20 by using tunneling performed by the XMPP server 43.

Since the processing of each device until the direct-access start response <D-10> in the flow of information between the mobile phone 10, the DVR 20, the service server 30, the direct-access management server 40, and the router 50 shown in FIG. 14 is the same as the flow described with reference to FIG. 7, the description is omitted.

A case in which the service server 30 that has received an instruction from the mobile phone 10 performs remote video-recording reservation on the DVR 20 by using tunneling performed by the XMPP server 43 corresponds to a case in which it is determined in step S918 that the mobile-device direct flag is off and the direct-access start response <D-10> received by the service server 30 in step S917 contains an URI for tunneling, the URI being assigned by the direct-access management server 40 in step S1110. Since the service server 30 merely needs to access the direct-access URI received as the direct-access start response <D-10>, as described above, it is not particularly necessary to determine whether the direct-access URI corresponds to the DVR 20 or the tunneling of the direct-access management server 40.

The service server 30 accesses the address of the direct-access management server 40, the address being included in the direct-access URI received in step S917 as the direct-access start response <D-10>, and transmits a new remote video-recording reservation request <D-15> containing the direct-access URI and the video-recording reservation program information obtained from the new remote video-recording reservation request <D-4> transmitted from the mobile phone 10 (FIG. 9: step S920).

When the direct-access management server 40 receives the new remote video-recording reservation request <D-15> containing the direct-access URI and the video-recording reservation program information (FIG. 11: step S1112), the direct-access management server 40 checks the direct-access URI contained in the new remote video-recording reservation request <D-15> (FIG. 11: step S1113). When the direct-access URI is invalid, the direct-access management server 40 transmits, as a new remote video-recording reservation response <D-17>, an error code indicating that the URI is invalid to the service server 30 (FIG. 11: step S1114). When the direct-access URI is valid, the direct-access management server 40 transmits a new remote video-recording reservation request <D-16> containing the video-recording reservation program information to the DVR 20 via the XMPP server 43 (FIG. 11: step S1115). In this case, for example, all address portions of the direct-access URI are filled with "0s" so that the DVR 20 can recognize that the access is performed by tunneling via the XMPP server 43 in the direct-access management server 40.

Upon receiving the new remote video-recording reservation request <D-16> from the direct-access management server 40 (FIG. 12: step S1210), the DVR 20 checks the validity of the direct-access URI contained in the new remote video-recording reservation request <D-16> (FIG. 12: step S1211). When the direct-access URI is invalid, the DVR 20 transmits, as a new remote video-recording reservation response <D-16R>, an error code indicating so to the direct-access management server 40 (FIG. 12: step S1212). When the direct-access URI is valid the DVR 20 transmits, as a new remote video-recording reservation response <D-16R>, information containing the reservation overlapping program list to the direct-access management server 40 (FIG. 12: step S1213).

Upon receiving the new remote video-recording reservation response <D-16R> containing the reservation overlapping program list from the DVR 20 (FIG. 11: step S1116), the direct-access management server 40 transmits a new remote video-recording reservation response <D-17> containing the reservation overlapping program list to the service server 30 (FIG. 11: step S1117).

Upon receiving the new remote video-recording reservation response <D-17> containing the reservation overlapping program list (FIG. 9: step S921), the service server 30 transmits a new remote video-recording reservation response <D-18> containing the reservation overlapping program list to the mobile phone 10 (FIG. 9: step S922). When the service server 30 receives, as the new remote video-recording reservation response <D-17>, the error code from the direct-access management server 40 (FIG. 9: step S923), the service server 30 transmits, as a new remote video-recording reservation response <D-18>, the error code to the mobile phone 10 (FIG. 9: step S924). Subsequent processing of the service server 30 and the mobile phone 10 is the same as the processing described above.

[3-4. Remote Video-Recording Reservation from Mobile Phone by Using Tunneling: FIG. 26]

Next, a description is given of the operation of a case in which the mobile phone 10 performs remote video-recording reservation on the DVR 20 by using tunneling performed by the XMPP server 43 of the direct-access management server 40 without using the service server 30. FIG. 26 is a sequence diagram showing the flow of information when the mobile phone 10 performs remote video-recording reservation on the DVR 20 by using tunneling performed by the XMPP server 43 without using the service server 30.

Since the processing of each device until the direct-access start response <D-10> in the flow of information between the mobile phone 10, the DVR 20, the service server 30, the direct-access management server 40, and the router 50 shown in FIG. 26 is the same as the flow described with reference to FIG. 7, the description is omitted.

A case in which the mobile phone 10 performs remote video-recording reservation on the DVR 20 by using tunneling performed by the XMPP server 43 without using the service server 30 corresponds to a case in which it is determined in step S918 that the mobile-device direct flag is off and the new remote video-recording reservation response <D-13> transmitted from the service server 30 to the mobile phone 10 in step S919 contains an URI for tunneling, the URI being assigned by the direct-access management server 40 in step S1110. Since the mobile phone 10 merely needs to access the direct-access URI received as the new remote video-recording reservation response <D-13>, as described above, it is not particularly necessary to determine whether the direct-access URI corresponds to the DVR 20 or the tunneling of the direct-access management server 40.

First, when the mobile phone 10 receives the new remote video-recording reservation response <D-13> containing the direct-access URI from the service server 30 (FIG. 8: step S815), the mobile phone 10 accesses the address of the direct-access management server 40, the address being included in the direct-access URI, and transmits a new remote video-recording reservation request <D-55> containing the direct-access URI and the video-recording reservation program information to the direct-access management server 40 (FIG. 8: step S816).

Upon receiving the new remote video-recording reservation request <D-55> from the mobile phone 10 (FIG. 11: step S1112), the direct-access management server 40 checks the direct-access URI contained in the new remote video-recording reservation request <D-55> (FIG. 11: step S1113). When the direct-access URI is invalid, the direct-access management server 40 transmits, as a new remote video-recording reservation response <D-57R>, an error code indicating that the URI is invalid to mobile phone 10 (FIG. 11: step S1114). When the direct-access URI is valid, the direct-access management server 40 transmits a new remote video-recording reservation request <D-16> containing the video-recording reservation program information to the DVR 20 via the XMPP server 43 (FIG. 11: step S1115). In this case, for example, all address portions of the direct-access URI are filled with "0s" so that the DVR 20 can recognize that the access is performed by tunneling via the XMPP server 43 in the direct-access management server 40.

Upon receiving the new remote video-recording reservation request <D-16> from the direct-access management server 40 (FIG. 12: step S1210), the DVR 20 checks the validity of the direct-access URI contained in the new remote video-recording reservation request <D-16> (FIG. 12: step S1211). When the direct-access URI is invalid, the DVR 20 transmits, as a new remote video-recording reservation response <D-16R>, an error code indicating so to the direct-access management server 40 (FIG. 12: step S1212). When the direct-access URI is valid, the DVR 20 transmits, as a new remote video-recording reservation response <D-16R>, information containing the reservation overlapping program list to the direct-access management server 40 (FIG. 12: step S1213).

Upon receiving the new remote video-recording reservation response <D-16R> containing the reservation overlapping program list from the DVR 20 (FIG. 11: step S1116), the direct-access management server 40 transmits a new remote video-recording reservation response <D-57R> containing the reservation overlapping program list to the mobile phone 10 (FIG. 11: step S1117). When the direct-access management server 40 receives the error code as the new remote video-recording reservation response <D-16R> from the DVR 20, the direct-access management server 40 transmits, as a new remote video-recording reservation response <D-57R>, the error code to the mobile phone 10. Subsequent processing of the mobile phone 10 is the same as the processing described above.

As described above, the mobile phone 10 can perform video-recording reservation processing on the DVR 20 by using not only direct access to the DVR 20 but also proxy access performed by the service server 30, XMPP-based tunneling performed by the direct-access management server 40, and so on.

[4. Content Acquirement]

Figure 15:
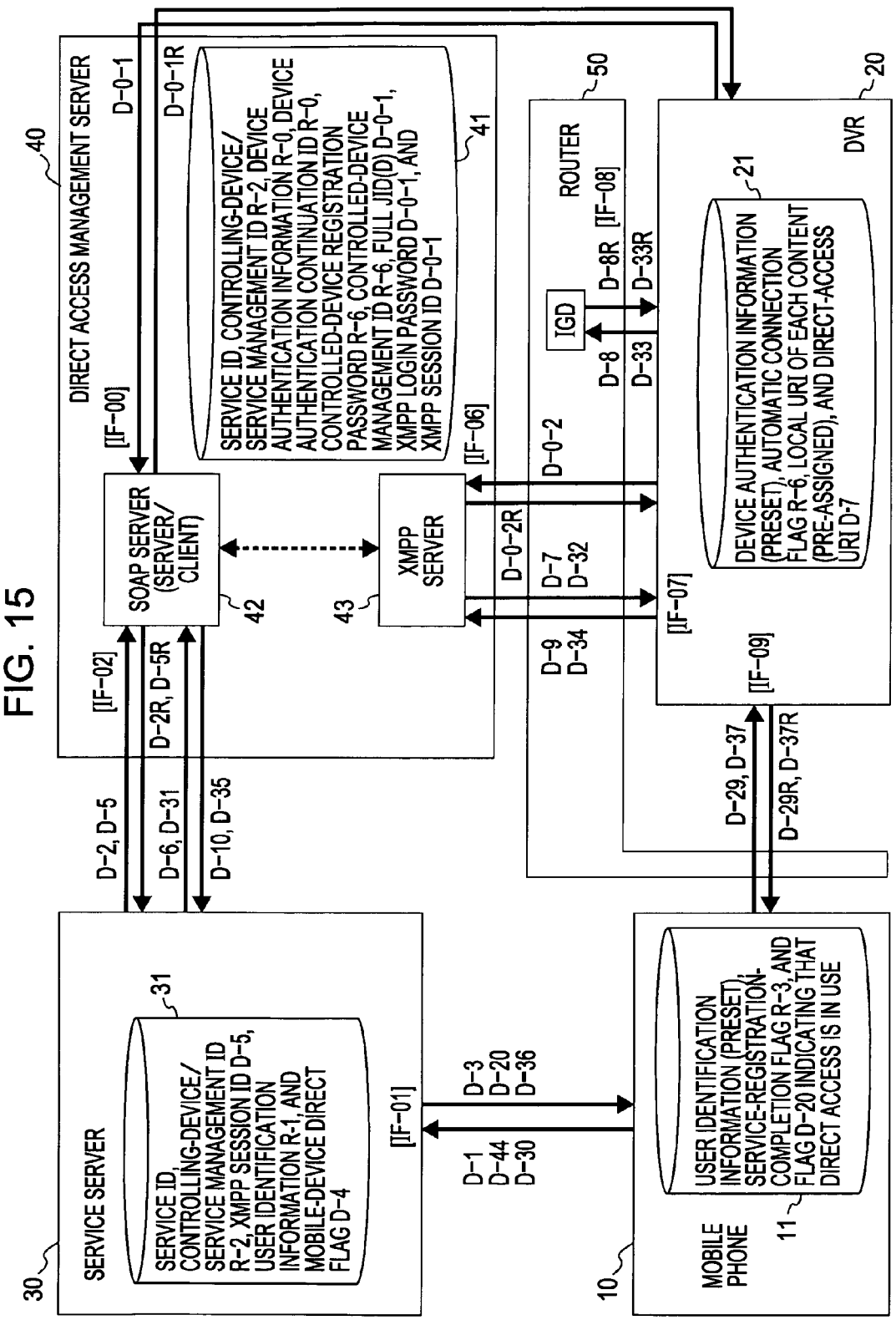
FIG. 15 is a sequence diagram showing the flow of information in the network system shown in FIG. 1 when the mobile phone makes direct access to acquire content.
Figure 18:
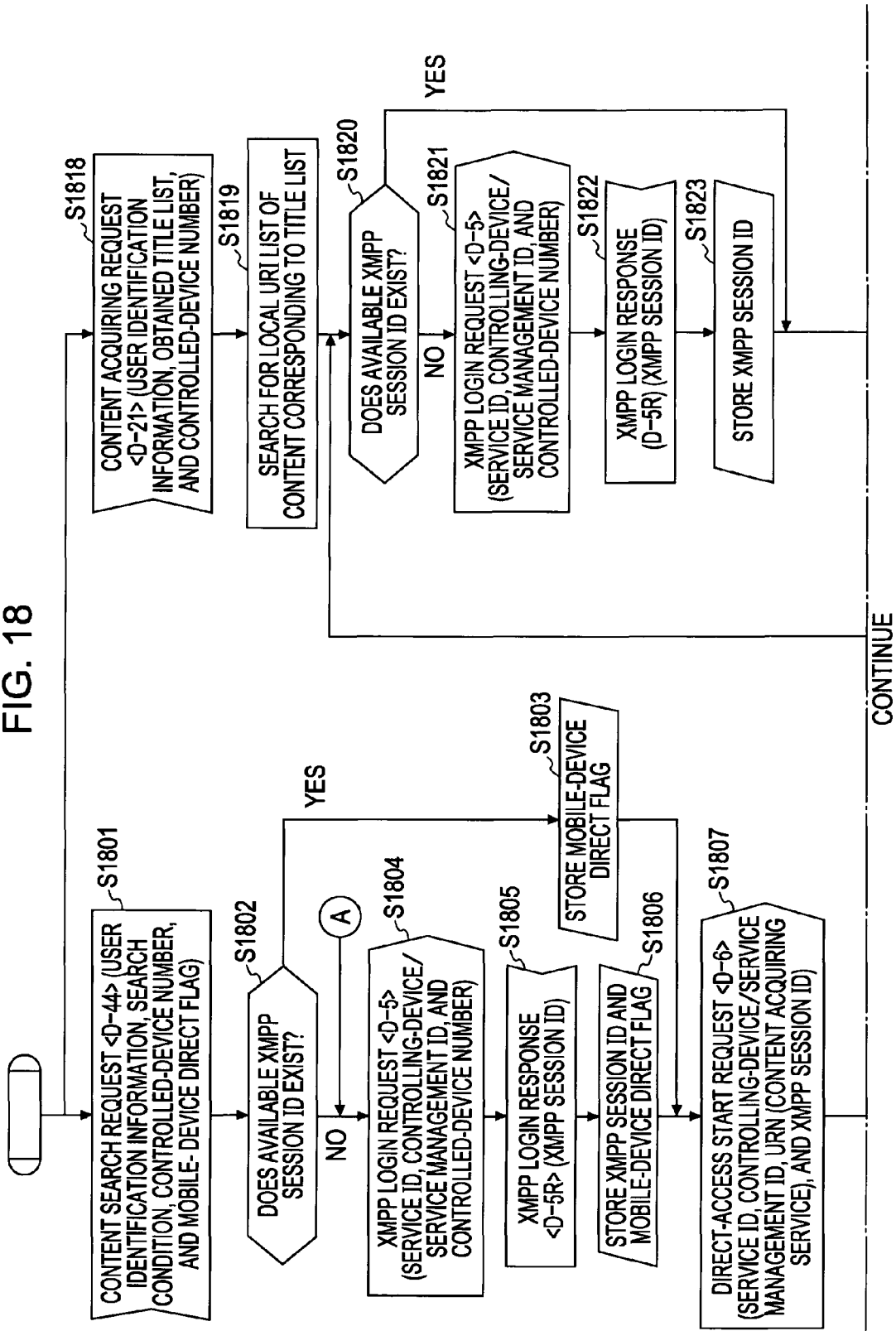
FIG. 18 is a flow chart showing the operation of the service server during the content acquirement.

Next, a description will be given of the operation of a case in which the mobile phone 10 acquires content from the DVR 20. FIG. 15 is a sequence diagram showing the flow of information when the mobile phone 10 directly accesses the DVR 20 to acquire content. FIG. 17 is a flow chart showing the operation of the mobile phone 10 during the acquirement of content. FIGS. 18 and 19 are flow charts showing the operation of the service server 30 during the acquirement of content.

When the user of the mobile phone 10 gives a direct-access use start instruction to the mobile phone 10 in order to receive a content acquiring service (FIG. 17: step S1701), the mobile phone 10 transmits a controlled-device-list obtaining request <D-1> containing the user identification information preset in the mobile phone 10 to the service server 30 (FIG. 17: step S1702).

Upon receiving the controlled-device-list obtaining request <D-1> from the mobile phone 10 (FIG. 9: step S901), the service server 30 determines whether or not a controlling-device/service management ID corresponding to the user identification information contained in the controlled-device-list obtaining request <D-1> is stored in the storage unit 31 (FIG. 9: step S902). When a controlling-device/service management ID corresponding to the user identification information is not stored in the storage unit 31, the service server 30 transmits, as a controlled-device-list obtaining response <D-3>, an error code indicating that the registration of a controlled device for the service is required to the mobile phone 10 (FIG. 9: step S903). When a controlling-device/service management ID corresponding to the user identification information is stored in the storage unit 31, the service server 30 transmits a controlled-device-list obtaining request <D-2> containing the controlling-device/service management ID and a service ID, which is information for identifying the service, to the direct-access management server 40 (FIG. 9: step S904) in order to obtain a list of controlled devices associated with the controlling-device/service management ID managed by the direct-access management server 40.

Upon receiving the controlled-device-list obtaining request <D-2> from the service server 30 (FIG. 10: step S1012), the direct-access management server 40 determines whether or not a combination of the service ID and the controlling-device/service management ID which are contained in the controlled-device-list obtaining request <D-2> matches what is stored in the storage unit 41 (FIG. 10: step S1013). If the combination is not stored, the direct-access management server 40 transmits, as a controlled-device-list obtaining response <D-2R>, an error code indicating the combination is not registered to the service server 30 (FIG. 10: step S1014). When it is determined that the combination of the service ID and the controlling-device/service management ID contained in the controlled-device-list obtaining request <D-2> is stored in the storage unit 41, the direct-access management server 40 generates, as a controlled-device list, a list containing numbers re-assigned for the controlled-device management IDs of controlled devices controllable by the mobile phone 10, device names contained in the device authentication information of the controlled devices, and so on in accordance with the linking contents of the controlling-device/service management ID and the controlled-device management ID which are stored in the storage unit 41. The direct-access management server 40 then stores the controlled-device list in the storage unit 41 in association with controlling-device/service management ID and transmits a controlled-device-list obtaining response <D-2R> containing the controlled-device list to the service server 30 (FIG. 10: step S1015).

Upon receiving, as the controlled-device-list obtaining response <D-2R>, the error code indicating the combination is not registered from the direct-access management server 40 (FIG. 9: step S905), the service server 30 transmits, as a controlled-device-list obtaining response <D-3>, an error code indicating that controlled-device registration is required to the mobile phone 10 (FIG. 9: step S906). When the service server 30 receives the controlled-device-list obtaining response <D-2R> containing the controlled-device list from the direct-access management server 40 (FIG. 9: step S907), the service server 30 transmits a controlled-device-list obtaining response <D-3> containing the controlled-device list to the mobile phone 10 (FIG. 9: step S908).

When the mobile phone 10 receives, as the controlled-device-list obtaining response <D-3>, the error code from the service server 30 (FIG. 17: step S1703), the mobile phone 30 displays an error message indicating that controlled-device registration is required to the user via the display unit (FIG. 17: step S1704). When the mobile phone 10 receives the controlled-device-list obtaining response <D-3> containing the controlled-device list (FIG. 17: step S1705), it determines whether or not multiple controlled-device numbers exist in the controlled-device list (FIG. 17: step S1706). When multiple controlled-device numbers exist, the mobile phone 10 displays the contents of the controlled-device list on the display unit (FIG. 17: step S1707), prompts the user to select one of the controlled-device numbers (FIG. 17: step S1708), and stores the selected controlled-device number in the storage unit 11 (FIG. 17: steps S1709 and S1710). When multiple controlled devices do not exist, the number of the one controlled device is stored in the storage unit 11 (FIG. 17: steps S1711 and S1710).

Next, based on the mobile-device direct flag preset in the mobile phone 10, the mobile phone 10 determines whether to directly access the content acquiring service of the DVR 20 from the mobile phone 10 or to access the content acquiring service via the service server 30, and then branches the process (FIG. 17: step S1712).

When the mobile phone 10 directly access the content acquiring service of the DVR 20, the mobile phone 10 transmits a content search request <D-44> containing the user identification information, search conditions, the controlled-device number, and the mobile-device direct flag (on) to the service server 30 (FIG. 17: step S1713). When the mobile phone 10 acquires content via the service server 30, the mobile phone 10 transmits a content search request <D-44> containing the user identification information, search conditions, the controlled-device number, and the mobile-device direct flag (off) to the service server 30 (FIG. 17: step S1724). In this case, the search conditions refer to conditions for searching for content and include, for example, a condition indicating that the content is still-image data and information specifying that the content is recorded-video data or the like. Items such as date and a data size may be added as search conditions so that more detailed search conditions can be set.

Upon receiving the content search request <D-44> from the mobile phone 10 (FIG. 18: step S1801), the service server 30 checks whether or not an available XMPP session ID is stored in the storage unit 31 (FIG. 18: step S1802). When an available XMPP session ID is already stored in the storage unit 31, the service server 30 stores the value of the mobile-device direct flag, contained in the content search request <D-44>, in the storage unit 31 in association with the service ID, the controlling-device/service management ID, and the controlled-device number (FIG. 18: step S1803). When an available XMPP session ID is not stored, the service server 30 transmits an XMPP login request <D-5> containing the service ID, the controlling-device/service management ID, and the controlled-device number to the direct-access management server 40 (FIG. 18: step S1804) in order to establish an XMPP session with the XMPP server 43.

Upon receiving the XMPP login request <D-5> from the service server 30 (FIG. 10: step S1016), the direct-access management server 40 determines whether or not a combination of the service ID, the controlling-device/service management ID, and the controlled-device number which are contained in the XMPP login request <D-5> is stored in the storage unit 41 (FIG. 10: step S1017). When the combination is not stored, the direct-access management server 40 transmits, as an XMPP login response <D-5R>, an error code indicating that a controlled device for the corresponding service does not exist to the service server 30 (FIG. 10: step S1018). When a controlled device for the corresponding service is stored in the storage unit 41, the direct-access management server 40 generates and stores an XMPP session ID (FIG. 10: step S1019) and transmits an XMPP login response <D-5R> containing the XMPP session ID to the service server 30 (FIG. 10: step S1020).

Upon receiving the XMPP login response <D-5R> containing the XMPP session ID from the direct-access management server 40 (FIG. 18: step S1805), the service server 30 stores the XMPP session ID contained in the XMPP login response <D-5R> and the value of the mobile-device direct flag contained in the content search request <D-44> received in step S1801 in the storage unit 31 in association with the service ID, the controlling-device/service management ID, and the controlled-device list number (FIG. 18: step S1806).

After the mobile-device direct flag is stored in step S1803 or step S1806, the service server 30 transmits a direct-access start request <D-6> containing the service ID, the controlling-device/service management ID, a service URN (uniform resource name), and the XMPP session ID to the direct-access management server 40 (FIG. 18: step S1807). In this case, since the mobile phone 10 is to acquire content from the DVR 20, the service URN is information specifying the content acquiring service.

Upon receiving the direct-access start request <D-6> from the service server 30 (FIG. 11: step S1101), the direct-access management server 40 determines whether or not a combination of the service ID and the controlling-device/service management ID which are contained in the direct-access start request <D-6> is stored in the storage unit 41 (FIG. 11: step S1102). When the combination is not stored, the direct-access management server 40 transmits, as a direct-access start response <D-10>, an error code indicating that controlled-device registration is required to the service server 30 (FIG. 11: step S1103). When the combination of the service ID and the controlling-device/service management ID contained in the direct-access start request <D-6> is stored in the storage unit 41, the direct-access management server 40 determines whether or not the XMPP session ID contained in the direct-access start request <D-6> is stored in the storage unit 41 in association with the combination of the service ID and the controlling-device/service management ID contained in the direct-access start request <D-6> (FIG. 11: step S1104). When it is not stored, the direct-access management server 40 transmits, as a direct-access start response <D-10>, an error code indicating that the XMPP session ID is invalid to the service server 30 (FIG. 11: step S1105). When the XMPP session ID contained in the direct-access start request <D-6> is stored in the storage unit 41 in association with the combination of the service ID and the controlling-device/service management ID contained in the direct-access start request <D-6>, the direct-access management server 40 transmits a direct-access URI obtaining request <D-7> containing the designation information of the service URN specified by the direct-access start request <D-6> to the DVR 20 via the XMPP server 43 in the direct-access management server 40 (FIG. 11: step S1106).

When the service server 30 receives, as the direct-access start response <D-10>, the error code indicating that the XMPP session ID is invalid from the direct-access management server 40 (FIG. 18: step S1808), the process returns to step S1804 and the service server 30 re-transmits the XMPP login request <D-5> to the direct-access management server 40 to re-establish an XMPP session.

Upon receiving the direct-access URI obtaining request <D-7> containing the service-URN designation information from the direct-access management server 40 (FIG. 12: step S1201), the DVR 20 assigns a direct-access local port (FIG. 12: step S1202). Next, the DVR 20 transmits, to the router 50, a NAT setting request <D-8> for a direct-access port. The NAT setting request <D-8> contains a local IP address pre-assigned to the DVR 20 and the port number of the direct-access local port. The DVR 20 then issues, to the router 50, a request for mapping a port number and a global IP address accessible from the Internet to the port number and the local IP address (FIG. 12: step S1203).

When the DVR 20 receives, as a direct-access-port NAT setting response <D-8R>, a global-IP-address and port-number obtaining error from the router 50 (FIG. 12: step S1204) in response to the direct-access-port NAT setting request <D-8> in step S1203, the DVR 20 determines whether or not the service URN can be tunneled (FIG. 12: step S1205) based on the service-URN designation information obtained in step S1201. Thus, when it is determined that the service URN contained in the direct-access URI obtaining request <D-7> is a service URN that can be tunneled, the DVR 20 transmits, as a direct-access URI obtaining response <D-9>, an error code that gives an instruction for tunneling to the direct-access management server 40 (FIG. 12: step S1206). When the service-URN designation information contained in the direct-access URI obtaining request <D-7> indicates a service URN that cannot be tunneled, the DVR 20 transmits, as a direct-access URI obtaining response <D-9>, an error code indicating the failure of acquiring an available port to the direct-access management server 40 (FIG. 12: step S1207). In this case, since the amount of data transferred in the content acquiring service is larger than that in the remote video-recording reservation service, the service URN cannot be tunneled. However, the present invention is not limited to the configuration. The service provider can appropriately set whether or not the tunneling is possible, depending on the capability of the direct-access management server 40.

When the DVR 20 receives, as a NAT setting response <D-8R>, a global IP address and a port number associated with the local IP address and the port number of the DVR 20 from the router 50 (FIG. 12: step S1208) in response to the direct-access-port NAT setting request <D-8>, the DVR 20 uses the global IP address and the port number to create a direct-access URI list and transmits, as a direct-access URI obtaining response <D-9>, the direct-access URI list to the direct-access management server 40 (FIG. 12: step S1209).

Upon receiving the direct-access URI list as the direct-access URI obtaining response <D-9> (FIG. 11: step S1107), the XMPP server 43 of the direct-access management server 40 transmits, as a direct-access start response <D-10>, the direct-access URI list to the service server 30 (FIG. 11: step S1111).

When the direct-access management server 40 receives, as the direct-access URI obtaining response <D-9>, the error code that gives an instruction for content acquirement using tunneling (FIG. 11: step S1109), the direct-access management server 40 assigns a tunneling port in the direct-access management server 40 (FIG. 11: step S1110), uses the port number of the assigned tunneling port in the direct-access management server 40 and the global IP address of the direct-access management server 40 to create a direct-access URI list, and transmits a direct-access start response <D-10> containing the direct-access URI list to the service server 30 (FIG. 11: step S1111).

Upon receiving the direct-access start response <D-10> from the direct-access management server 40 (FIG. 18: step S1809), the service server 30 determines whether the mobile-device direct flag is on or off (FIG. 18: step S1810). When the mobile-device direct flag is on, the service server 30 transmits a content search response <D-20> containing the direct-access URI to the mobile phone 10 (FIG. 18: step S1811) in order to allow the mobile phone 10 to directly access a device specified by the direct-access URI. When the mobile-device direct flag is off, the service server 30 transmits a content search request <D-19> containing the direct-access URI and the search conditions, obtained from content search request <D-44> transmitted from the mobile phone 10, to the direct-access URI of the DVR 20 (FIG. 18: step S1812).

Some specific examples in which the mobile phone 10 issues a content acquiring request to the DVR 20 will be described below.

[4-1. Direct Access from Mobile Phone 10: FIG. 15]

Next, a description will be given of the operation of a case in which the mobile phone 10 directly acquires content from the DVR 20 without using the service server 30. FIG. 15 is a sequence diagram showing the flow of information when the mobile phone 10 directly acquires content from the DVR 20.

In the flow of information between the mobile phone 10, the DVR 20, the service server 30, the direct-access management server 40, and the router 50 shown in FIG. 15, the processing of each device until the direct-access start response <D-10> is the same as the processing described above.

The case in which the mobile phone 10 directly acquires content from the DVR 20 refers to a case in which it is determined in step S1810 that the mobile-device direct flag is on and tunneling at the direct-access management server 40 is not performed.

First, a description will be given of the flow of a case in which the mobile phone 10 directly issues a content search request to the DVR 20 to obtain a title list of content that matches search conditions.

When the mobile phone 10 receives the content search response <D-20> containing the direct-access URI from the service server 30 (FIG. 17: step S1714), the mobile phone 10 accesses the address of the DVR 20, the address being included in the direct-access URI, and transmits a content search request <D-29> containing the direct-access URI and search conditions to the DVR 20 (FIG. 17: step S1715).

Upon receiving the content search request <D-29> containing the direct-access URI and the search conditions from the mobile phone 10 (FIG. 12: step S1214), the DVR 20 checks the validity of the direct-access URI contained in the content search request <D-29> (FIG. 12: step S1215). When the URI is invalid, the DVR 20 transmits, as a content search response <D-29R>, an error code indicating that the URI is invalid to the mobile phone 10 (FIG. 12: step S1216). When the URI is valid, the DVR 20 searches the storage unit 21 for content that matches the search conditions in accordance with the search conditions in the content search request <D-29> and generates a title list of content and a list of local URIs based on the search result. Thereafter, the DVR 20 transmits, as a content search response <D-29R>, the generated title list and local-URI list to the mobile phone 10 (FIG. 12: step S1217). The local URI in this case refers to information (URI) indicating the local storage location of content. For example, the local URI refers to information indicating a storage location in the storage unit 21, the storage location being identified by a local specifying method in the DVR 20, or information indicating a storage location in a home network, the storage location being identified by a local address in the home network to which the DVR 20 is connected.

Upon receiving, as the content search response <D-29R>, the error code indicating that the URI(s) is invalid from the DVR 20 (FIG. 17: step S1722), the mobile phone 10 displays a message indicating the failure of the direct access to the user via the display unit (FIG. 17: step S1723).

When the mobile phone 10 receives the content search response <D-29R> containing the content title list and the local-URI list from the DVR 20 (FIG. 17: step S1716), the process proceeds to processing for content acquisition.

Next, a description will be given of the flow of processing for the mobile phone 10 to directly acquire content from the DVR 20.

When the mobile phone 10 receives the content search response <D-29R> containing the content title list and the local-URI list from the DVR 20 (FIG. 17: step S1716), the mobile phone 10 displays the received content title list on the display unit, extracts a local URI or URIs corresponding to content selected by the user from the displayed titles, and creates a local-URI list for issuing a request for obtaining the content. Thereafter, the mobile phone 10 transmits a URI obtaining request <D-30> containing the user identification information, the local-URI list of the selected content, and the controlled-device number to the service server 30 (FIG. 17: step S1717). In this case, the reason why the mobile phone 10 re-obtains the URI for directly accessing the DVR 20 is that the local URI obtained in step S1716 indicates a place that cannot be directly accessed from the Internet.

Upon receiving the URI obtaining request <D-30> (FIG. 19: step S1901), the service server 30 checks whether or not an available XMPP session ID is stored in the storage unit 31 (FIG. 19: step S1902). When an available XMPP session ID is not stored, the service server 30 transmits an XMPP login request <D-5> to the direct-access management server 40 (FIG. 19: step S1903). The service server 30 receives the XMPP login response <D-5R> from the direct-access management server 40 (FIG. 19: step S1904) and stores the XMPP session ID, contained in the received XMPP login response <D-5R>, in the storage unit 31 (FIG. 19: step S1905). Thereafter, the service server 30 transmits a direct-access start request <D-31> containing the service ID, the controlling-device/service management ID, the service URN, the XMPP session ID, and the content local-URI list to the direct-access management server 40 (FIG. 19: step S1906). Also, when an available XMPP session ID is already stored, the service server 30 transmits a direct-access start request <D-31> to the direct-access management server 40 (FIG. 19: step S1906). In this case, since the mobile phone 10 is to acquire content from the DVR 20, the service URN is information specifying the content acquiring service.

Upon receiving the direct-access start request <D-31> (FIG. 11: step S1101), the direct-access management server 40 determines whether or not a combination of the service ID and the controlling-device/service management ID which are contained therein is stored in the storage unit 41 (FIG. 11: step S1102). When the combination is not stored, the direct-access management server 40 transmits, as a direct-access start response <D-35>, an error code indicating controlled-device registration is required to the service server 30 (FIG. 11: step S1103).

When the combination of the service ID and the controlling-device/service management ID is stored in the storage unit 41, the direct-access management server 40 determines whether or not the XMPP session ID contained in the direct-access start request <D-31> is stored in the storage unit 41 in association with the combination of the service ID and the controlling-device/service management ID contained in the direct-access start request <D-31> (FIG. 11: step S1104). When it is not stored, the direct-access management server 40 transmits, as a direct-access start response <D-35>, an error code indicating that the XMPP session ID is invalid to the service server 30 (FIG. 11: step S1105). When the XMPP session ID is stored in the storage unit 41 in association with the combination of the service ID and the controlling-device/service management ID, the direct-access management server 40 transmits a direct-access URI obtaining request <D-32>, which contains the service URN and the local-URI list specified by the direct-access start request <D-31>, to the DVR 20 (FIG. 11: step S1106).

When the service server 30 receives, as the direct-access start response <D-35>, the error code indicating that the XMPP session ID is invalid from the direct-access management server 40 (FIG. 19: step S1907), the process returns to step S1903. The service server 30 then re-issues the XMPP login request <D-5> to the direct-access management server 40 and receives an XMPP login response <D-5R> from the direct-access management server 40 (FIG. 19: step S1904). The service server 30 then stores the XMPP session ID, contained in the XMPP login response <D-5R>, in the storage unit 41 (FIG. 19: step S1905).

Upon receiving the direct-access URI obtaining request <D-32> from the direct-access management server 40 (FIG. 12: step S1201), the DVR 20 assigns a direct-access local port (FIG. 12: step S1202). Next, the DVR 20 transmits a direct-access-port NAT setting request <D-33> containing a local IP address and the port number of the direct-access local port to the router 50 (FIG. 12: step S1203).

When the DVR 20 receives, as a NAT setting response <D-33R>, a global-IP-address and port-number obtaining error from the service server 30 via the router 50 (FIG. 12: step S1204), the DVR 20 determines whether or not the service URN can be tunneled (FIG. 12: step S1205) based on the service-URN designation information obtained in step S1201. When it is determined that the service URN can be tunneled, the DVR 20 transmits, as a direct-access URI obtaining response <D-34>, an error code that gives an instruction for tunneling to the direct-access management server 40 (FIG. 12: step S1206). When the service-URN designation information indicates that the service URN cannot be tunneled, the DVR 20 transmits, as a direct-access URI obtaining response <D-34>, an error code indicating the failure of acquiring an available port to the direct-access management server 40 (FIG. 12: step S1207).

When the DVR 20 receives, as a NAT setting response <D-33R>, a global IP address and a port number associated with the local IP address and the port number of the DVR 20 from the router 50 (FIG. 12: step S1208) in response to the direct-access-port NAT setting request <D-3>, the DVR 20 uses the global IP address and the port number to create a direct-access URI list and transmits, as a direct-access URI obtaining response <D-34>, the direct-access URI list to the direct-access management server 40 (FIG. 12: step S1209).

Upon receiving the direct-access URI list as the direct-access URI obtaining response <D-34> (FIG. 11: step S1107), the XMPP server 43 of the direct-access management server 40 transmits, as a direct-access start response <D-35>, the direct-access URI list to the service server 30 (FIG. 11: step S1111).

When the direct-access management server 40 receives, as the direct-access URI obtaining response <D-34>, the error code that gives an instruction for content acquirement using tunneling (FIG. 11: step S1109), the direct-access management server 40 assigns a tunneling port in the direct-access management server 40 (FIG. 11: step S1110), uses the port number of the assigned tunneling port in the direct-access management server 40 and the global IP address of the direct-access management server 40 to create a direct-access URI list, and transmits a direct-access start response <D-35> containing the direct-access URI list to the service server 30 (FIG. 11: step S1111).

When the service server 30 receives the direct-access start response <D-35> containing the direct-access URI list from the direct-access management server 40 (FIG. 19: step S1908), the service server 30 transmits an URI obtaining response <D-36> containing the direct-access URI list to the mobile phone 10 (FIG. 19: step S1909).

Since the mobile phone 10 has obtained the direct-access URI for directly acquiring content from the DVR 20 through the processing described above, the mobile phone 10 starts processing for acquiring the selected content from the DVR 20. The direct-access URI list received by the mobile phone 10 as the URI obtaining response <D-36> contains a direct-access URI corresponding to the each content selected by the user.

Figure 20:
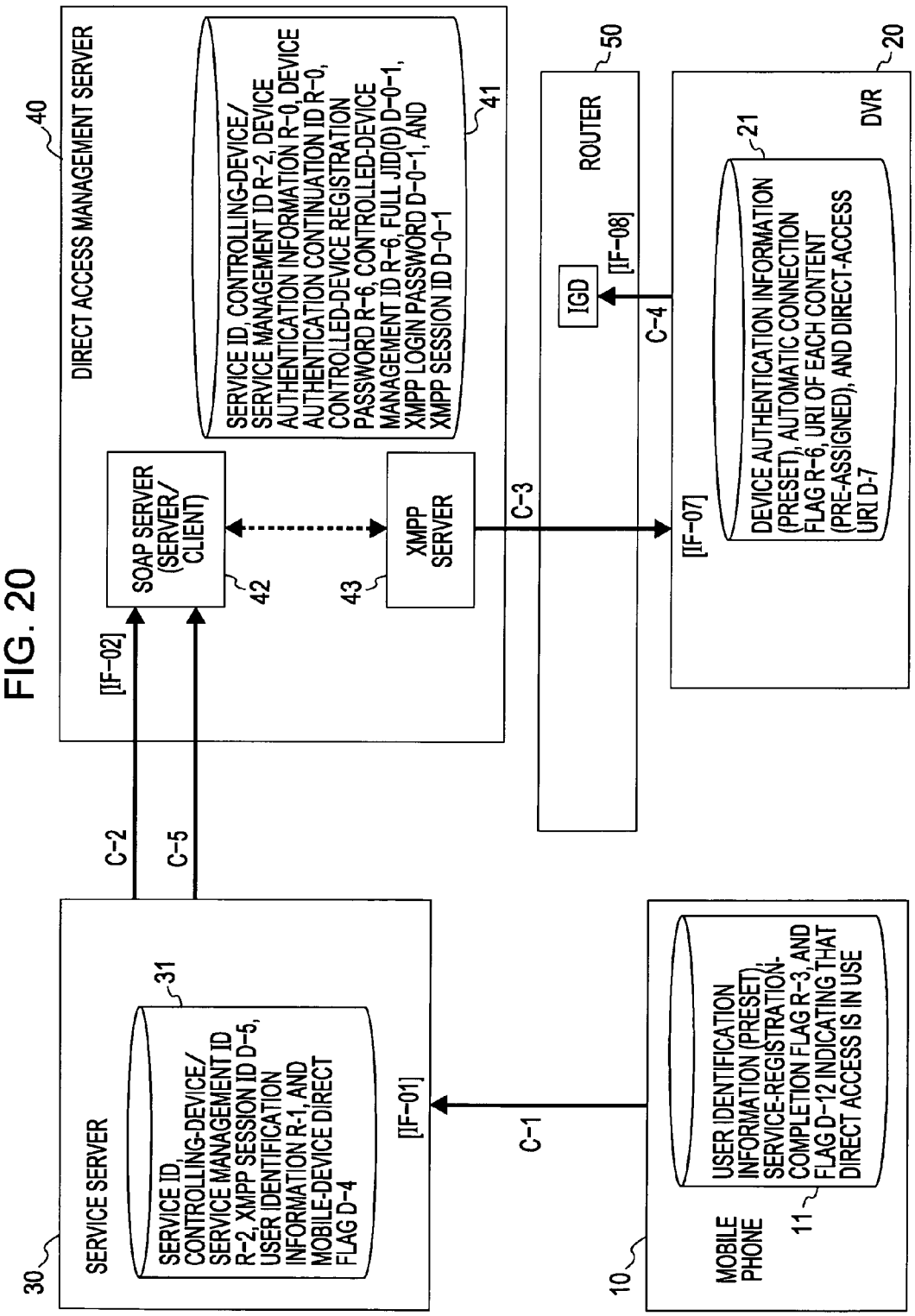
FIG. 20 is a sequence diagram showing the flow of information in the network system shown in FIG. 1 when the direct access is completed.

Upon receiving the URI obtaining response <D-36> containing the direct-access URI list (FIG. 17: step S1718), the mobile phone 10 selects a direct-access URI corresponding to content on which acquiring processing is performed from the direct-access URI list and transmits a content acquiring request <D-37> containing the direct-access URI to the DVR 20 (FIG. 20: step S1719).

Upon receiving the content acquiring request <D-37> containing the direct-access URI from the mobile phone 10 (FIG. 12: step S1218), the DVR 20 checks the validity of the direct-access URI contained in the content acquiring request <D-37> (FIG. 12: step S1219). When the URI is invalid, the DVR 20 transmits, as a content acquiring response <D-37R>, an error code indicating that the URI is invalid to the mobile phone 10 (FIG. 12: step S1220). When the URI is valid, the DVR 20 transmits, as a content obtaining response <D-37R>, content specified by the direct-access URI to the mobile phone 10 (FIG. 12: step S1221).

Upon receiving the content from the DVR 20 as the content acquiring response <D-37R> (FIG. 17: step S1720), the mobile phone 10 repeats the transmission of the content acquiring request <D-37> to the DVR 20 in step S1719 until the acquirement of all the content contained in the direct-access URI list is completed (FIG. 17: step S1721). Upon receiving, as the content acquiring response <D-37R>, the error code indicating the URI is invalid from the DVR 20, the mobile phone 10 displays a message indicating the failure of the direct access to the user via the display unit.

Figure 16:
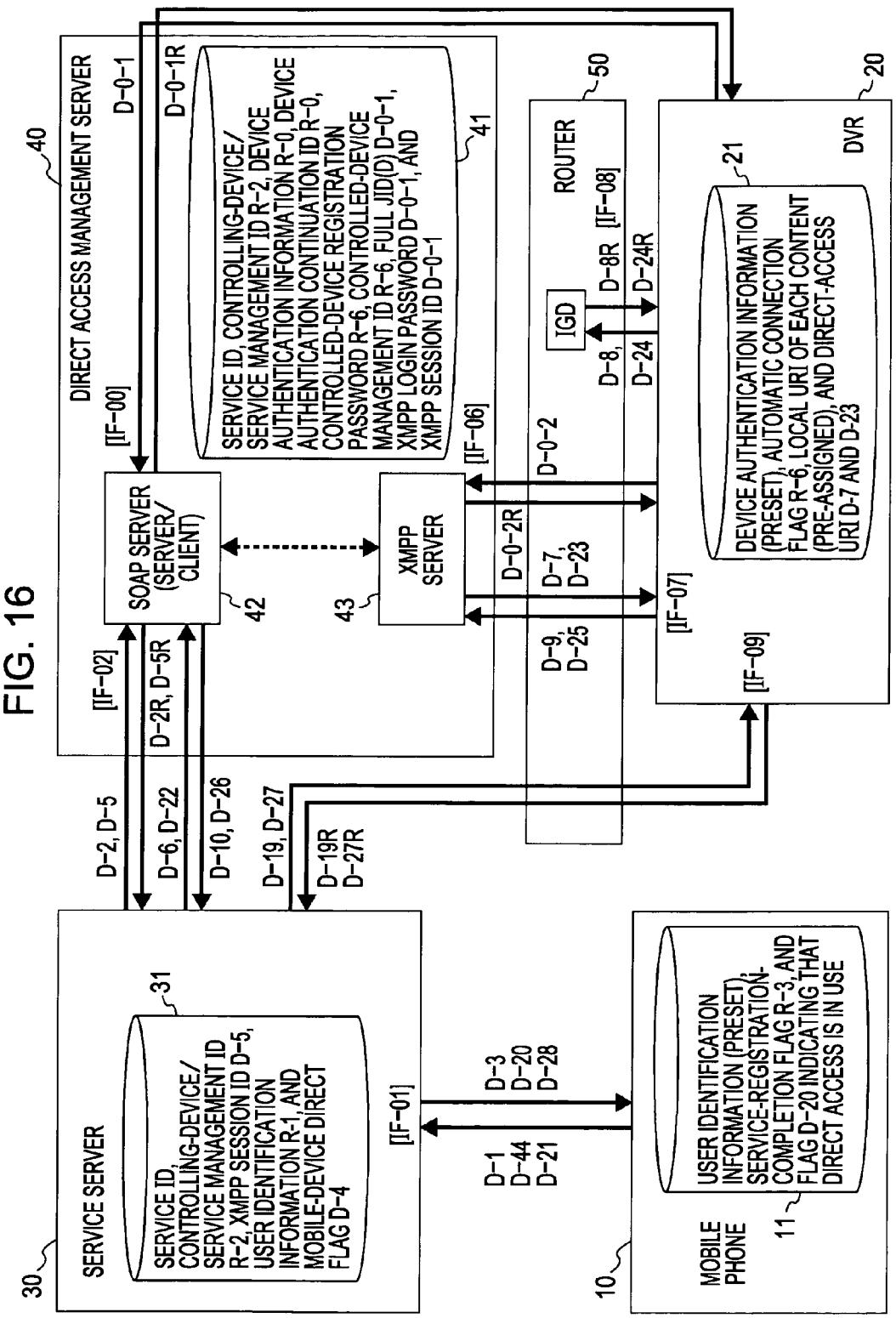
FIG. 16 is a sequence diagram showing the flow of information during content acquirement by direct access from the service server.

[4-2. Content Acquirement Via Service Server 30: FIG. 16]

Next, a description will be given of the operation of a case in which the mobile phone 10 acquires content from the DVR 20 via the service server 30. FIG. 16 is a sequence diagram showing the flow of information during content acquirement by direct access from the service server 30 to the DVR 20.

Since the processing of each device until the direct-access start response <D-10> in the flow of information between the mobile phone 10, the DVR 20, the service server 30, the direct-access management server 40, and the router 50 shown in FIG. 16 is the same as the flow described with reference to FIG. 15, the description is omitted.

The case in which the mobile phone 10 acquires content from the DVR 20 via the service server 30 corresponds to a case in which it is determined in step S1810 that the mobile-device direct flag is off and tunneling at the direct-access management server 40 is not performed.

First, a description will be given of the flow of a case in which the mobile phone 10 directly issues a content search request to the DVR 20 via the service server 30 to obtain a title list of content that matches search conditions.

Upon receiving the content search request <D-19> that was transmitted from the service server 30 in step S1812 and that contains the direct-access URI and the search conditions (FIG. 12: step S1214), the DVR 20 checks the validity of the direct-access URI contained in the content search request <D-19> (FIG. 12: step S1215). When the URI is invalid, the DVR 20 transmits, as a content search response <D-19R>, an error code indicating that the URI is invalid to the service server 30 (FIG. 12: step S1216). When the URI is valid, the DVR 20 searches the storage unit 21 for content that matches the search conditions in accordance with the search conditions in the content search request <D-19> and generates a title list of content and a local-URI list based on the search result. Thereafter, the DVR 20 transmits, as a content search response <D-19R>, the generated title list and local-URI list to the service server 30 (FIG. 12: step S1217).

Upon receiving, as the content search response <D-19R>, the content title list and the local-URI list from the DVR 20 (FIG. 18: step S1813), the service server 30 temporarily stores the content local-URI list (FIG. 18: step S1814) and transmits a content search response <D-20> containing the content tile list to the mobile phone 10 (FIG. 18: step S1815).

Also, when the service server 30 receives, as the content search response <D-19R>, the error code indicating the URI is invalid from the DVR 20 (FIG. 18: step S1816), the service server 30 transmits the error code to the mobile phone 10 as a content search response <D-20> (FIG. 18: step S1817).

Upon receiving, as the content search response <D-20>, the error code indicating the URI is invalid from the service server 30 (FIG. 17: step S1728), the mobile phone 10 displays a message indicating the failure of the direct access to the user via the display unit (FIG. 17: step S1729). When the mobile phone 10 receives, as the content search response <D-20> the content title list from the service server 30 (FIG. 17: step S1725), the process proceeds to processing for content acquirement.

Next, a description will be given of the flow of processing for the mobile phone 10 to acquire content from the DVR 20 via the service server 30.

When the mobile phone 10 receives the content search response <D-20> containing the content title list from the service server 30 (FIG. 17: step S1725), the mobile phone 10 displays the received content title list on the display unit, extracts a title or titles corresponding to content selected by the user from the displayed titles, and creates an obtained-title list for issuing a request for obtaining the content.

Thereafter, the mobile phone 10 transmits a content acquiring request <D-21> containing the user identification information, the selected-content title list (the obtained-title list), and the controlled-device number to the service server 30 (FIG. 17: step S1726). Upon receiving the content acquiring request <D-21> (FIG. 18: step S1818), the service server 30 searches the storage unit 31 for a local-URI list of content corresponding to the title list contained in the content acquiring request <D-21> (FIG. 18: step S1819), extracts a local URI or URIs corresponding to the title(s) of content selected by the user, and creates a local-URI list for issuing a request for obtaining the content.

Next, the service server 30 checks whether or not an available XMPP session ID is stored in the storage unit 31 (FIG. 18: step S1820). When an available XMPP session ID is not stored, the service server 30 transmits an XMPP login request <D-5> to the direct-access management server (FIG. 18: step S1821). Upon receiving the XMPP login response <D-5R> from the direct-access management server (FIG. 18: step S1822), the service server 30 stores the XMPP session ID, contained in the received XMPP login response <D-5R>, in the storage unit 31 (FIG. 18: step S1823). Thereafter, the service server 30 transmits a direct-access start request <D-22> containing the service ID, the controlling-device/service management ID, the service URN, the XMPP session ID, and the content local-URI list to the direct-access management server 40 (FIG. 18: step S1824). Also, when an available XMPP session ID is already stored, the service server 30 transmits the direct-access start request <D-22> to the direct-access management server 40 (FIG. 18: step S1824). In this case, since the mobile phone 10 is to acquire content from the DVR 20, the service URN is information specifying the content acquiring service.

Upon receiving the direct-access start request <D-22> (FIG. 11: step S1101), the direct-access management server 40 determines whether or not a combination of the service ID and the controlling-device/service management ID which are contained therein is stored in the storage unit 41 (FIG. 11: step S1102). When the combination is not stored, the direct-access management server 40 transmits, as a direct-access start response <D-26>, an error code indicating controlled-device registration is required to the service server 30 (FIG. 11: step S1103). When the combination of the service ID and the controlling-device/service management ID is stored in the storage unit 41, the direct-access management server 40 determines whether or not the XMPP session ID contained in the direct-access start request <D-22> is stored in the storage unit 41 in association with the combination of the service ID and the controlling-device/service management ID contained in the direct-access start request <D-22> (FIG. 11: step S1104). When it is not stored, the direct-access management server 40 transmits, as a direct-access start response <D-26>, an error code indicating that the XMPP session ID is invalid to the service server 30 (FIG. 11: step S1105). When the XMPP session ID is stored in the storage unit 41 in association with the combination of the service ID and the controlling-device/service management ID, the direct-access management server 40 transmits a direct-access URI obtaining request <D-23>, which contains the service URN and the local-URI list specified by the direct-access start request <D-31>, to the DVR 20 (FIG. 11: step S1106).

When the service server 30 receives, as the direct-access start response <D-26>, the error code indicating that the XMPP session ID is invalid from the direct-access management server 40 (FIG. 18: step S1825), the process returns to step S1820 and the service server 30 re-checks whether or not an available XMPP session ID is stored in the storage unit 31.

Upon receiving the direct-access URI obtaining request <D-23> from the direct-access management server 40 (FIG. 12: step S1201), the DVR 20 assigns a direct-access local port (FIG. 12: step S1202). Next, the DVR 20 transmits a direct-access-port NAT setting request <D-24> containing a local IP address and the port number of the direct-access local port to the router 50 (FIG. 12: step S1203).

When the DVR 20 receives, as a NAT setting response <D-24R>, a global-IP-address and port-number obtaining error from the service server 30 via the router 50 (FIG. 12: step S1204), the DVR 20 determines whether or not the service URN can be tunneled (FIG. 12: step S1205) based on the service-URN designation information obtained in step S1201. When it is determined that the service URN can be tunneled, the DVR 20 transmits, as a direct-access URI obtaining response <D-25>, an error code that gives an instruction for tunneling to the direct-access management server 40 (FIG. 12: step S1206). When the service-URN designation information indicates that the service URN cannot be tunneled, the DVR 20 transmits, as a direct-access URI obtaining response <D-25>, an error code indicating the failure of acquiring an available port to the direct-access management server 40 (FIG. 12: step S1207).

When the DVR 20 receives, as a NAT setting response <D-24R>, a global IP address and a port number associated with the local IP address and the port number of the DVR 20 from the router 50 (FIG. 12: step S1208) in response to the direct-access-port NAT setting request <D-24>, the DVR 20 uses the global IP address and the port number to create a direct-access URI list and transmits, as a direct-access URI obtaining response <D-25>, the direct-access URI list to the direct-access management server 40 (FIG. 12: step S1209).

Upon receiving the direct-access URI list as the direct-access URI obtaining response <D-25> (FIG. 11: step S1107), the XMPP server 43 of the direct-access management server 40 transmits, as a direct-access start response <D-26>, the direct-access URI list to the service server 30 (FIG. 11: step S1111).

When the direct-access management server 40 receives, as the direct-access URI obtaining response <D-25>, the error code that gives an instruction for content acquirement using tunneling (FIG. 11: step S1109), the direct-access management server 40 assigns a tunneling port in the direct-access management server 40 (FIG. 11: step S1110), uses the port number of the assigned tunneling port in the direct-access management server 40 and the global IP address of the direct-access management server 40 to create a direct-access URI list, and transmits a direct-access start response <D-26> containing the direct-access URI list to the service server 30 (FIG. 11: step S1111).

Since the service server 30 has obtained the direct-access URI for directly acquiring content from the DVR 20 through the processing described above, the service server 30 starts processing for acquiring the selected content from the DVR 20. In this case, the direct-access URI list received by the service server 30 as the direct-access start response <D-26> contains a direct-access URI corresponding to each content selected by the user.

Upon receiving the direct-access start response <D-26> containing the direct-access URI list (FIG. 18: step S1826), the service server 30 selects a direct-access URI corresponding to content on which acquiring processing is performed from the direct-access URI list and transmits a content acquiring request <D-27> containing the direct-access URI to the DVR 20 (FIG. 18: step S1827). Upon receiving the content acquiring request <D-27> from the service server 30 (FIG. 12: step S1218), the DVR 20 checks the validity of the direct-access URI contained in the content acquiring request <D-27> (FIG. 12: step S1219). When the URI is invalid, the DVR 20 transmits, as a content acquiring response <D-27R>, an error code indicating that the URI is invalid to the service server 30 (FIG. 12: step S1220). When the URI is valid, the DVR 20 transmits, as a content obtaining response <D-27R>, content specified by the direct-access URI to the service server 30 (FIG. 12: step S1221).

Upon receiving the content from the DVR 20 as the content acquiring response <D-27R> (FIG. 18: step S1828), the service server 30 transmits, as a content acquiring response <D-28>, the content to the mobile phone 10 (FIG. 18: step S1829) and repeats the transmission of the content acquiring request <D-27> to the DVR 20 in step S1827 until the acquirement of all the content contained in the direct-access URI list is completed (FIG. 18: step S1830). Upon receiving the content acquiring response <D-28> (FIG. 17: step S1727) containing the content, the mobile phone 10 displays the received content to the user via the display unit.

Also, when the service server 30 receives, as the content acquiring response <D-27R>, the error code indicating the URI is invalid from the DVR 20 (FIG. 18: step S1831), the service server 30 transmits the error code to the mobile phone 10 as a content acquiring response <D-28> (FIG. 18: step S1832).

As described above, the mobile phone 10 can acquire content from the DVR 20 by directly accessing the DVR 20 or by using proxy access performed by the service server 30. The above description has been given of a case in which content acquiring service is a service that cannot be tunneled. However, the tunneling processing described for the remote video-recording reservation service may be applied to the content acquiring service, so that the tunneling processing via the XMPP server 43 of the direct-access management server 40 can be used in the content acquiring service to acquire content from the DVR 20.

[5. Completion of Direct Access]

Figure 21:
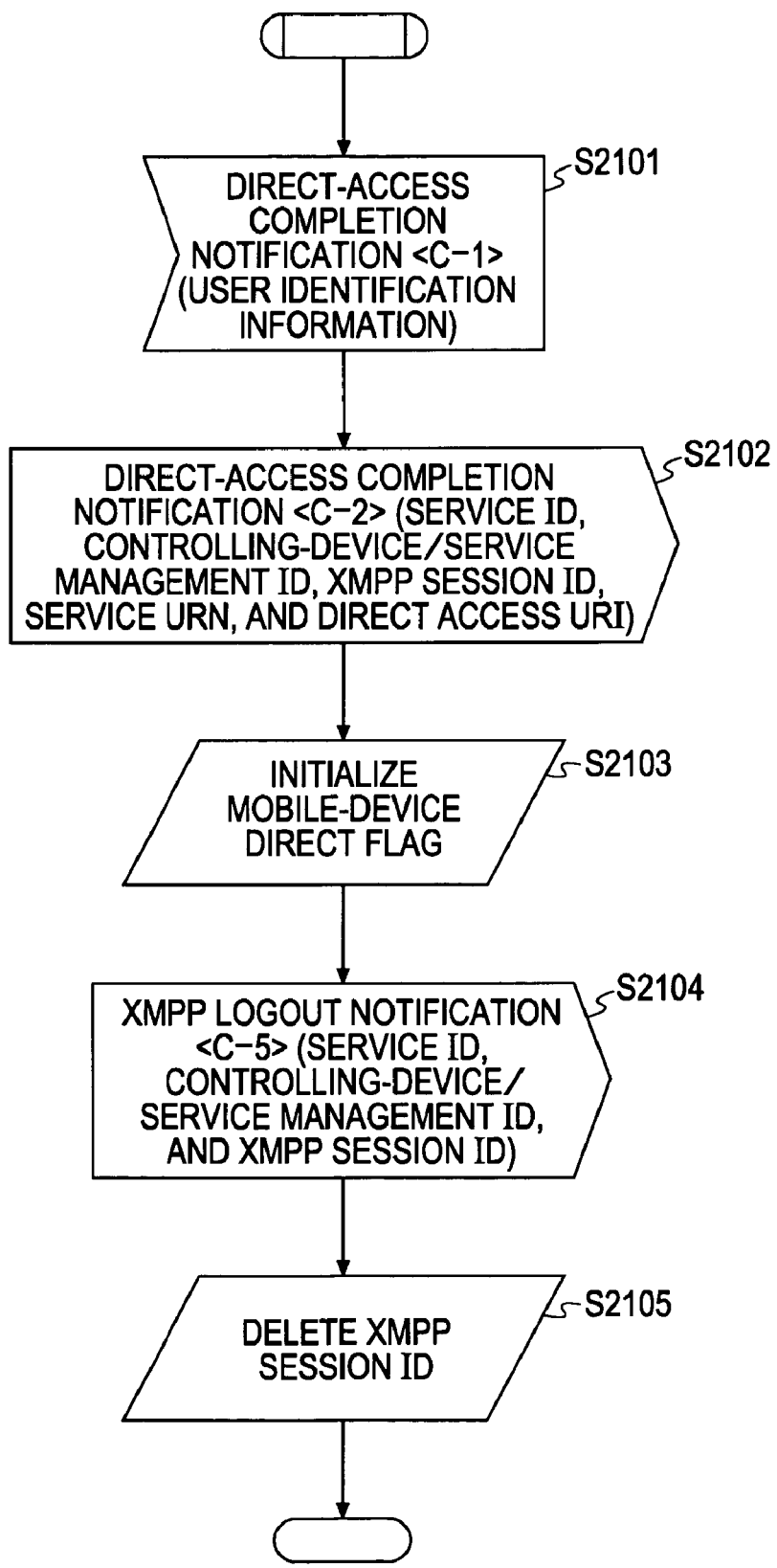
FIG. 21 is a flow chart showing the operation of the service server when the direct access is completed.
Figure 22:
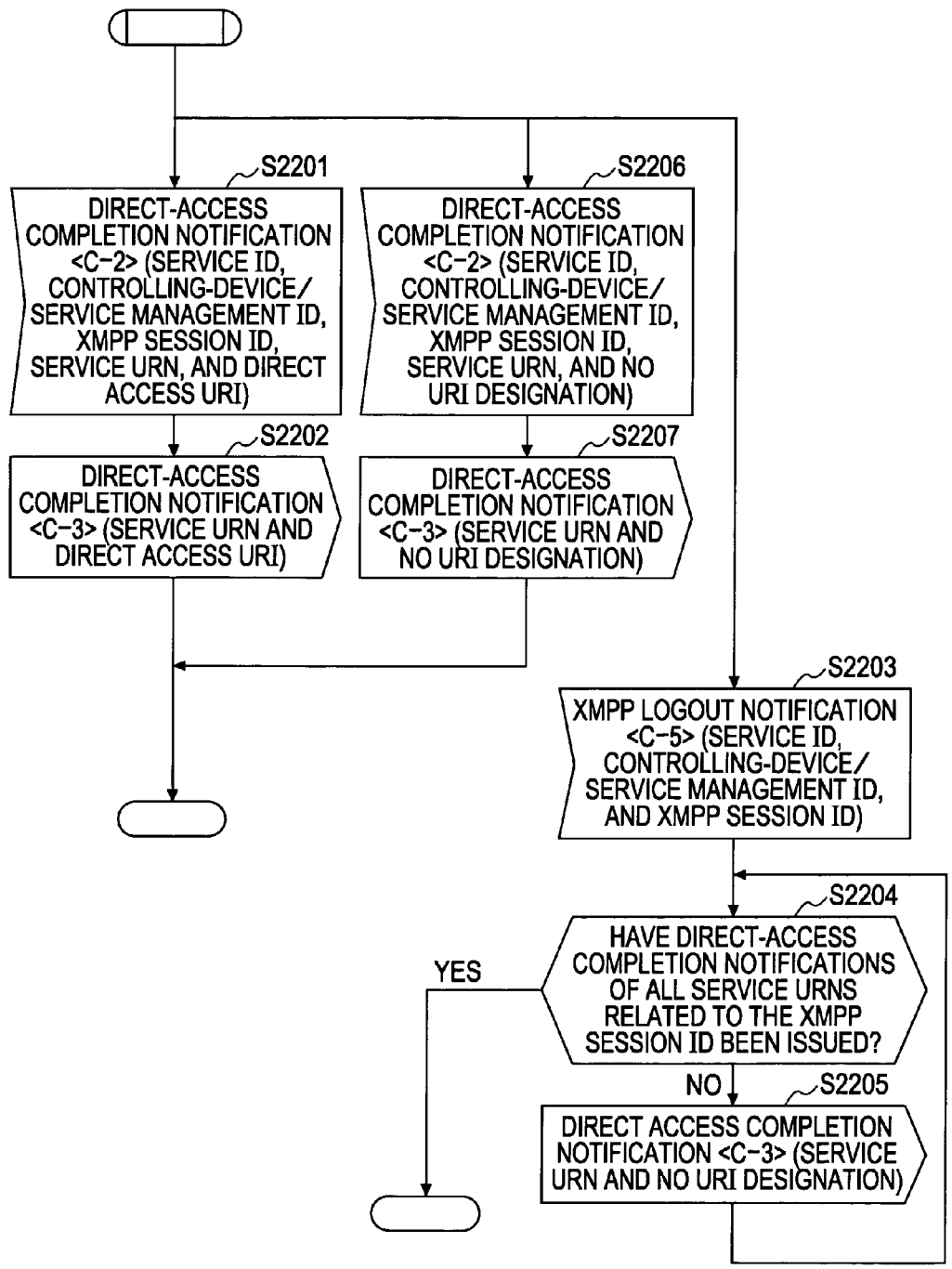
FIG. 22 is a flow chart showing the operation of the direct-access management server when the direct access is completed.

Next, a description will be given of processing in which the service server 30, the direct-access management server 40, and the DVR complete the direct access after the completion of the various types of processing described above. FIG. 20 is a sequence diagram showing the flow of information when the direct access is completed. FIG. 21 is a flow chart showing the operation of the service server 30 when the direct access is completed. FIG. 22 is a flow chart showing the operation of the direct-access management server 40 when the direct access is completed. FIG. 23 is a flow chart sowing the operation of the DVR 20 when the direct access is completed.

Upon receiving a direct-access completion notification <C-1> containing the user identification information from the mobile phone 10 (FIG. 21: step S2101), the service server 30 transmits a direct-access completion notification <C-2> containing the service ID, the controlling-device/service management ID, the XMPP session ID, the service URN, and the direct-access URI to the direct-access management server 40 (FIG. 21: step S2102).

Upon receiving the direct-access completion notification <C-2> (FIG. 22: step S2201), the direct-access management server 40 transmits a direct-access completion notification <C-3> containing the service URN and the direct-access URI to the DVR 20 (FIG. 22: step S2202). At this point, when the direct-access completion notification <C-2> does not designate a direct-access URI (FIG. 22: step S2206), the direct-access management server 40 transmits a direct-access completion notification <C-3> containing only the service URN to the DVR 20 (FIG. 22: step S2207).

Upon receiving the direct-access completion notification <C-3> containing the service URN and the direct-access URI (FIG. 23: step S2301), the DVR 20 performs closing <C-4> of the direct-access port, including a global IP address and a port number related to the specified direct-access URI (FIG. 23: step S2302).

On the other hand, after transmitting the direct-access completion notification <C-2>, the service server 30 initializes the mobile-device direct flag (FIG. 21: step S2103). Next, the service server 30 transmits an XMPP logout notification <C-5> containing the service ID, the controlling-device/service management ID, and the XMPP session ID to the direct-access management server 40 (FIG. 21: step S2104). Lastly, the service server 30 deletes the XMPP session ID entry (FIG. 21: step S2105).

Upon receiving the XMPP logout notification <C-5> containing the service ID, the controlling-device/service management ID, and the XMPP session ID (FIG. 22: step S2203), the direct-access management server 40 determines whether or not direct-access completion notifications for all service URNs related to the XMPP session ID have been issued to the DVR 20 (FIG. 22: step S2204). When a service URN for which the direct-access completion notification is to be issued remains, the direct-access management server 40 transmits a direct access completion notification <C-3> that designates only the service URN but does not designate a direct-access URI to the DVR 20 (FIG. 22: step S2205). Upon issuing all completion notifications, the direct-access management server 40 waits for the direct-access completion notification <C-2> from the service server 30.

Upon receiving the direct-access completion notification <C-3> that does not designate a direct-access URI from the direct-access management server 40 (FIG. 23: step S2303), the DVR 20 closes all ports related to the service URN specified by the direct-access completion notification <C-3> (FIG. 23: steps 2304 and S2305).

Through the execution of the processing described above, the service server 30, the direct-access management server 40, and the DVR 20 complete the direct access.

Although the configuration and the operation of the network system according to the embodiment of the present invention have been described above, some of the functions of the service server 30 can also be transferred to a controlling device. For example, making changes so that the function of the service server 30 for accessing the SOAP interface is included in a controlling device (the mobile phone 10) allows the direct-access use sequence, which starts by issuing the XMPP login request, to be executed directly between the controlling device (the mobile phone 10) and the direct-access management server 40.

The functions of a controlling device and the functions of a controlled device can also be integrated into one unit. In this case, when the controlling device (the mobile phone 10) accesses an XMPP session with the controlled device (the DVR 20), the controlling device exchanges necessary information in a direct access manner without using the SOAP server 42 during the XMPP session.

In addition, direct access between controlled devices is also possible. In this case, the controlled devices are associated by a controlling device.

In the embodiment described above, the service server 30 is provided between the mobile phone 10, which serves as a controlling device, and the direct-access management server 40. Thus, the direct-access management server 40 stores a controlling-device/service management ID, generated so as to correspond to a combination of the mobile phone 10 and the service server 30, in association with a controlled-device management ID. However, the present invention is not limited to the configuration. That is, the present invention can also be used in an environment where communication is directly performed between a controlling device and the direct-access management server 40 without the use of the service server 30. In this case, instead of the controlling-device/service management ID generated in the embodiment described above, the direct-access management server 40 generates a controlling-device management ID for identifying a controlling device and stores the generated ID in association with a controlled-device management ID. The controlling-device management ID may be generated by the direct-access management server 40. Alternatively, when a controlling device can make publicly available an ID that allows the identification of the controlling device, the ID given from the controlling device may be used as a controlling-device management ID to be associated with a controlled-device management ID. This also applies to a controlled-device management ID. That is, when a controlled device can make publicly available an ID that allows the identification of the controlled device, the ID given from the controlled device may be used as a controlled-device management ID to be associated with a controlling-device management ID. In addition, each of devices connected, as controlling devices and controlled devices, to the direct-access management server 40 may also has a unit for controlling another device and a unit to be controlled by another device.

Needless to say, the present invention is not limited to only the embodiment described above, and thus, various modifications can be made thereto in a scope without departing from the substance of the present invention.

The invention claimed is:

1. A server apparatus that is connectable in a network in conjunction with a first device and a second device, the server apparatus comprising:
   connecting means for setting a session for a communication with the first device;
   first receiving means for receiving, from the second device, an access start request for starting an access to the first device;
   first transmitting means for issuing, to the first device, a request for access-target information for allowing the second device to access the first device, when the first receiving means receives the access start request;
   second receiving means for receiving a response from the first device in response to the request issued from the first transmitting means; and
   second transmitting means for transmitting, when the response is first access-target information indicating a port number and an address each accessible by the second device and mapped to a port and an address of the first device, an indication of the port number and the address mapped to the port and the address of the first device to the second device in order to cause the second device and the first device to communicate with each other independent of the session, and for assigning, when the response is not the first access-target information, a port number of the server apparatus and transmitting second access-target information indicating the port number and an address of the server apparatus to the second device in order to cause the second device and the first device to communicate with each other through the session.

2. The sever apparatus according to claim 1, wherein, the first device is connected to the network via a router, and the first access-target information is transmitted from the router to the first device.

3. The server apparatus according to claim 2, wherein the first access-target information is information containing the port number and a global IP address in the network.

4. The server apparatus according to claim 1, wherein the first access-target information is information containing the port number and an address in the network.

5. The server apparatus according to claim 1, wherein the first access-target information is information containing the port number and a global address in the network.

6. The server apparatus according to claim 1, wherein the second access-target information is information containing a global address of the server apparatus.

7. The server apparatus according to claim 1, further comprising:
   controlling means for receiving a request given from the second device to the first device, the request being based on the second access-target information, and for transmitting the request to the first device, wherein, the connecting means sets a two-way communication session with the first device, and the controlling means transmits the request, given from the second device to the first device, to the first device through the two-way communication session.

8. The server apparatus according to claim 7, wherein the connecting means sets an always-on-connection two-way communication session with the first device, and the controlling means transmits the request, given from the second device to the first device, to the first device through the always-on-connection two-way communication session.

9. The server apparatus according to claim 7, wherein the connecting means sets a communication session with the first device, the communication session using an XMPP (Extensible Messaging and Presence Protocol).

10. The server apparatus according to claim 1, wherein, when the first receiving means receives the access start request, the first transmitting means issues a request for access-destination information for allowing the second device to access the first device to the first device through the session set by the connecting means.

11. The server apparatus according to claim 1, wherein the second device is connected to the server apparatus via a service server apparatus that provides the second device with a service.

12. An inter-device connection method for a server apparatus, implemented by a processor, that is connectable in a network in conjunction with a first device and a second device, the method comprising:

setting, by the server apparatus, a session for a communication with the first device;

receiving, at the server apparatus, from the second device, an access start request for starting an access to the first device;

issuing, from the server apparatus, to the first device, a request for access-target information for allowing the second device to access the first device, when the access start request is received;

receiving a response at the server apparatus from the first device in response to the request;

transmitting, when the response indicates a port number and an address each accessible by the second device and mapped to a port and an address of the first device, an indication of the port number and the address mapped to the port and the address of the first device from the server apparatus to the second device in order to cause the second device and the first device to communicate with each other independent of the session; and assigning, at the server apparatus, when the response does not indicate the port number and the address mapped to the port and the address of the first device, a port number of the server apparatus, and transmitting access-target information indicating the port number and an address of the server apparatus from the server apparatus to the second device in order to cause the second device and the first device to communicate with each other through the session.

13. A non-transitory storage medium on which a program is recorded, the program, when executed, causing a computer to perform a method as a server apparatus that is connectable in a network in conjunction with a first device and a second device, the method comprising:

setting a session for a communication with the first device;

receiving, from the second device, an access start request for starting an access to the first device;

issuing, to the first device, a request for access-target information for allowing the second device to access the first device, when the access start request is received;

receiving a response from the first device in response to the request;

transmitting, when the response indicates a port number and an address each accessible by the second device and mapped to a port and an address of the first device, an indication of the port number and the address mapped to the port and the address of the first device to the second device in order to cause the second device and the first device to communicate with each other independent of the session; and assigning, when the response does not indicate the port number and the address mapped to the port and the address of the first device, a port number of the server apparatus, and transmitting access-target information indicating the port number and address of the server apparatus to the second device in order to cause the second device and the first device to communicate with each other through the session.

* * * * *

UNITED STATES PATENT AND TRADEMARK OFFICE
CERTIFICATE OF CORRECTION

PATENT NO. : 7,856,504 B2
APPLICATION NO. : 11/630339
DATED : December 21, 2010
INVENTOR(S) : Takashi Nomura et al.

It is certified that error appears in the above-identified patent and that said Letters Patent is hereby corrected as shown below:

On the title page, Item (86), should read:

-- (86)  PCT No.:    PCT/JP2006/309497

§ 371 (c)(1),
(2), (4) Date:   Dec. 21, 2006 --

Signed and Sealed this
Eighth Day of March, 2011

David J. Kappos
*Director of the United States Patent and Trademark Office*